(12) United States Patent
Farmer et al.

(10) Patent No.: US 6,229,533 B1
(45) Date of Patent: *May 8, 2001

(54) GHOST OBJECT FOR A VIRTUAL WORLD

(75) Inventors: Randy Farmer, Cupertino; John E. Onusko, San Francisco, both of CA (US)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/691,793

(22) Filed: Aug. 2, 1996

(Under 37 CFR 1.47)

(51) Int. Cl.[7] .................................................. G06F 3/00
(52) U.S. Cl. .......................... 345/331; 345/330; 345/332; 345/335; 345/349
(58) Field of Search .................................... 345/326, 330, 345/331, 332, 334, 335, 348, 349, 355, 976, 977

(56) References Cited

U.S. PATENT DOCUMENTS

| 5,347,306 | * | 9/1994 | Nitta ................................. | 345/330 X |
| 5,491,743 | * | 2/1996 | Shiio et al. ....................... | 345/322 X |
| 5,544,320 |   | 8/1996 | Konrad ............................. | 395/200.33 |
| 5,606,652 | * | 2/1997 | Silverbrook ...................... | 345/435 |
| 5,684,943 |   | 11/1997 | Abraham et al. .................. | 345/473 |
| 5,717,869 | * | 2/1998 | Moran et al. ...................... | 345/339 |
| 5,717,879 | * | 2/1998 | Moran et al. ...................... | 345/339 |
| 5,736,982 | * | 4/1998 | Suzuki et al. ..................... | 345/330 |
| 5,880,731 | * | 3/1999 | Liles et al. ........................ | 345/349 |
| 5,886,697 | * | 3/1999 | Naughton et al. ................. | 345/348 |

OTHER PUBLICATIONS

"Valentine's Day Wedding In A Virtual World", Newsbytes, p. 1, Feb. 14, 1996.*

(List continued on next page.)

Primary Examiner—Raymond J. Bayerl
Assistant Examiner—X. L. Bautista
(74) Attorney, Agent, or Firm—Skjerven Morrill MacPherson LLP; Edward C. Kwok

(57) ABSTRACT

A virtual world computer process includes portable virtual token objects that can be used by on-line users of the virtual world to facilitate exchange of goods and services within the virtual world. In particular, client-server computer processes are provided for the virtual world that allow on-line users to conduct activities within the virtual world including getting, putting, giving, and receiving portable virtual token objects as well as other portable virtual objects. Each on-line user is represented in the graphic user interface by a virtual avatar object. Token objects are put into circulation by virtual ATM objects. A virtual ATM object allows a user to obtain a balance, deposit tokens, and withdraw tokens. A vendroid object is an object that sells portable virtual items in exchange for tokens deposited by avatars. Different virtual items have different values, and vendroids do not all have the same virtual items for sale. In the virtual world, a lurker is represented in a locale by a ghost object. An icon is present, i.e, an eye-in-the-sky, in a locale, whenever a ghost object, or ghost objects are present. Ghost objects have anonymity, i.e. their names are not known to avatars of the locale, and have limited interaction choices. A ghost object cannot talk or think to other avatars. A ghost object retains the ability to transmit private "ESP" messages to other avatars.

19 Claims, 44 Drawing Sheets

Microfiche Appendix Included
(14 Microfiche, 1285 Pages)

OTHER PUBLICATIONS

"Picture Perfect Shopping Solution For The Web", BRP Publications, pp. 1–3, Mar. 19, 1996.*

Harley Guttman Ungar, "Online service chat: it wont't go away", Interactive Content, v2, N24, p8(3), Apr. 1996.*

Pioch, N., "A Short IRC Primer," Nicolas.Pioch@grasp.insa–lyon.fr (Ed.1.1b, Feb. 28, 1993), 41 pages.

Rose, H. "What is IRC?," Hrose@kei.com, undated, 6 pages.

Fukuda, K., et al., "Hypermedia Personal Computer Communication System: Fujitsu Habitat," *Fujitsu Sci. Tech. J.*, 26, 3, pp. 197–205 (Oct. 1990).

Morabito, M., "Enter the On–Line World of Lucasfilm," *RUN*, pp. 24–28 (Aug. 1986).

Club Caribe Guidebook, Club Caribe Technology by Lucasfilm Ltd., 1989 Quantum Computer Services, Inc., 1989 Lucasfilm Ltd., 10 pages (1989).

Fujitsu Habitat V2.1, Fujitsu Limited, 6 pp. (1989–1992).

* cited by examiner

FIG. 7B
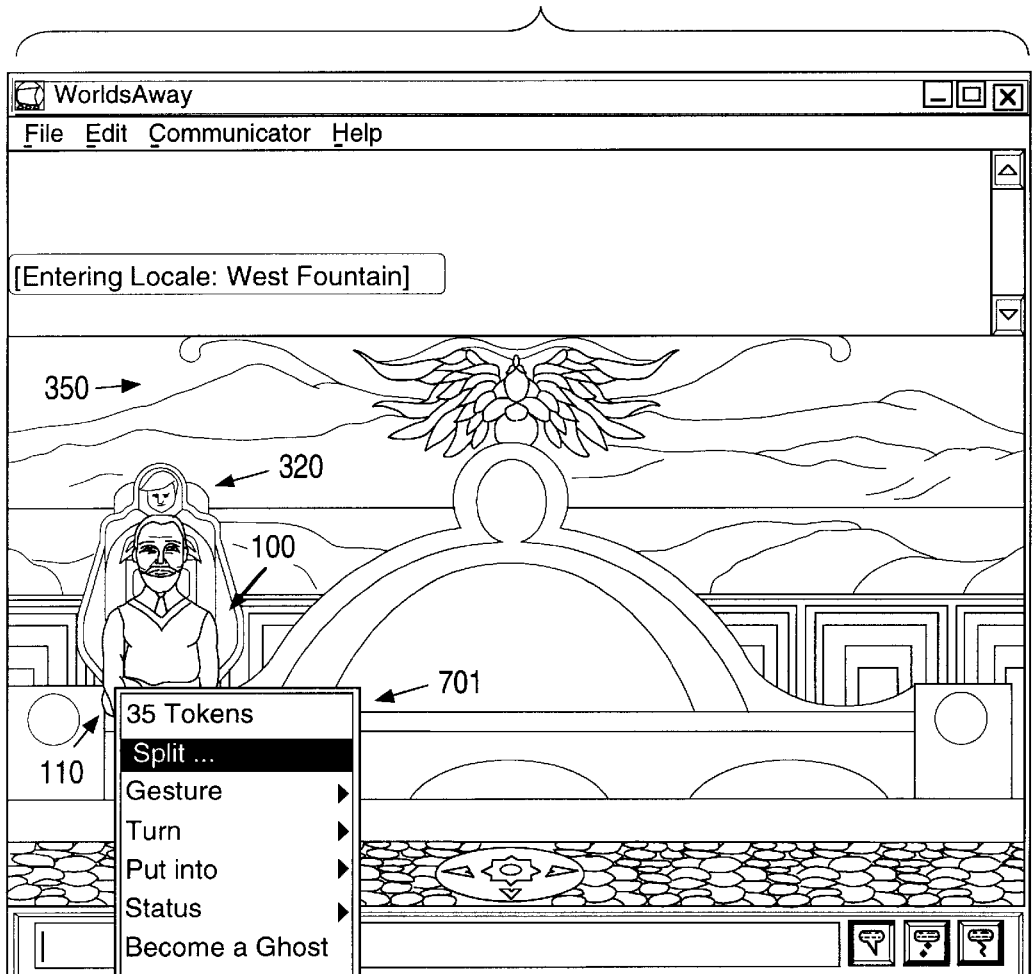
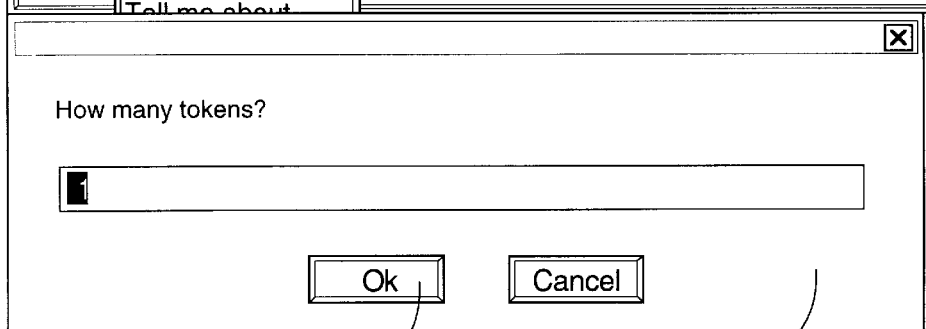
FIG. 7C

GHOST OBJECT FOR A VIRTUAL WORLD

APPENDIX A

Appendix A, which is a part of the present disclosure and is incorporated herein by reference in its entirety, is a listing of computer programs and related data for the client and server processes of this invention.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates generally to communications between persons using computers and more particularly to communications and interactions among persons within a virtual community implemented on a computer network.

2. Description of Related Art

One of the more interesting things that people do is form communities, e.g., form collections of people with common interests and activities. The creation of computer mediated communication has created the potential for people to come together in new ways. Where before, humans met face to face in a common physical space, they now can congregate in cyberspace—the conceptual place created by on-line communication. Until recently, on-line communities were limited to relatively sparse, text only communications. Common activities were limited to discussion, or simple games that could handled by what in effect was an extension of the postal service.

Previous on-line services have been creation points for communities. In some cases, communities have developed despite the inherent difficulties of the medium. Other, more interesting activities that contribute to community building, were severely limited or difficult to conduct.

To enhance the community building process, more diverse activities must be enabled. One thing that has brought humans together in communities from the earliest times has been the market, a place to exchange goods and services, and also an excuse to get together for other activities. It may be argued that without an economic component, any community will be severely limited in its potential growth and complexity. Commerce is also enjoyable and contributes to perceived quality of life.

How can an on-line service provide a medium of exchange for a virtual community that is acceptable to all users of the service? How can an on-line service provide a medium of exchange that is easy to use so as to promote transactions between individuals in a spontaneous manner, but secure from counterfeiting or fraud? Further, how can a virtual community support transactions between individuals that are not subject to scrutiny or review by third parties?

While credit cards have been used to conduct business on-line, credit cards are not appropriate for simple commerce between individuals. Few private individuals have bank accounts set up to accept credit card deposits. Further, when you do not know exactly who you are dealing with, you would hesitate to give your credit card number for a purchase.

Also, actual cash transactions may not be appropriate when the goods being purchased have no reality outside of the common virtual world. With the growth of on-line communities across national boundaries, how do individuals even agree on the medium of exchange? To the best knowledge of the inventors there is not medium of exchange available in an on-line virtual world to promote the interesting activities that surround trade, and add to the potential complexity and interest of community activities. A solution to the many complexities associated with a medium of exchange has yet to found for on-line virtual worlds.

SUMMARY OF THE INVENTION

According to the principles of this invention, a graphic user interface is utilized to represent instances of various classes, that are virtual objects, which in turn provide users of the graphic user interface with a new dimension in communication. In the virtual world of this invention, an avatar object is a virtual container that includes a plurality of other containers, e.g., avatar hands and a pocket. Herein, a virtual container object, as its name suggests, can hold one or more other virtual objects.

The avatar object is not only a container, but also includes other characteristics that allow the avatar object to express moods and perform gestures. The avatar object is represented in the graphic user interface as a computer based animation that has a body and a removable head. The avatar object can move, e.g., walk, through the various locales in the virtual world with or without a head.

One avatar can talk to the other avatars in the same locale. In this case, the on-line user represented by the avatar enters a message, and the message in displayed in a balloon that is visible to each of the other avatars in the locale. Thus, any other avatar in the locale can read the message. Alternatively, for a private communication, the on-line user, represented by the avatar, can use ESP to communicate privately with another avatar in the same locale, or in any other locale in the virtual world.

Portable virtual objects that can be stored in either the hands or the pocket of the avatar include spare heads for the avatar, a token object that represents one or more tokens, and other portable virtual objects that are available within the virtual world. These portable virtual objects include portable virtual container objects that in turn can store other portable virtual objects.

Herein, all of the objects and avatars are virtual which means that they exist only in terms of the computer processes used to generate the virtual world. Thus, even though the word virtual is not always used in describing an object or avatar, it is understood that the object or avatar is always virtual.

An avatar is controlled through use of data input devices, e.g., a keyboard and mouse, for an on-line user's computer in combination with information and actions presented on the computer display screen. The on-line user's computer executes client processes associated with the on-line user that in turn send and receive messages from other client processes on that on-line user's computer as well as from server processes executing on a server computer of a service provider over a network such as the Internet.

In this embodiment, the various actions that an on-line user can take through her avatar, are presented in the graphic user interface via pop-up menus. When the on-line user selects an object displayed in the graphic user interface using one or more of the computer's data input devices, a pop-menu for the selected object is displayed.

Each virtual object is aware of its surroundings and changes its behavior to suit the situation. For example, selecting a floor object of a locale presents a pop-up menu with choices such as Walk to here; Go this way; and Go that way, if the avatar is not holding a portable virtual object in his hand. However, if the avatar is holding a portable virtual object in his hand, there is an additional menu choice of Put here. This is because the floor object checks to see if the avatar is holding a portable virtual object that can placed, e.g., put or dropped, at the selected point on the floor object.

Token objects in the graphic user interface are a medium of exchange within the virtual world of this invention. The value of a token object is determined by the denomination of the token object. While each token object is shown as a single object, each token object can represent one or more tokens based on the denomination.

Token objects can be exchanged freely while in the virtual world, but token objects are not tied to any real world currency. To prevent counterfeiting, all token object creation is controlled by a one of the server processes executing on the server computer maintained by the service provider. On-line users cannot freely create new tokens.

A token object can be carried, deposited in a virtual ATM object, deposited in virtual vending machine, used to purchase portable virtual objects from machines or shops, or given to other avatars. A token can also be dropped, taken, or stored in a container. When tokens are paid, the client process performs an internal operation called "split" where the value of the token in the hand of the avatar, or in the pocket of the avatar is divided between what to pay and what goes back into his hand, or pocket. The split operation typically leaves a token of the denomination required for the transaction in the hand of the avatar.

In one embodiment of the split operation, the avatar places the token in his pocket. A client process and server process communicate and determine whether there are sufficient tokens in the pocket to complete the transaction. If there are sufficient tokens, the avatar withdraws his hand from his pocket holding a token of the required denomination. In this case, the server process notifies a client process in each of the other on-line users that are in the same locale, and that client process plays an animation that shows the split being made. If there are insufficient tokens, a message is displayed informing the avatar and the avatar's hand is removed from his pocket.

Exchange of token objects or any other portable virtual objects can be mediated by one of the server processes, and so theft or fraud are difficult. However, approval for transactions between avatars is not controlled by the server processes, or by the service provider. On-line users are free to transact exchanges of either tokens or other portable virtual objects through their respective avatars without needing the approval or intervention of the service provider.

Token objects can be exchanged for other portable virtual objects using virtual vending machine objects. Virtual vending machine objects are another unique feature of the graphic user interface of this invention. Each of these virtual vending machines displays portable virtual objects for sale.

When an avatar chooses a purchase from a virtual vending machine by selecting an entry in a pop-up menu of the graphical user interface using the data input devices, the virtual vending machine, in one embodiment, takes a token object directly from the avatar's hand and places the purchase directly into the avatar's hand. Virtual vending machine objects perform any required token splits, if the denomination of the token object in the avatar's hand is more than the purchase price, and puts a token object for the outstanding balance into avatar's pocket when delivering the purchased object. The token is put in the avatar's pocket, because at any instant only one virtual portable object can be in the avatar's hands.

At all times, the avatar has direct control over the portable virtual object in his hand, or on his head. Thus, theft by grabbing from the hand of avatar or head is not possible.

Token objects are placed in circulation by virtual ATM objects, that is an instance of an ATM class. A token object is an instance of a token class. A virtual ATM object, another novel feature of the graphic user interface of this invention, allows a user to obtain a balance, deposit tokens, and withdraw tokens.

When an avatar interacts with a virtual ATM object, the bank balance of the avatar is updated. When the avatar requests a withdrawal, the ATM object gives the avatar a token object valued at the withdrawal amount selected by the avatar.

Prior to a deposit, or at any time the avatar has a token in his hand, the token object can be split into two token objects whose total value equal the value of the original token object, as described above. All token object creation or splits are mediated by a server process on the server computer to prevent creation of fake token objects.

Token objects can be exchanged with other on-line users for goods or services, given as gifts, or left lying around, like dropped cash. Unlike cash, token objects cannot be taken by another avatar without the consent of the avatar holding the token object. However, any avatar is free to get a token object lying on the ground.

In general, one avatar cannot take a portable virtual object from a hand of another avatar. However, if one avatar can convince another avatar to place the portable object on the ground, for example, the avatar can get the object from the ground without the consent of the other avatar. Thus, like the real world, thievery and/or cons are possible in the virtual world of this invention, with the exception that a virtual object cannot be take from the hand of an avatar.

The avatars, virtual token objects, virtual ATMs, and virtual vending machines, as indicated above are implemented using object-orientated concepts, in this embodiment. Thus, each object is an instance of a class and typically is stored in a structure within a memory of the on-line user's computer for access by client processes, and within a memory of the server computer for access by server processes. Each instance of the class is represented by its own structure in the computer memory that contains data for the virtual object in the virtual world.

The token structures, ATM structures, vendroid structures, and the avatar structure with a pocket and a hand container create unique features in the virtual world that make the virtual world a more realistic and enjoyable place for on-line users to communicate. The ability to trade, purchase, get, and put the portable virtual objects stored in these structures allows an economic component, i.e., a new dimension of communication to exist in the virtual world that was not previously available.

As indicated above an avatar can walk, communicate with another avatar via talk, think, and ESP processes, and can also pick up, put down and use certain objects, use machines, and change its appearance. The avatar also has different moods and gestures. The mood of the avatar is selectable by the user at any time. The avatar starts in the world in the neutral mood, e.g., a happy mood. The mood changes are modal—the selected mood remains on the avatar's face until the mood is changed by the user. In this embodiment, the plurality of moods includes neutral, mad, sad, and glad.

As explained above, each locale in the virtual world can accommodate a predefined number of avatars. However, in addition to the avatars in a locale, a locale can support essentially an unlimited number of lurkers. Lurkers, while they do not actively contribute to the discussion in real time, do change the dynamic of on-line communities by causing the simplest exchanges between individuals to exist in a public space. While participants can choose to take any discussion to a private venue, such as in e-mail or off-line, the relative invisibility of lurking can cause it to be forgotten.

One opportunity that the graphical user interface of this invention provides is to visually represent lurkers to provide a reminder that participants other than the active ones are "listening in". In the virtual world of this invention, a lurker is represented in a locale by a ghost object. An icon is present, i.e, an eye-in-the-sky, in a locale, whenever a ghost object, or ghost objects are present.

Ghost objects have anonymity, i.e. their names are not known to avatars of the locale, and have limited interaction choices. A ghost object cannot talk or think to other avatars. A ghost object retains the ability to transmit private "ESP" messages to other avatars.

A ghost object also enables other important capabilities. To promote personal, one-on-one type relationships which encourage a sense of community, most locales have limits to the number of avatars that can be physically present at one time. This also prevents over-crowding of the visual interface. In addition, limiting the number of active avatars in a locale assures that the performance of the client computers is not slowed down by having to receive notice messages to update the status of more than a reasonable number of active avatars. Thus, the ghost object permits any number of on-line users in a locale without degrading either the visual interface, or the computer performance.

While this limitation is important to the social dynamic, and necessary to prevent a mob scene from overloading the visual interface, it would be frustrating to completely prevent new users from entering a full locale, i.e., a locale that contained the maximum number allowed of physical avatar objects. An avatar entering a full locale automatically becomes a ghost in the locale, and may then choose to remain and observe the activity occurring. When the number of materialized avatars drops below the limit, a ghost may choose to join in as a materialized, physical avatar in the locale, or to remain as a ghost and continue to lurk.

BRIEF DESCRIPTION OF THE DRAWINGS

FIG. 7B is illustrates a pop-up menu that is generated in the graphic user interface of FIG. 7A when the token object is pointed at.

FIG. 7C is a dialogue box that is displayed when the user selects menu item Split in the pop-up menu of FIG. 7B.

FIG. 7D illustrates a menu that is generated in the graphic user interface of FIG. 7A after the token split operations are completed and the token object is pointed at.

FIG. 9G illustrates the dialogue box that appears in the graphic user interface after selection of menu item Deposit in the pop-up menu of FIG. 9A.

FIG. 11G illustrates the pop-up menu that is generated in the graphic user interface when the avatar is pointed at.

FIG. 12A illustrates an avatar talking. FIG. 12B illustrates an avatar thinking. FIGS. 12C and 12D illustrate an avatar using ESP (extrasensory perception).

DETAILED DESCRIPTION

The on-line community of this invention, i.e, a virtual world computer process, herein after referred to as "the virtual world", includes portable virtual token objects that can be used by on-line users of the world to facilitate exchange of goods and services within the virtual world. In particular, client-server computer processes are provided for the virtual world that allow on-line users to conduct activities within the virtual world including getting, putting, giving, and receiving portable virtual token objects as well as other portable virtual objects. These operations facilitate development of commerce that is enjoyable and contributes to perceived quality of life within the virtual world relative to the prior art virtual worlds that limited the on-line users to discussion or playing simple games.

Figure 1:
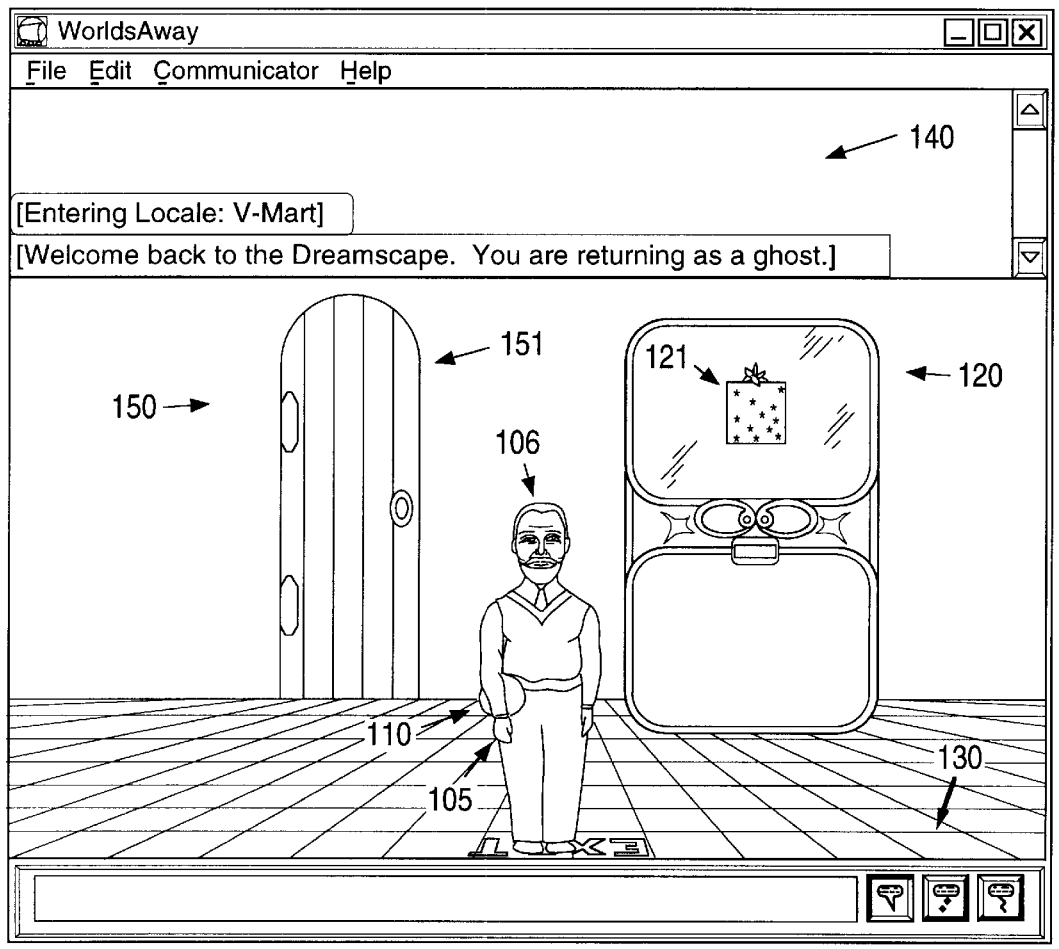
FIG. 1 is a graphic user interface of one locale in the virtual world that includes a vendroid object of this invention, and an avatar holding a token object of this invention.

In this embodiment, each on-line user is represented in the graphic user interface of this invention by an avatar object, such as avatar 100 (FIG. 1). FIG. 1 is representation of a screen display for locale V-Mart 150 of the virtual world of this invention. For clarity, only a single avatar object 100 is illustrated in FIG. 1. However, each locale in the virtual world can accommodate a maximum predefined number of avatars that are physically present in the locale.

Herein, while only a single avatar object 100 is illustrated in the Figures for convenience, interactions between two or more avatar objects within a locale are also described. The addition of one or more avatars to a Figure is not required to understand the principles of this invention and the operation of the graphic user interface.

One avatar can talk to the other avatars in the same locale in the graphic user interface. In this case, the on-line user represented by avatar 100 enters a message, and the message in displayed in region 140 in a balloon that is visible to each of the other avatars in the locale. Thus, any other avatar in the is locale can read the message. Alternatively, for a private communication, the on-line user, represented by avatar 100, can use ESP to communicate privately with another avatar in the same locale, or in any other locale in the virtual world and in this instance, only the graphic user interface for the other avatar displays the message.

Avatar object 100, usually called avatar 100, is a computer-based animation and is an instance of an avatar class. Avatar 100 of this invention includes a pocket 105 to store portable virtual objects owned by avatar 100. The portable virtual objects that can be stored in pocket 105 include spare heads for avatar 100, a token object 110 that represents one or more tokens, and other portable virtual objects that are available within the virtual world. These portable virtual objects include container objects that in turn can store other portable virtual objects.

Herein, all of the objects and avatars are virtual which means that they exist only in terms of the computer processes used to generate the virtual world. Thus, even though the word virtual is not always used in describing an object or an avatar, it is understood that the object or avatar is virtual.

Avatar 100 is controlled through use of data input devices, e.g., keyboard 201-1 and mouse 202-1, for an on-line user's computer 200-1 in combination with information and actions presented in display screen 250-1 of display device 210-1. Computer 200-1 executes client processes 220-1 associated with the on-line user that in turn send and receive messages from other client processes on computer 200-1 as well as from server processes 250 executing on a server computer 260 of a service provider 270 over a network 280.

The client side components of a virtual object are stored as resources. Each resource can be updated by a download from server computer 260, when service provider 270 changes or adds resources for a virtual object. Resources are organized and maintained by a resource manager on client computer 200-i, that acts as a database for the client. The resource manager is not an essential feature of this invention and is not needed to understand the virtual objects described more completely herein that are a novel features of the graphic user interface. Also, as those of skill in the art will appreciate, there is an engine on client computer 200-i that coordinates the interactions between the various methods described herein, and the signals required by, and received from the hardware of client computer 200-i.

As explained more completely below, typically, an on-line user 225-1 moves a cursor(not shown) on display screen 250-1 using mouse 202-1. Alternatively, arrow keys, or some combination of keys on keyboard 201-1 could be used. In either case, the data input device generates a signal representing a x-y coordinate position. A process executing on computer 220-1 captures the x-y coordinate position signal and translates the signal to a position on display screen 250-1 where the cursor is displayed, or alternatively a menu item is highlighted. Through manipulation of the data input device, the user points at avatar 100 or another object in locale 150 such as vending machine object 120, door object 151, or perhaps floor object 152 by placing the cursor on the object.

Typically, a user selects an object by placing a cursor on the virtual object, and then depressing a key on mouse 202-2, or alternatively, depressing a key or combination of keys on keyboard 201-2. Typically, when a virtual object is selected, information associated with that virtual object is displayed on display screen 250-1. In most cases, the information is a menu of options or actions associated with the object. The use of a mouse, a keyboard, or other data input device to point at an object, to select an object, to make menu selections, or to enter data is well-known to those of skill in the art and so is not described further.

Figure 2:
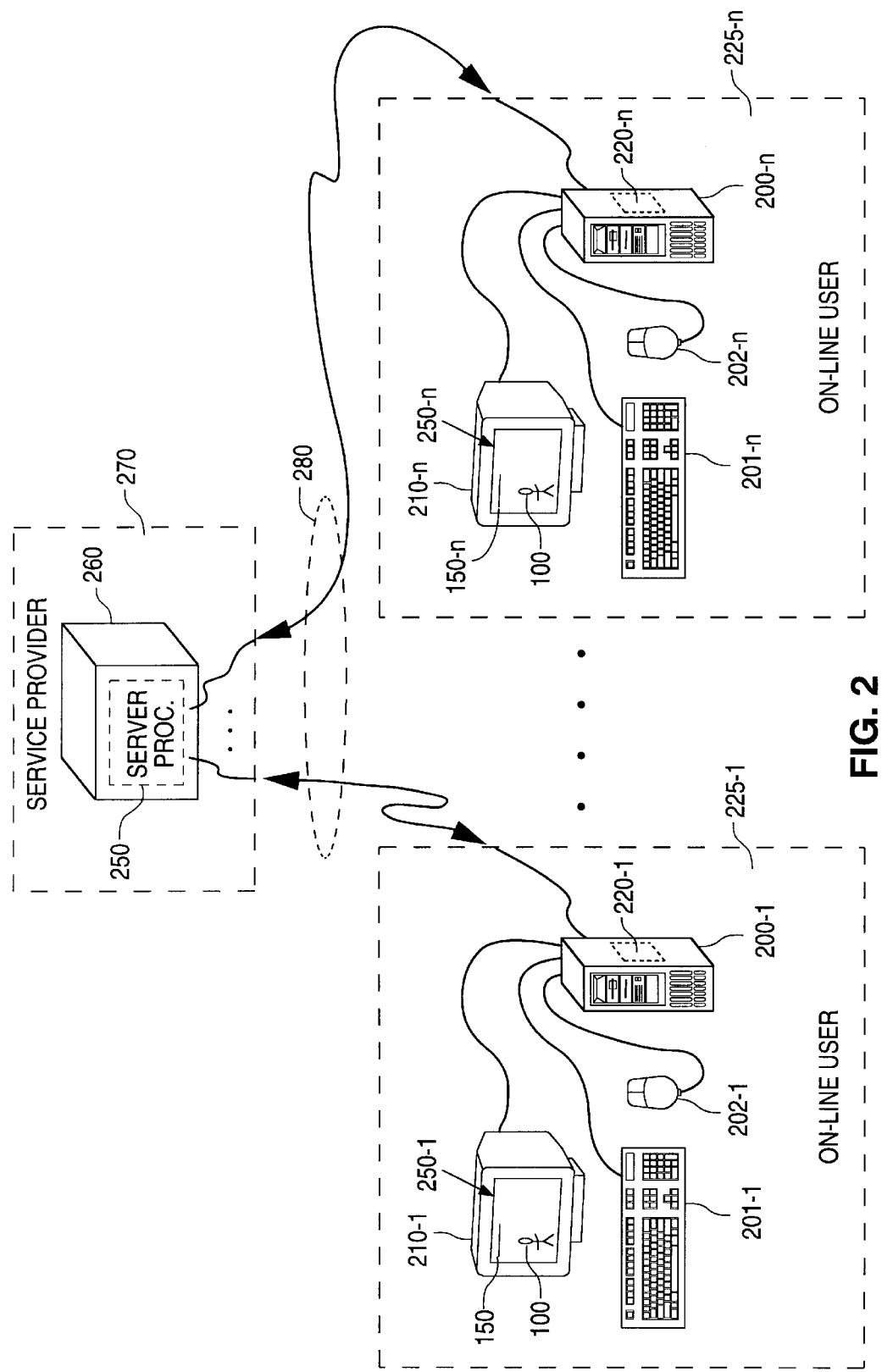
FIG. 2 is a diagram of the apparatus used by the on-line users to execute the client processes that generate the memory structures and graphic user interfaces of this invention, and to select options presented in the graphic user interface, as well as the network over which the client processes send and receive messages from a server computer executing the server processes of this invention.

As illustrated in FIG. 2, a plurality of n on-line users communicate with server computer 260 over network 280. Server computer 260 maintains an object data base that stores values that determine the state and location of a particular virtual object instance.

The particular configuration of network 280 and the physical transfer of messages of over network 280 are not an essential feature of this invention. In view of this invention, the various processes and object classes can be implemented in a wide variety of client-server configurations over a variety of different network configurations. For an IBM PC compatible computer with an Intel 80486 microprocessor, an Intel Pentium microprocessor, or an equivalent microprocessor, the client software of this invention typically runs under one of the Microsoft Windows interfaces, e.g., Windows 3.11 or Windows 95, in combination with the DOS operating system. A typical server computer is a Sun MicroSystems of Mountain View, Calif., Sun SparcCenter 2000 or equivalent running with a Sun Microsystems Sun Solaris 2.4 or later operating system, that is sometimes called the Sun OS 5.4 operating system.

The virtual world is made up of a collection of objects that are instances of programming code, images, sounds or other data that are packaged and presented to on-line users 225-1 to 225-n as a single virtual world. On-line user 225-1, where i represents any one of 1, 2, . . . , n, n, through her avatar can pick up, carry, and manipulate the portable virtual objects in the virtual world. Virtual objects are persistent, i.e., the objects stay in the virtual world between on-line sessions, and have consistent behavior.

Each virtual object is aware of its surroundings and changes its behavior to suit the situation. For example, selecting floor object 130 of V-Mart locale 150 presents a pop-up menu with choices such as Walk to here; Go this way; and Go that way, if avatar 100 is not holding a portable virtual object in his hand. However, if avatar 100 is holding a portable virtual object in his hand, there is an additional menu choice of Put here. This is because floor object 130 checks to see if avatar 100 is holding a portable virtual object that can placed, i.e., put, at the selected point on floor object 130.

Token objects, e.g., token object 110, are a medium of exchange within the virtual world of this invention, as explained more completely below. The value of token object 110 is determined by the denomination of token object 110. While each token object is shown as a single object, each token object can represent one or more tokens based on the denomination.

Token objects can be exchanged freely while in the virtual world, but token objects are not tied to any real world currency. To prevent counterfeiting, all token object creation is controlled by one of server processes 250 (FIG. 2) executing on server computer 260 maintained by service provider 270. On-line users 225-1 to 225-n cannot freely create new tokens.

Token object 110, sometimes referred to as token 110 or tokens 110, can be carried, deposited in virtual ATM object 320 (FIG. 3A), deposited in virtual vending machine 120 (FIG. 1), used to purchase portable virtual objects from machines or shops, or given to other avatars. Token 110 can also be dropped, taken, or stored in a container. When tokens are paid, the client process performs an internal operation called "split" where the value of token 110 in the hand of avatar 100, or in pocket 105 of avatar is divided between what to pay and what goes back into his hand, or pocket 105. The split operation typically leaves a token of the denomination required for the transaction in the hand of avatar 100.

Exchange of token objects or any other portable virtual objects can be mediated by one of server processes 250, and so theft or fraud are difficult. However, approval for transactions between avatars is not controlled by server processes 250 or by service provider 270. On-line users 225-1 to 225-n are free to transact exchanges of either tokens or other portable virtual objects through their respective avatars without needing the approval or intervention of service provider 270.

Token object 110 can be exchanged for other portable virtual objects using virtual vending machine objects. Each of these virtual vending machines display portable virtual objects for sale. For example, gift virtual vending machine object 120 is an instance of a vendroid class of this invention. Gift virtual vending machine object 120 distributes a virtual gift object, e.g., virtual gift object 121, in exchange for deposit of a token object of a specified denomination.

As explained more completely below, when avatar 100 chooses a purchase from virtual gift vending machine 120 using the data input devices, virtual gift vending machine 120 takes a token object 105 directly from the avatar's hand and places the purchase directly into the avatar's hand. Virtual vending machine objects perform any required token splits, if the denomination of token object 110 in the avatar's hand is more than the purchase price, and put a taken object for the outstanding balance into avatar's pocket 105 when delivering the purchased object. At all times, avatar 100 has direct control over the portable virtual object in his hand, and so theft by grabbing from the hand of avatar 100 is not possible.

One of server processes 250 maintains a bank balance for avatar 100, and for all other avatars in the virtual world. The back balance for avatar 100 is stored only on server computer 260 and is only available to avatar 100.

Token objects are removed from the bank and put into circulation by virtual ATM object 320, that is an instance of an ATM class. A token object is an instance of a token class. Virtual ATM object 320 allows a user to obtain a balance, deposit tokens, and withdraw tokens, as explained more completely below. When avatar 100 interacts with virtual ATM object 320, the bank balance of avatar 100 is updated. When avatar 100 requests a withdrawal, ATM object 320 gives avatar 100 a token object valued at the withdrawal amount selected by avatar 100.

Prior to a deposit, or at any time avatar 100 has a token in his hand, token object 110 can be split into two token objects whose total value equal the value of the original token object. In the embodiment described more completely below, to split a token, avatar 100 places the token in pocket 105, and subsequently retrieves a token of the desired denomination from pocket 105. All token object creation or splits are mediated by a server process on computer 260 to prevent creation of fake token objects.

Token objects can be exchanged with other on-line users for goods or services, given as gifts, or left lying around, like dropped cash. Unlike cash, token objects cannot be taken by another avatar without the is consent of the avatar holding the token object. However, any avatar is free to get a token object lying on the ground.

In general, one avatar object cannot take a portable virtual object from a hand of another avatar object. However, if one avatar object can convince another avatar object to place the portable object on floor 130 (FIG. 1), for example, the avatar can get the object from the floor without the consent of the other avatar. Thus, like the real world, thievery and/or cons are possible in the virtual world of this invention, with the exception that a virtual object cannot be take from the hand of an avatar.

In this embodiment, avatar 100 accrues tokens according to on-line connect time of on-line user 225-1, i.e. the on-line user 225-1 is paid to be in the virtual world. This use of connect time to generate base income promotes community building by giving on-line user 225-1 an incentive to be in the virtual world. While in the virtual world, interaction with the other avatars helps to create community. By providing token objects, the richness and complexity of interaction is enhanced.

Figure 3A:
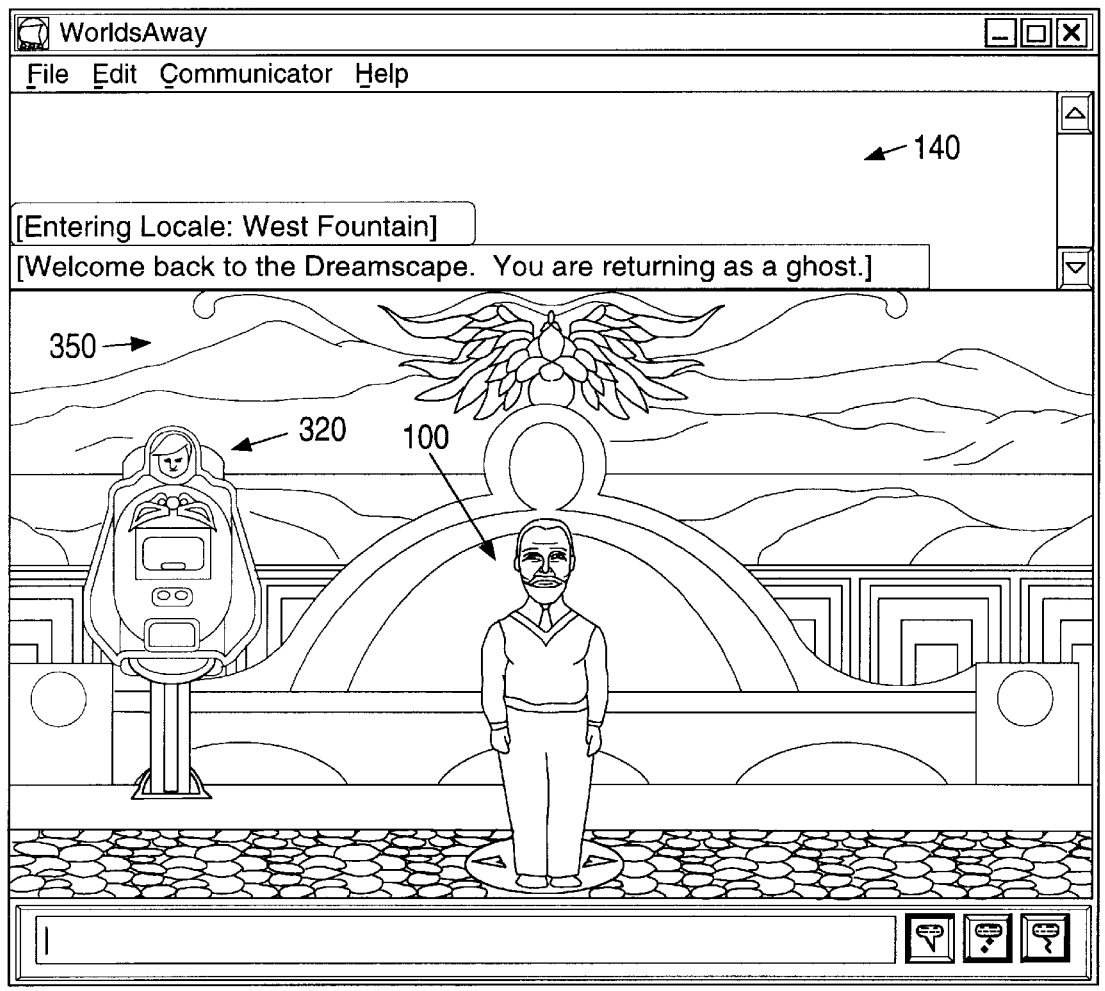
FIG. 3A is a graphic user interface of another locale in the virtual world that includes an ATM object of this invention, and an avatar of this invention.

When on-line user 225-1 enters the virtual world of this invention, the time of initial connection is recorded in the instance of the user's avatar data on server computer 260. As indicated above, the bank balance of avatar 100 is queried by using an ATM object 320 in a virtual world west fountain locale 350 (FIG. 3A). In response to the query by avatar 100, an ATM balance client process in client processes 220-1 sends an ATM balance request message to a server process in server processes 250.

In response to the request message, the server process calculates the number of tokens to add to the bank balance of avatar 100 by subtracting the time of initial connection from the current time and giving one token per defined unit, e.g., five minutes, of the connect time. The new bank balance is stored on the server, and the initial connect time information is changed to the balance request time so that only new connect time is included in future transactions.

The server process sends the updated balance in a reply message to the client process, that in turn displays the bank balance to avatar 100. The server process also sends a notice message to any other on-line user that has an avatar in the same locale as avatar 100. The notice message launches a client notify process on the computer of the other on-line users that shows avatar 100 using ATM object 320. However, these client processes do not receive the bank balance of avatar 100.

The bank balance is also updated at the time the on-line user disconnects from server computer 260 to add tokens accumulated during the preceding connect session. When the user returns to the world, this updated bank balance is available for query.

The avatars, virtual token objects, virtual ATMs, and virtual vending machines, as indicated above are implemented using object-orientated concepts, in this embodiment. Thus, each object is an instance of a class and typically is stored in a memory of the on-line user's computer 200-i for access by client processes, and in a server computer 250 for access by server processes. The specific embodiment of these objects that is described more completely below is illustrative only and is not intended to limit the invention to classes that include the particular attributes and methods described below.

In the virtual word computer process of this invention, an avatar 100 is an animated two-dimensional graphical character that represents an on-line user. Avatar 100 can walk, communicate with another avatar via talk, think, and ESP processes, pick up, put down and use certain objects, use machines, and change its appearance. Avatar 100 also has different moods and gestures.

The interactions between avatars includes the ability to conduct economic transactions. In this embodiment, avatar 100 communicates via a communication bubble on screen display 150. However, as audio communications improve over networks such as the Internet, some level of audio communications could be added.

Avatar 100 can also change or enhance its appearance by using a body changer machine to transform the body of avatar 100 to another one of the available body types. At any given instant, avatar 100 can have only a single body. In contrast, avatar 100 can possess any number of heads, but only one head at a time can be mounted on the body, i.e., worn. Avatar 100 must purchase the heads from a virtual head vending machine object, or obtain the head from another avatar. In this embodiment, an avatar starts in the virtual world with a female gender and a neutral mood. However, on-line user 225-1 selects a gender of avatar 100 and one of three body styles, average, athletic, and chubby, for that gender. The body style can be changed at any time by using the body changer machine.

The mood of the avatar is selectable by the user at any time. The avatar starts in the world in the neutral mood, e.g., a happy mood. The mood changes are modal—the selected mood remains on the avatar's face until the mood is changed by the user. In this embodiment,.the plurality of moods includes neutral, mad, sad, and glad.

In general, the computer processes used to implement this invention are independent from the pictures retrieved by the computer processes for the animations associated with the various gestures and actions of avatar, and associated with other objects in the virtual world. This permits changing the visual characteristics displayed in the graphic user interface without making changes to the computer methods described herein.

As explained above, each locale in the virtual world can accommodate a predefined number of avatars. However, in addition to the avatars in a locale, a locale can support essentially an unlimited number of lurkers.

Figure 3B:
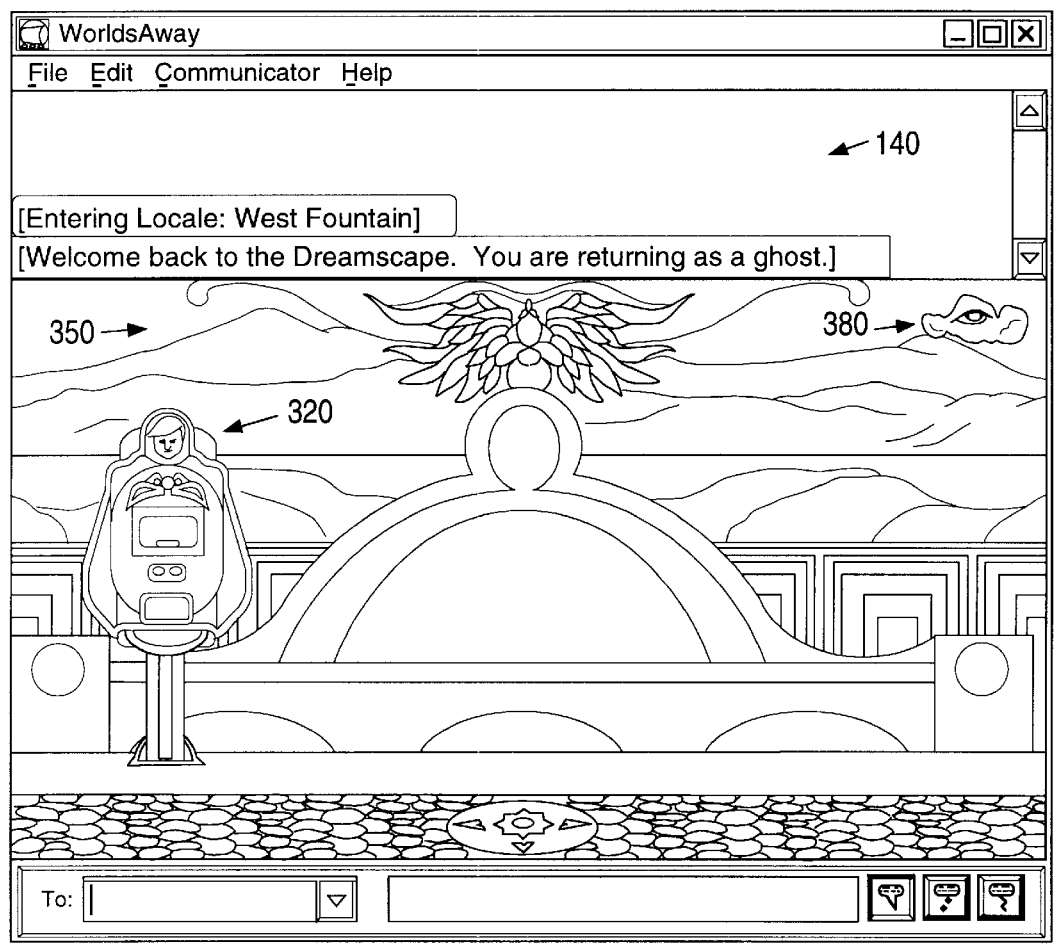
FIG. 3B show the graphic user interface of FIG. 3A when the avatar has dematerialized into a ghost icon.

One aspect of text-based on-line community environments, such as newsgroups or chatrooms, is the potential for some participants to 'listen' to the discussion, without contributing. This phenomena is so prevalent, it has been given its own term—"lurking". Lurkers, while they do not actively contribute to the discussion in real time, do change the dynamic of on-line communities by causing the simplest exchanges between individuals to exist in a public space. While participants can choose to take any discussion to a private venue, such as in e-mail or off-line, the relative invisibility of lurking can cause it to be forgotten. One opportunity that the graphical user interface of this invention provides is to visually represent lurkers to provide a reminder that participants other than the active ones are "listening in". In the virtual world of this invention, a lurker is represented in a locale by a ghost object. An icon is present, i.e, an eye-in-the-sky 380 (FIG. 3B), in a locale, such as locale 350, whenever a ghost object, or ghost objects are present.

Ghost objects have anonymity, i.e. their names are not known to avatars of the locale, and have limited interaction choices. A ghost object cannot talk or think to other avatars. A ghost object retains the ability to transmit private "ESP" messages to other avatars.

Ghost object 380 also enables other important capabilities. To promote personal, one on one type relationships which encourage a sense of community, most locales have limits to the number of avatars that can be physically present at one time. This also prevents over-crowding of the visual interface. While this limitation is important to the social dynamic, and necessary to prevent a mob scene from overloading the visual interface, it would be frustrating to completely prevent new users from entering a full locale, i.e., a locale that contained the maximum number allowed of physical avatar objects. An avatar entering a full locale automatically becomes a ghost in the locale, and may then choose to remain and observe the activity occurring. When the number of materialized avatars drops below the limit, a ghost may choose to join in as a materialized, physical avatar in the locale, or to remain as a ghost and continue to lurk.

Another aspect of interpersonal relationships in the virtual world community is that one participant may become uncomfortable with the attention another person is giving them. Harassing behavior should not force the target of the harassment to abandon or flee the locale for relief. By allowing an avatar to become a ghost, the on-line user may continue to participate, albeit in a limited way, while using ESP to request aid in dealing with the harassment. A ghost may also move from locale to locale while maintaining anonymity, so as to "lose" the harasser. The characteristics of ghost object 380 are described more completely below.

In this embodiment, when on-line user 225-1 points at avatar 100 (FIG. 4A) using mouse 202-1, and then depresses the left mouse button, a signal is generated by mouse 202-1 that is interpreted by a client process executing in computer 200-1 that builds menu 401. In this embodiment, menu 401 lists seven options that are available to on-line user 225-1. The options are given in Table 1.

TABLE 1

Menu When Pointing at Avatar with Hands Empty

<Avatar Name>

| Gesture | > |
| Turn | > |
| Get From Pocket | > |
| Remove | |
| Status | > |
| Become a Ghost | |
| Tell Me About . . . | |

Figure 4A:
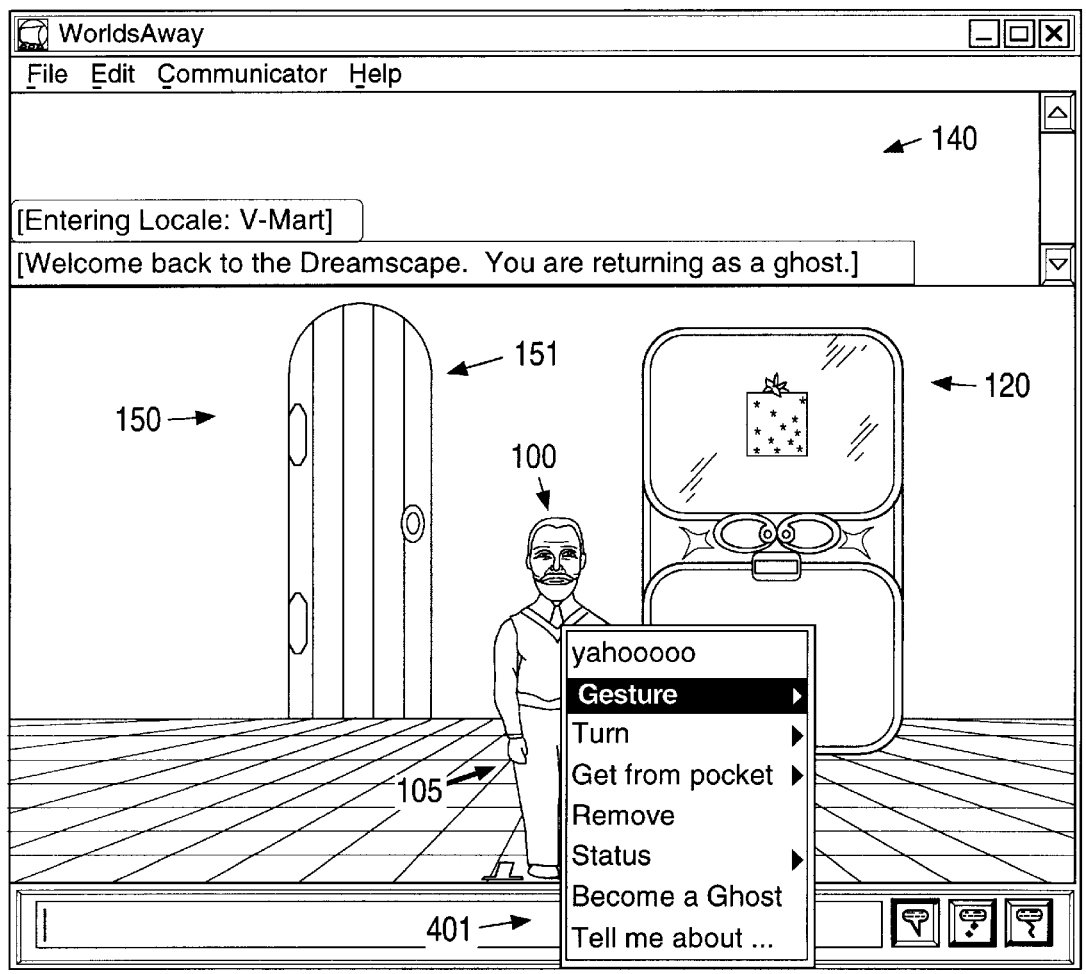
FIG. 4A illustrates a pop-up menu in the graphic user interface when the on-line user points at the avatar.

Thus, in the embodiment of FIG. 4A, the name of avatar 100 is yahooooo. Menu items Gesture, Turn, Get From Pocket, and Status each include a right pointing marker, which mean that if on-line user 225-1 points at the menu item, a menu is generated to the right of menu 401, that is called a pull right menu.

In menu 401, menu item Get From Pocket is displayed only when avatar 100 has one or more objects in pocket 105 and nothing in his hand. If avatar 100 has an object in his hand, menu item Get From Pocket is replaced with menu item Put In(not shown). Menu item Put in also has a right pointing marker. Upon pointing at selection of menu item Put In, a right-pull menu is generated that lists pocket 105 and any containers stored in pocket 105 in which avatar 100 can place the object in his hand. Menu item Remove is displayed only when avatar 100 is wearing a head.

Figure 4B:
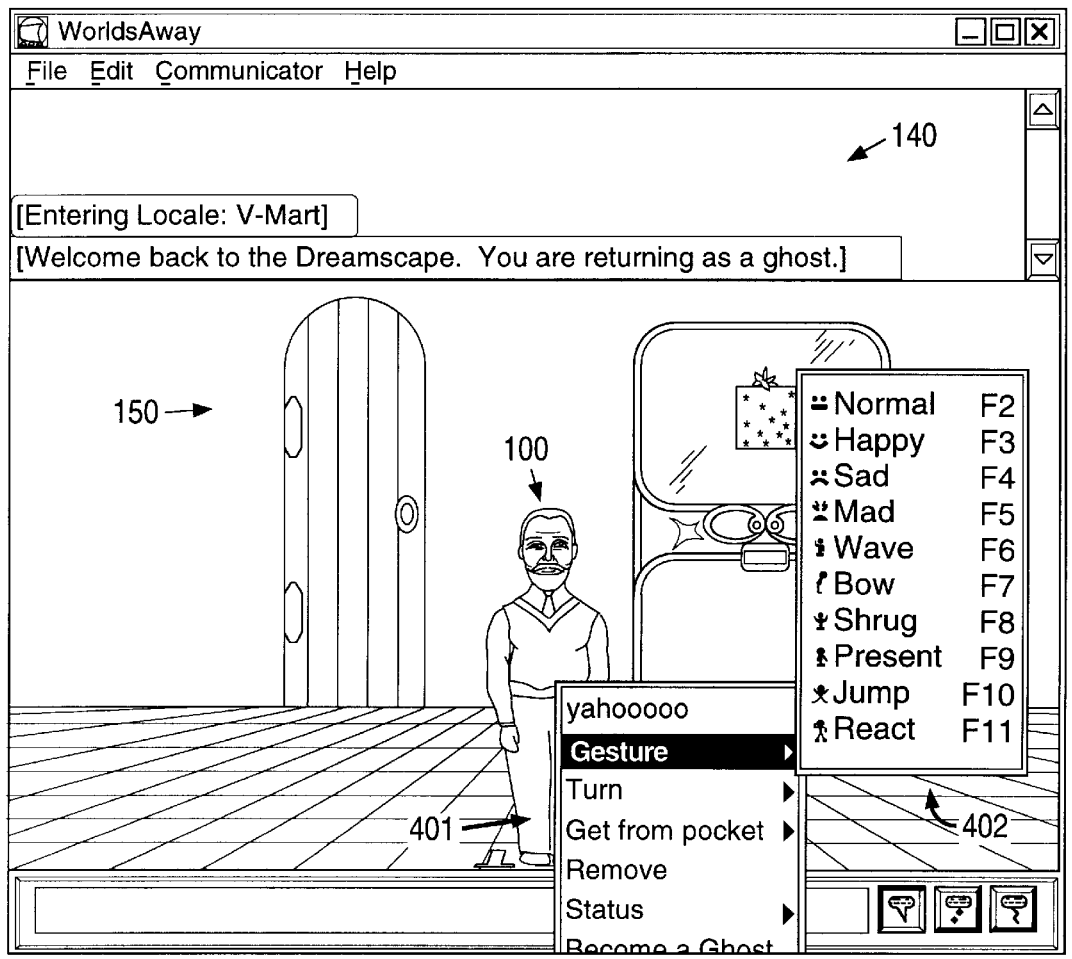
FIG. 4B illustrates a right pull menu in the graphic user interface when the on-line user points at menu item Gesture in the pop-up menu of FIG. 4A.

When on-line user 225-1 moves the mouse to point at menu item Gesture with the mouse button depressed, a second menu 402 is displayed, as illustrated in FIG. 4B, that was generated by the client menu process. If the on-line user 225-1 releases the mouse button while the cursor is pointing at menu item Gesture, no action is taken and the pop-up menu is dismissed. Conversely if on-line user 225-1 points at one of the items in menu 402 and releases the mouse button, the selected gesture is implemented, as described more completely below.

Menu 402 includes ten options as listed in Table 2.

TABLE 2

Gesture Pull-Right Menu

Normal
Happy
Sad
Mad
Wave
Bow
Shrug
Present
Jump
React

Notice that each menu item in menu 402 also includes an icon that graphically represents the gesture for that icon. In this embodiment, on-line user 225-1 selects a particular gesture by either selecting the corresponding menu item, or by pressing the function key of keyboard 201-1 that is listed at the right of the menu item. Thus, gestures are actions that are initiated by the user via a function key or the gesture pull-right menu. The purpose of gestures is to allow avatar 100 to express feelings and emotions in a graphical manner that is visible to other avatars in the locale.

Thus, in this embodiment, to change the mood of avatar 100, on-line user 225-1, points at avatar 100 and manipulates mouse 202-1 so that menus 401 and 402 are displayed. On-line user 225-1 selects a menu item, or alternatively points at avatar 100 and presses one of function keys F3 to F5.

Figure 5:
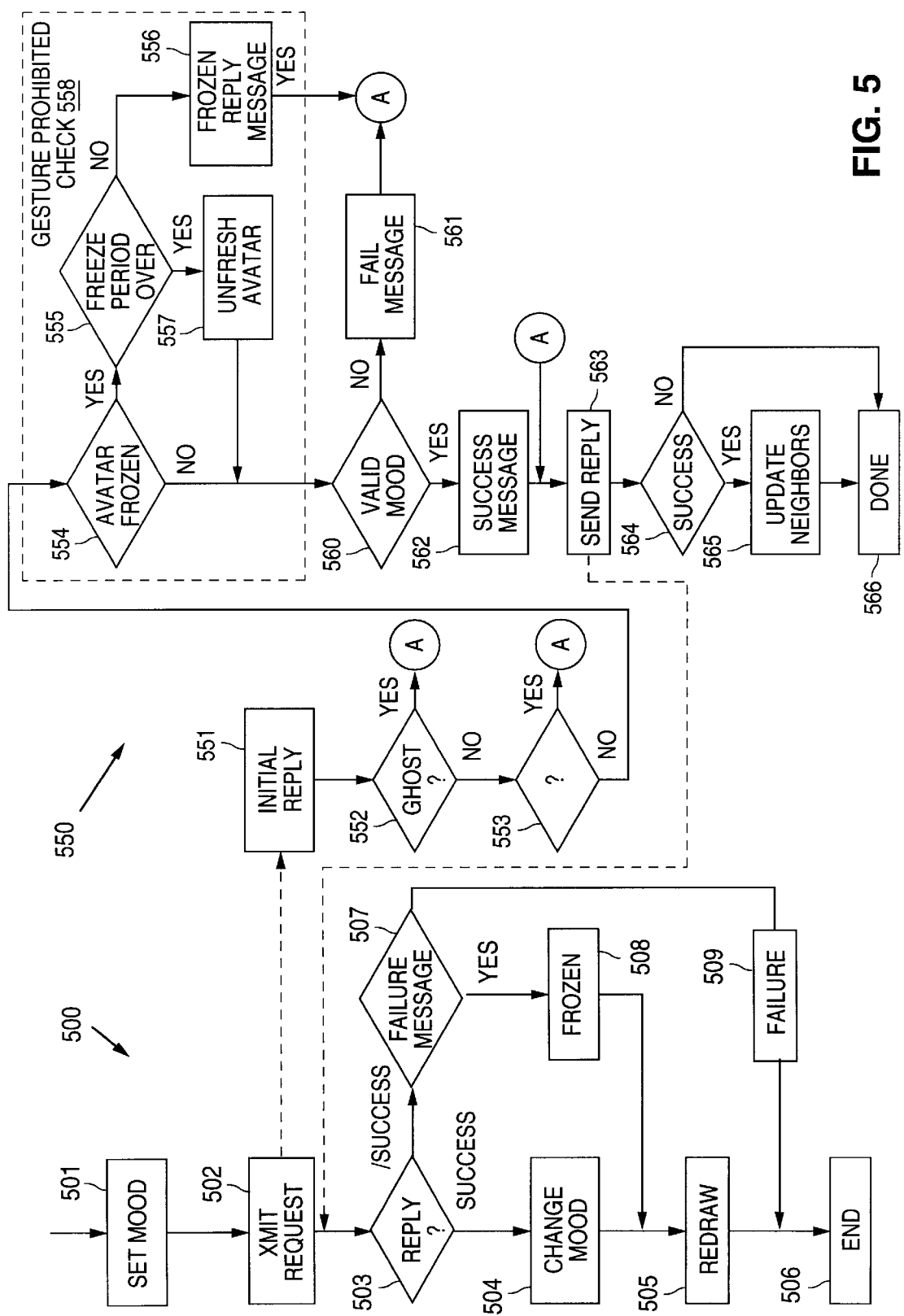
FIG. 5 consists of a process flow diagram for one embodiment of a client mood change command method of this invention and a process flow diagram for one embodiment of a server mood change perform method of this invention.

Computer 220-1 interprets the signal generated by the menu selection, and provides a signal to the client menu process that generated menu 402 to indicate the menu item selected. In response to the signal, the client menu process launches a client mood change method 500 (FIG. 5A) with the selected mood as an argument. A similar operation is performed when the function key is pressed.

In client mood change method 500 (FIG. 5A), set mood process 501 initializes mood to the mood specified as the argument in the command. Set mood process 501 transfers processing to transmit request process 502.

Transmit request process 502 sends an avatar change mood request message to server computer 260 for avatar 100, and requests a standard reply message. The avatar change mood request message includes mood as an argument. Process 502 transfers processing to reply message check 503 that in turn waits for a reply message from server computer 260.

In response to the avatar change mood request message from method 500, that is executing as a client process on computer 200-1, server computer 260 launches avatar change mood perform method 550 (FIG. 5B) as a server process. In initialize reply message operation 551, a success field in the reply message is set to failure. Operation 551 transfers to ghost check 552.

If avatar 100 is currently a ghost, as explained more completely below, ghost check 552 transfers to send reply process 563 because ghosts cannot change moods, and otherwise to object is actor check 553. If the object pointed at is not avatar 100, i.e, the avatar representing the on-line user, check 553 transfer processing transfer to send reply process 563 and otherwise to avatar frozen check 554. Check 553 assures that only on-line user 225-1 can change the mode of avatar 100.

In this embodiment, the instance of avatar 100 on server computer 260 includes a permission flags field (perm_flags in Table 33). One embodiment of the permission flags is defined in Table 3.

TABLE 3

Avatar Permission Flags

| Flag | Permission when flag is set. |
| --- | --- |
| AVATAR_PERM_FIDDLE | Use fiddle wand. |
| AVATAR_PERM_PROMOTE | Promote/demote other avatars. |
| AVATAR_PERM_MUTE | Forbidden to speak, think, or ESP. |
| AVATAR_PERM_FREEZE | Forbidden to move, gesture, exit, etc. |

Avatar frozen check 554 determines the state of avatar permission flag AVATAR_PERM_FREEZE in the permission flags field for the instance of avatar 100 on server computer 260. If avatar permission flag AVATAR_PERM_FREEZE is set, check 554 transfers to freeze period over check 555, and otherwise to valid mood check 560.

Freeze period over check 555 determines whether the current date and time is greater than the entry in field freeze_until_date (See Table 33.) in the instance of avatar 100 on server computer 260. If the current date and time is less than, or equal to the entry in field freeze_until_date, check 555 transfers processing to generate frozen reply message process 556, and otherwise to unfreeze avatar process 557.

If avatar 100 is still frozen, generate frozen reply message process 556 fills a character message buffer with a message indicating how much longer avatar 100 will remain frozen. Process 556 then sets the success field in the reply message to FAILURE_MESSAGE to indicate that the reply message includes a failure message, and sets the failure message field in the rely message to the character message buffer. Process 556 transfers processing to send reply process 563.

If the current time is after the time specified for avatar 100 to remain frozen, unfreeze operation 557 generates a notice message that avatar 100 is unfrozen, sets field freeze_until_date to zero, and clears avatar permission flag AVATAR_PERM_FREEZE. Unfreeze operation 557 sends a message to server 260, to on-line user computer 220-1 and to each other on-line computer that includes an instance of avatar 100, i.e., is displaying avatar 100, so that the instance of avatar 100 is updated on each of the computers to indicate that avatar 100 is no longer frozen. Unfreeze operation transfers processing to valid mood check 560.

Herein, checks 554 and 555, and operations 556 and 557 are a specific embodiment of a gesture prohibited check 558. In general, a check equivalent to gesture prohibited check 558 is performed by a server method of avatar object 100 for each gesture controlled by avatar permission flag AVATAR_PERM_FREEZE prior to the server method determining whether the avatar gesture perform command is valid.

Valid mood check 560 determines whether the mood sent to method 550 is any one of the plurality of moods HAPPY, GLAD, SAD, and MAD. If the mood is one of the allowed moods, check 560 transfers to generate success message operation 562 and otherwise to generate failure message operation 561.

Generate success message operation 562 sets the success field in the reply message to SUCCESS. Operation 562 also sets an actor activity to the mood sent to method 550, and transfers to send reply message process 563. Generate failure message operation 561 sets the success field in the reply message to FAILURE and transfers to send reply message process 563.

Send reply message 563 transmits the reply message to client mood change method 500 and transfers processing to success check 564. Success check 564 determines whether the success field in the reply message was set to SUCCESS. If the success field was set to SUCCESS, check 563 transfers to update neighbors operations 565 and otherwise to done operation 566.

Update neighbors operations 565 first declares a avatar change mood notice message as a notice message and then initiates generation of the notice message. The mood field of the notice message is set to mood and the message is sent to each on-line user that has an avatar in the same locale as avatar 100 with the identification number of the avatar for which the notice message applies. Operation 565 transfers to done operation 556.

In response to the notice message from server computer 260, each notified on-line computer 200-i that is displaying avatar 100 launches an avatar change mood notify method. This method first changes the animation of the specified avatar to the appropriate mood in a buffer and then uses the data in the buffer to redraw avatar 100 on the display screen of on-line computer 200-1. Thus, this method includes a change mood process and a redraw process.

When reply check 503 (FIG. 5A) in method 500 receives the reply message from server method 550, reply check 503 determines whether the success field in the reply message is set to SUCCESS. If the success field is set to SUCCESS, processing transfers from check 503 to change mood operation 504 and otherwise to failure message check 507.

Change mood operation 504 changes the animation of the specified avatar, e.g., avatar 100 to the appropriate mood in a buffer memory for display 250-1, and transfers processing to redraw operation 505. Redraw operation 505 redraws the screen display so that the mood of avatar 100 in this example is changed. Operation 505 transfers to end method operation 506 which cleans up and closes method 500.

When processing transfers to failure message check 507, check 507 determines whether the success field of the reply message is set to FAILURE_MESSAGE. If check 507 is true, processing transfers to error handle frozen message operation 508 and otherwise to handle error operation 509.

Operation 508 writes the message in the reply message and then terminates method 500 in an error mode. Similarly handle error operation 509 terminates method 500 in an error mode.

One embodiment of methods that allow an on-line user to change the mood of an avatar is presented in Appendix A, and is incorporated herein by reference. Table 4 identifies the methods in Appendix A that are class specific methods used by class avatar.

TABLE 4

Avatar Class Specific Methods for Changing Avatar Mood

| Process Location | Name |
| --- | --- |
| client | method avatarBuildMenus_command |
| client | method avatarChangeMood_command |
| client | method avatarChangeMood_notify |
| server | method avatarChangeMood_perform |

If on-line user 225-1 selects a gesture from menu 403 instead of a particular mood, a command is generated that launches an avatar gesture command method as a client process on on-line user computer 200-1. This method is similar to method 500 except the requested gesture replaces the requested mood in method 500. The avatar gesture command method sends a avatar gesture request message to server computer 260 with the gesture and the direction the avatar is facing as parameters.

In response to the avatar gesture request message, server computer 260 launches an avatar gesture perform method. This server process is substantially similar to method 550 with a gesture replacing the mood. Avatar gesture perform method first performs the same frozen check process as in method 550, and if the avatar is not frozen, checks whether the requested gesture is a valid gesture. If the gesture is valid, a reply message is sent to the client process, and the neighbor on-line users are subsequently sent a avatar gesture notice message that in turn launches an avatar gesture notify method on each neighbor on-line computer 200-i displaying the avatar. The avatar gesture notify method plays an appropriate gesture animation and redraws the screen display.

When the client computer receives the reply message, if the reply message indicates SUCCESS, avatar gesture command method plays an animation for the gesture and then redraws the screen to present animation. One embodiment of methods used to implement gestures is presented in Appendix A, and is incorporated herein by reference. Table 5 identifies the methods in Appendix A that are class specific methods used by class avatar.

TABLE 5

Avatar Class Specific Methods for Gestures by an Avatar

| Process Location | Name |
| --- | --- |
| client | method avatarBuildMenus_command |
| client | method avatarGesture_command |
| client | method avatarGesture_notify |
| server | method avatarGesture_perform |

The choreography for one embodiment of the various gestures is defined in Table 6.

TABLE 6

Gesture Choreography Specification

| Gesture | Actions |
| --- | --- |
| Wave | begin wave |
|  | waving |
|  | end wave |
| Bow | bow |
|  | bow return |
| Shrug | shrug |
|  | shrug return |
| Present (Arm Out) | extend-arm out, hand closed |
|  | extend-arm out, hand closed return |
|  | extend-arm out, hand flat |
|  | extend-arm hand flat return |
| Jump | jump up |
| React (Stomp) | stomp external leg |
|  | stomp internal leg |

Figure 4C:
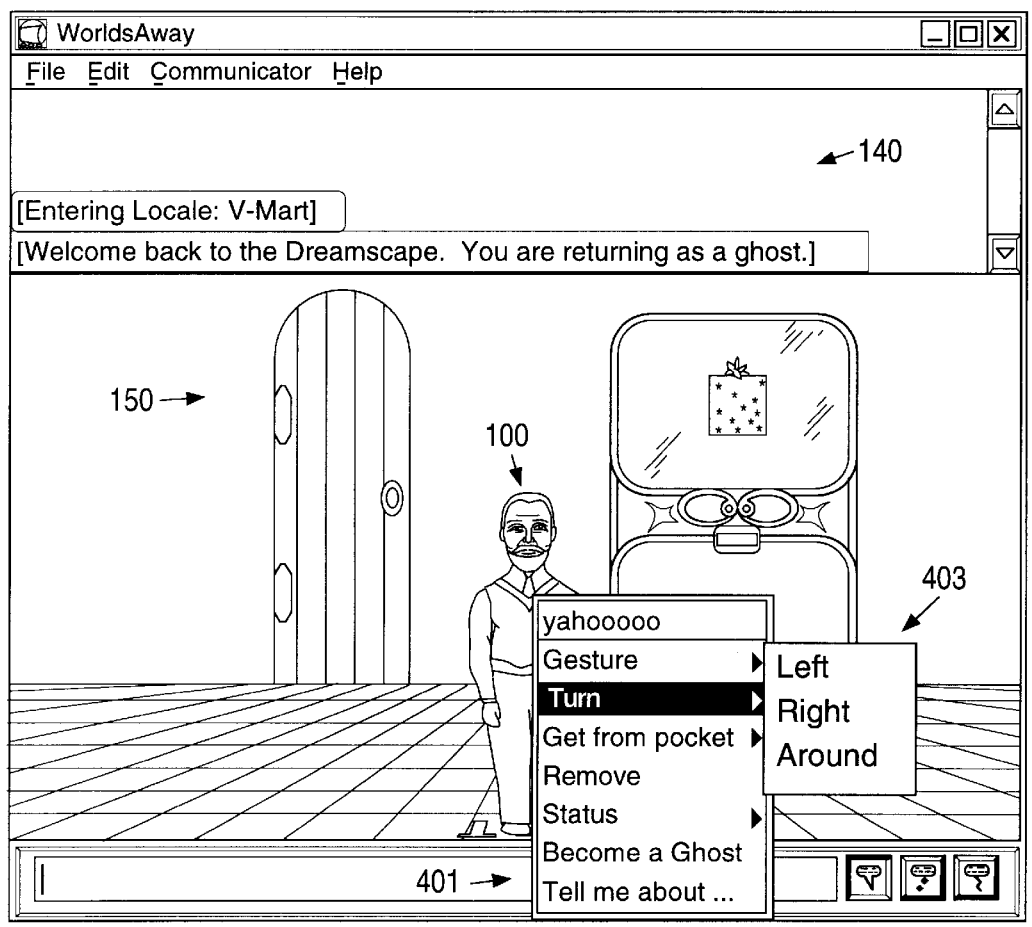
FIG. 4C illustrates a right pull menu in the graphic user interface when the on-line user points at menu item Turn in the pop-up menu of FIG. 4A.

To change the direction avatar 100 is facing, on-line user 225-1 points at menu item Turn and a third pop-up menu 403, as illustrated in FIG. 4C, is generated. Menu 402 includes three options as listed in Table 7.

TABLE 7

Turn Pull Right Menu

Left
Right
Around

The action of avatar 100, when one of these actions is selected, is to turn the direction selected. Turning around means a 180° turn in this embodiment. The sequence of interaction between client and server processes is similar to that described above for a mood change with the action modified to a turn. One embodiment of methods used to implement turns is presented in Appendix A, and is incorporated herein by reference. Table 8 identifies the methods in Appendix A that are class specific methods used by class avatar.

TABLE 8

Avatar Class Specific Methods for Turns by an Avatar

| Process Location | Name |
| --- | --- |
| client | method avatarBuildMenus_command |
| client | method avatarFacing_command |
| client | method avatarFacing_notify |
| server | method avatarFacing_perform |

Figure 4D:
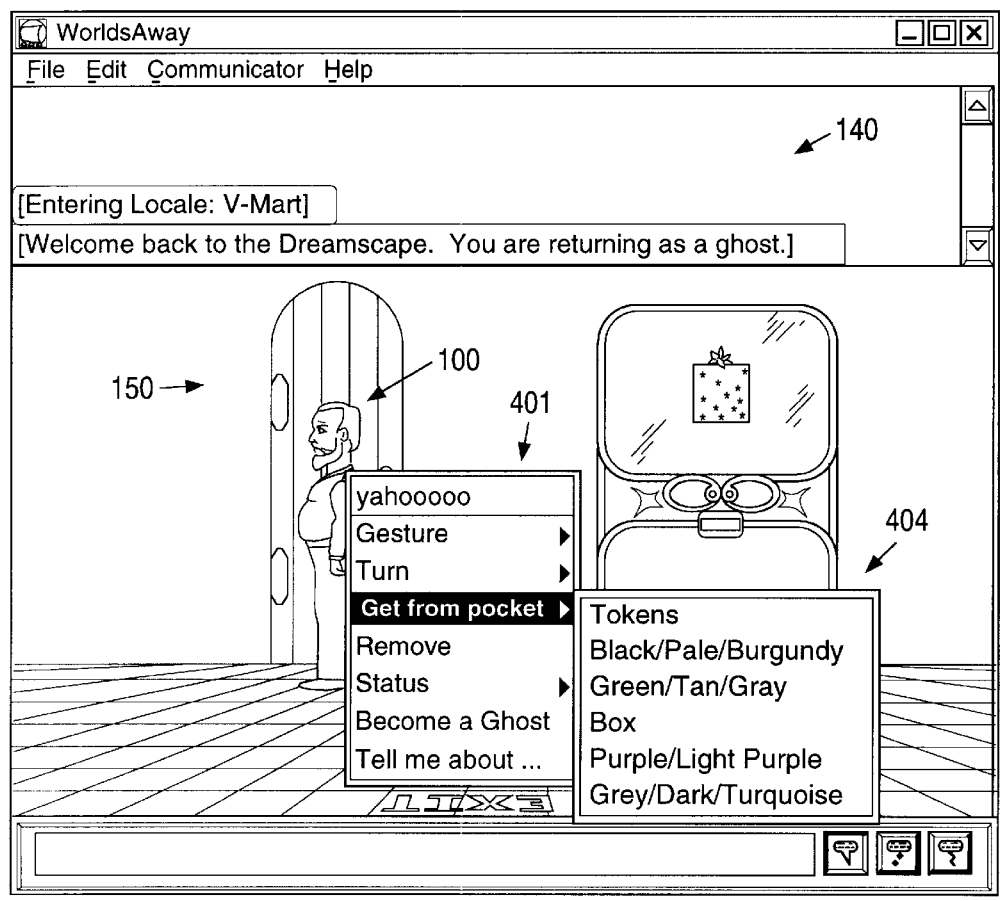
FIG. 4D illustrates a right pull menu in the graphic user interface when the on-line user points at menu item Get from Pocket in the pop-up menu of FIG. 4A.

To retrieve a virtual object from pocket 105 of avatar 100 when there is nothing in the hands of avatar 100, on-line user 225-1 selects menu item Get from pocket. When on-line user 225-1 selects menu item Get from pocket by pointing at menu item Get from pocket a fourth pop-up menu 404, as illustrated in FIG. 4D, is generated. Menu 404 lists the virtual objects stored in pocket 105.

Pocket 105 includes a plurality of slots to hold virtual objects. In the embodiment of class avatar in Appendix A, avatar 100 has a total of ten storage locations. The first storage location is in the hands of avatar 100 and the remainder are in pocket 105. The first storage location in pocket 105 is reserved for an avatar head. The second storage location is reserved for a virtual pad document object, and the third storage location is reserved for tokens. The remaining storage locations are for virtual objects owned by avatar 100. A number identification, sometimes referred to as noid, for the virtual object is stored in the storage location, i.e., the slot in pocket 105.

At this time, as shown in FIG. 4D, avatar 100 has six virtual objects in pocket 105. The virtual objects are a token object, a box object, and four spray paint can objects for which the colors are listed. An avatar can change its skin color, the color of the clothes on its upper torso, and the color of the clothes on its lower torso using a spray paint can object. If the box object in pocket 105 contained other virtual objects, avatar 100 could store more than the six virtual objects in his pocket.

When on-line user 225-1 releases the mouse button while pointing at one of the entries in menu 404, computer 220-1 interprets the signal generated by the menu selection, and provides a signal to the client menu process that generated menu 404 to indicate the menu item selected. In response to the signal, the client menu process issues a standard get command message with the selected object, the avatar, and any object in the avatar's hand as arguments. A similar operation is performed when the function key is pressed.

Figure 6:
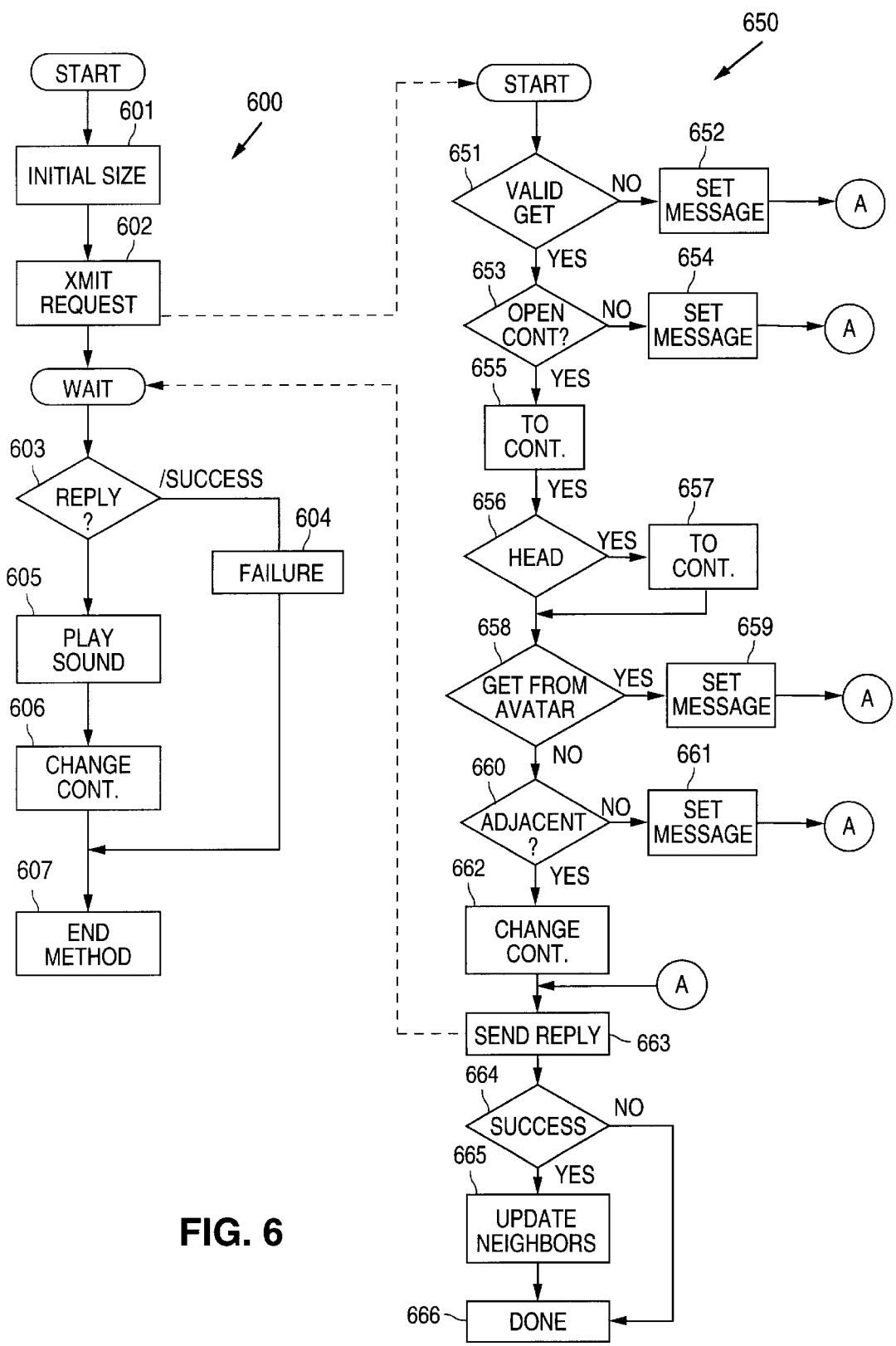
FIG. 6 consists of a process flow diagram for one embodiment of a client pocket get command method of this invention and a process flow diagram for one embodiment of a server get object command method of this invention.

In response to the standard get message, an avatar pocket get from command method 600 is launched on computer 200-1 as a client process. In avatar pocket get from method 600 (FIG. 6A), initializing operation 601 sets the actor to the avatar and transfers to transmit request operation 602.

Transmit request operation 602 sends an avatar get object request message to server computer 260 for avatar 100, and requests a standard reply message. The avatar get object request message includes the virtual object selected as an argument, and the action required to get the virtual object, i.e., FROM_POCKET. Process 602 transfers processing to reply message check 603 that in turn waits for a reply message from server computer 260.

In response to the avatar get object request message from method 600, that is executing as a client process on computer 200-1, server computer 260 launches avatar get object perform method 650 as a server process. In this embodiment, get object perform method 650 (FIG. 6B) is executed for a variety of virtual objects, i.e., each time an avatar gets a virtual object. Consequently, method 650 considers actions other than just those associated with getting an object from pocket 105.

In general, server method 650 is called when a virtual object is being pointed at, and a get action is specified for the avatar representing the on-line user. Possible get actions include not only a get from pocket, but also a get from shoulders, a get from ground, a get from a shelf and a get from a table. For a get action to be successful, the virtual object being pointed at cannot be held by another avatar, and the actor avatar, i.e., the avatar issuing the get action, cannot have a virtual object in his hands.

Thus, valid get check 651 determines whether the requested virtual object is a valid object; the requested virtual object is immobile; the hands of avatar 100 are full, and avatar 100 is a ghost. If any one of these checks is true, check 651 transfers to set message operation 652 and otherwise to open container check 653. Set message operation 652 sets the success field of the reply message to FAILURE and transfers to send reply operation 663. Notice that a ghost cannot get an object.

In open container check 653, a check is first made to determine whether the class of the requested object is container. If this check is false, processing transfers to container operation 655, and otherwise a second check is made to determine whether the container is open. If check for an open container is false, processing transfers to container operation 655 and otherwise to set message operation 654. Set message operation 654 sets the success field of the reply message to FAILURE and transfers to send reply operation 663. Here, an important aspect is to assure that a container is closed before that container is moved to another container, such as the avatar's hands.

In container operation 655, a pointer to the object holding the object to get is obtained and processing transfers to head check 656. Check 656 determines whether the holding object is a head, and if so transfers to container operation 657 and otherwise to get from avatar check 658. In container operation 656, it is determined whether the head is attached to avatar 100, and processing transfers to get from avatar check 657.

If the object to get is on the head of avatar 100 or on a loose head, avatar 100 can get the object. However, if the object is on the head of another avatar, avatar 100 cannot get the object. In get from avatar check 658, if the virtual object to get is in possession of another avatar, processing transfers to set message operation 659, and otherwise to adjacent check 660. Set message operation 659 sets the success field of the reply message to FAILURE_OBJECT_NOT_ACCESSIBLE, and transfers to send reply operation 663.

If the container for the requested object is not another avatar and the avatar is not adjacent to the requested object, check 660 transfers to set message operation 661 and otherwise to change container operation 662. Set message operation 661 sets the success field of the reply message to FAILURE_NOT_ADJACENT, and transfers to send reply operation 662.

Throughout this disclosure, adjacent is a true or false description of the distance relationship between two objects. Typically, when an object is pointed to and an avatar is not adjacent to the object and the position of the object is within the boundaries allowed for movement within the locale, the avatar is given the option of walking to the object.

In change container operation 662, the requested object is placed in the hands of the avatar for the instance of the avatar on server computer 260, and if the placement is successful, the success field of the reply message is set to SUCCESS. Operation 662 transfers to send reply operation 663.

Send reply message 663 transmits the reply message to client pocket get command method 600 and transfers processing to success check 663. Success check 663 determines whether the success field in the reply message was set to SUCCESS. If the success field was set to SUCCESS, check 663 transfers to update neighbors operations 664 and otherwise to done operation 665.

Update neighbors operations 664 first declares a avatar get object notice as a notice message and then initiates generation of the notice message. The object and the action to be taken with the object are placed in the notice message and the message is sent to each on-line user 225-i that has an avatar in the same locale as avatar 100 with the identification number for which the notice message applies. Operation 664 transfers to done operation 665.

In response to the notice message from server computer 260, each notified on-line computer 200-i that is displaying avatar 100 launches an avatar get object notify method. This method plays a sound representing the action directed and places the specified object in the hands of the specified avatar.

When reply check 603 in method 600 (FIG. 6A) receives the reply message from server method 650, reply check 603 determines whether the success field in the reply message is set to SUCCESS. If the success field is set to SUCCESS, processing transfers from check 603 to play sound operation 605 and otherwise to handle error operations 604.

Play sound operation 605 plays a get from pocket sound and transfers to change container operation 606. Change container operation 606 places the specified object in the hands of avatar 100 and transfers to end method operation 607 which cleans up and closes method 600.

When processing transfers to handle error operation 604, method 600 is terminated and the on-line user is provided an appropriate message.

One embodiment of methods used to get an object from pocket 105 is presented in Appendix A, and is incorporated herein by reference. Table 9 identifies the methods in Appendix A that are class specific methods used by class avatar.

TABLE 9

Avatar Class Specific Methods for a Get from Pocket

| Process Location | Name |
| --- | --- |
| client | method avatarBuildMenus_command |
| client | method avatarPocketGet_command |
| client | method avatarGetObject_notify |
| server | method avatarGetObject_perform |

Avatar—Remove

When menu item remove in menu 401 (FIG. 4A) is selected, a command is generated in computer 200-1 that launches an avatar remove command method as a client process on computer 200-1. Table 10 is pseudo code for the operations performed in this method.

TABLE 10
Pseudo Code for Avatar Remove Command
  Save facing orientation of avatar.
  If facing orientation of avatar is FRONTSIDE, change facing orientation to RIGHTSIDE.
    Play animation for avatar moving arms to head.
    Send avatar get object request message with requested object as head and requested action as REMOVE-HEAD.
    Play animation for avatar returning arms from head.
    Restore original facing orientation of avatar,
    Wait for reply message from server.
    If reply is success, place head in avatar hands and play head remove sound.
    Else handle Failure.
  End method The operations of the server in response to the avatar get object request message were described above with respect to FIG. 6B, and are incorporated herein by reference.

One embodiment of methods used to remove a head from the body of avatar 100 is presented in Appendix A, and is incorporated herein by reference. Table 11 identifies the methods in Appendix A that are class specific methods used by class avatar.

TABLE 11

Avatar Class Specific Methods To Remove Head

| Process Location | Name |
| --- | --- |
| client | method avatarBuildMenus_command |
| client | method avatarRemove_command |

TABLE 11-continued

Avatar Class Specific Methods To Remove Head

| Process Location | Name |
| --- | --- |
| client | method avatarGetObject_notify |
| server | method avatarGetObject_perform |

Avatar—Status

Figure 4E:
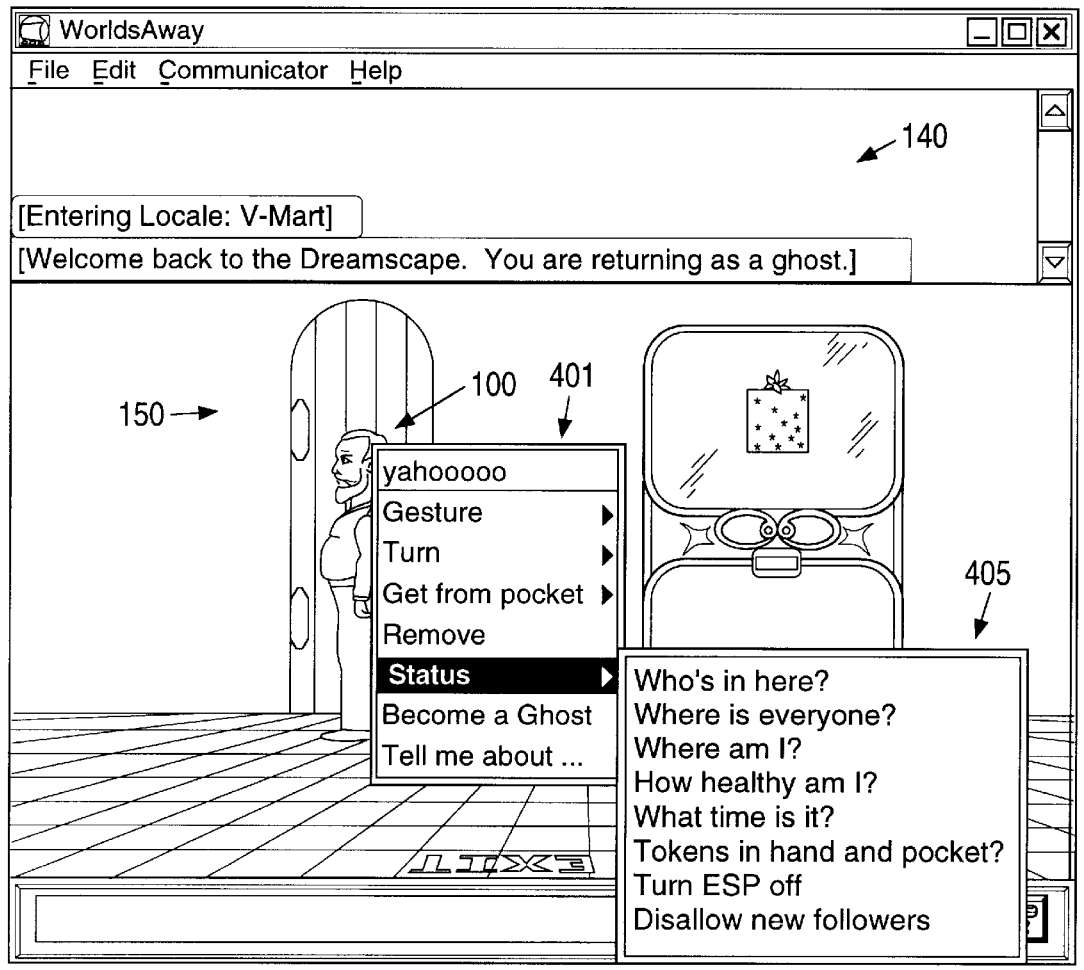
FIG. 4E illustrates a right pull menu in the graphic user interface when the on-line user points at menu item Status in the pop-up menu of FIG. 4A.

When on-line user 225-1 points at menu item Status in menu 401 (FIG. 4A), a status pull-right menu 405 (See FIG. 4E) is generated on display screen 250-1. One embodiment of the menu items in the status pull-right menu is presented in Table 12. Also, included in Table 12 is the response to each menu item that is written in dialogue area 140 (FIG. 1) when that menu item is selected.

TABLE 12

Status Pull-Right Menu

| | |
| --- | --- |
| Who's in here ? | Presents the names of the other avatars in the locale. |
| How healthy am I ? | Gives a state of the avatar's general health. |
| What time is it? | Gives the time relative to Pacific Time. |
| Tokens in pocket? | Reports the amount of tokens in avatar's pocket. |
| Turn ESP off<or ON> | Allows the avatar to not receive ESP messages from others. |
| Disallow Following | If avatar is allowing other avatars to follow. Note: Disallow following generates a server message to any other avatars following the avatar that the avatar has chosen the "disallow" command. The message "The avatar you are following has decided to stop leading you." is presented |
| Allow Following | If avatar is not allowing other avatars to follow. |

One embodiment of methods used to handle status inquires for avatar 100 is presented in Appendix A, and is incorporated herein by reference. Table 13 identifies the methods in Appendix A that are general methods used by class avatar for status operations.

TABLE 13

Avatar Class General Methods For Status

| Process Location | Name |
| --- | --- |
| | method buildStatusMenu_procedure; |
| | method playerStatus_command; |
| | method playerStatus_perform; |

Avatar—Become a Ghost

Figure 4F:
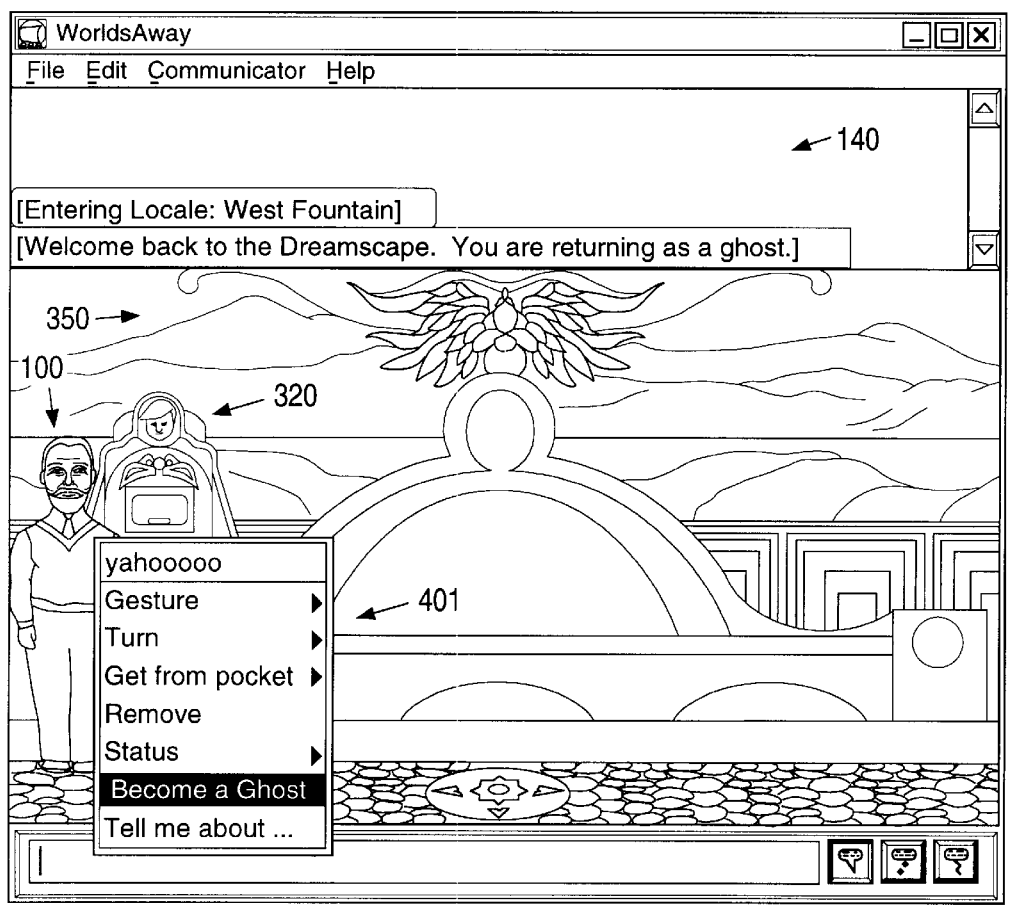
FIG. 4F illustrates a right pull menu in the graphic user interface when the on-line user points at menu item Become a Ghost in the pop-up menu of FIG. 4A.

When on-line user 225-1 selects menu item Become a Ghost in menu 401 (FIG. 4F), the mouse signal is converted to a signal that results in a avatar to ghost command method being launched on computer 200-i as a client process with avatar 100 as the target. Notice that the menu associated with avatar 100 is the same in locale 150 and in locale 350. Table 14 is pseudo code for one embodiment of the avatar to ghost command method.

TABLE 14
Pseudo Code for Avatar to Ghost Command Method
  Set target to argument passed in message command.

Set seat to container number ID for target.
If avatar is seated, have avatar stand. (Optional)
Send an avatar to ghost request message to server with target as an argument.
   Wait for reply message from server.
   If success field of reply message is not SUCCESS, Handle failure.
End Method In response to the avatar to ghost request message, an avatar to ghost perform method is launched on server computer 260 as a server process. Table 15 is pseudo code for one embodiment of the avatar to ghost perform method.

TABLE 15

Pseudo Code for Avatar to Ghost Perform Method
   Generate an instance of ghost class.
   Save number id for target.
   Initialize reply message by setting success field of reply message to FAILURE, and failure message field to a nullity.
   If target cannot become a ghost, or is already a ghost, go to send reply message.
   If actor is ghosting himself,
If actor is frozen (See avatar frozen check 554 (FIG. 5B))
   If freeze period is over, (See Check 555 (FIG. 5B))
     Unfreeze avatar (See operation 557 (FIG. 5B));
   Else
     Frozen reply message;
     Go to send reply message.
Else,
   If actor ghosting the avatar is not at least an Acolyte, go to send reply message.
   Change avatar to ghost.
   If error code for change is no error,
     Stop everybody from following ghost;
     If this is first ghost in locale,
       Set show ghost field of reply message to true;
       Set coordinates field of reply message to location in screen display of ghost.
     Else,
       Set show ghost field of reply message to false.
     Set success field of reply message to SUCCESS.
   Else,
     Set success field of reply message to failure.
     Set failure message field of reply message to error code.
   Send reply message.
   If success field of reply message is SUCCESS,
     Declare an avatar to ghost notice message
     Initiate the notice message
     Set target field of notice message to old number ID.
     If this is first ghost in locale,
       Set show ghost field of notice message to true;
       Set coordinates field of notice message to location in screen display of ghost.
     Else,
       Set show ghost field of notice message to false.
     Send notice message to all users displaying target.

Notice that the notice message is sent not only to neighbors, but also to the on-line user that caused the avatar to ghost perform method to be launched on server computer 260. Also, the virtual world includes acolyte and oracles that have special powers to control features of the world. However, acolytes and oracles are not an essential aspect of this invention and so are not considered further.

In response to the notice message from server computer 260, an avatar to ghost notify method is launched as a client process on computers 200-i to which the notice message is sent. Table 16 is pseudo code for one embodiment of the avatar to ghost notify method.

TABLE 16

Pseudo Code for Avatar to Ghost Notify Method
   Set actor to on-line user.
   Set target to target field in notice message.
   Play dematerialize sound.
   Destroy instance of avatar being ghosted, and visual display of avatar.
   If target is actor, assign global characteristics for actor to ghost
   If show ghost field of notice message is set to true, draw ghost object in screen display at coordinate given in notice message. (See FIG. 3B)
   End method Thus, when on-line user 225-1 becomes a ghost, avatar 100 (FIG. 4F) is removed from the graphic user interface, and a ghost icon 380 (FIG. 3B), e.g., an eye-in-the-sky, replaces avatar 100. If ghost icon 380 was already present in locale 350 when avatar 100 becomes a ghost, the count of the number of ghosts in locale 350 is increased, and avatar 100 is removed from the graphic user interface.

One embodiment of methods used to change avatar 100 to a ghost is presented in Appendix A, and is incorporated herein by reference. Table 17 identifies the methods in Appendix A that are class specific methods used by class avatar.

TABLE 17

Avatar Class Specific Methods For Avatar to Ghost

| Process Location | Name |
| --- | --- |
| client | method avatarToGhost__command |
| client | method avatarToGhost__notify |
| server | method avatarToGhost__perform |

Avatar—Tell Me About

When the user selects menu item Tell me about in menu 401 (FIG. 4A), an informational menu about avatar 100 is displayed. In general, a tell me about action is present on the main pop-up menu for every object, but not on any sub-menus.

Menu 401 (FIG. 4A) is generated when avatar 100 points at himself and his hands are empty. However, if avatar 100 points at himself and has something in his hand, some of the menu items in menu 401 change as indicated above. Specifically, menu item Get from pocket becomes Put in. Menu item Remove is not presented because there is no room in the avatar's hands for the head. If a head is in the avatar's hands and the avatar is not wearing a head, a menu item Wear is presented.

Avatar—Put in

When menu item Put in pocket is selected, in one embodiment, a standard put in pocket command method is launched as a client process on computer 200-1 for the portable object in the hands of avatar 100. In another embodiment, methods specific to the object being placed in the avatar's pocket could be used. These methods would likely be similar to those described below, except the methods would be streamlined and include checks for the specific object being place in the pocket.

In the standard method, the object in the hand of the avatar is first checked to determine whether the object is an open container. If the object is an open container, the method is terminated and a message is supplied to on-line user 225-1 requesting that the object be closed.

If the object in the avatar's hand is closed, a check of the slots in pocket 105 is made to find an empty slot. If an empty slot is not found, the method is terminated and a message "Your pocket is already full" is provided to on-line user 225-1. If a slot is available, a standard put in pocket request message is sent to server computer 260, and an animation is started.

In response to the standard put in pocket request message, server computer 260 launches a put in pocket perform method. In this method, illegal conditions such as the avatar is a ghost, the avatar is not holding the object, the object is open, or a slot in the pocket is not available, are checked. If any one of these conditions is true, a failure reply message is sent back to the client process. Next, a change container operation moves the object in the avatar's hands into an empty slot. If this operation is successful, a success flag and an empty slot number are returned in the reply message. Otherwise, the reply message indicates an internal failure. If the change container operation was successful, a notice message is sent to each of the avatar's neighbors to have the avatar place the object in his pocket.

When a reply message is received, the client process terminates the animation and checks whether the reply message indicates success. If success is not indicated, the method is terminated and an error message provided. Conversely, if success is indicated, a change container operation moves the object in the hand of avatar 100 into pocket 105 and a put in pocket sound is played. This ends the method.

Table 18 is pseudo code for one embodiment of the standard put in pocket command method.

TABLE 18
Pseudo Code for Put In Pocket Command Method
  If object is open container, then present failure message "Please close the container before placing in pocket," and terminate.
  If object is not assigned a reserved slot in pocket, and avatar pocket is full, then present failure message "Your pocket is already full," and terminate.
  Start Put in Pocket animation
  Issue standard put in pocket request message with no argument to server computer.
  Wait for standard put in pocket reply from server computer.
  Finish animation upon receipt of reply.
  If reply is success, move object from hand to pocket and play put in put pocket sound, else handle failure
  End method Table 19 is pseudo code for one embodiment of the standard put in pocket perform method.

TABLE 19
Pseudo Code for Standard Put in Pocket Perform Method
  If avatar is a ghost or avatar is not holding the object or the object is open, or a slot in the pocket is not available, send failure reply message and terminate;
  Moves the object in the avatar's hands into an empty slot.
  If move operation is successful, return a success flag and an empty slot number in the reply message,
    else return a reply message indicating an internal failure and terminate.
  If move operation was successful, send a notice message to each of the avatar's neighbors to have the avatar place the object in his pocket.

One embodiment of methods used to put objects in pocket 105 of avatar 100 is presented in Appendix A, and is incorporated herein by reference. Table 20 identifies the methods in Appendix A that are general methods and a specific method used by class avatar for put in pocket operations.

TABLE 20

Avatar Class General Methods For Put In Pocket

| Process Location | Name |
| --- | --- |
| client | method avatarBuildMenus__command (specific) |
| client | method putInPocket__command (general) |
| client | method putInPocket__notify (general) |
| server | method putInPocket__perform (general) |

Avatar—Wear

When menu item Wear is selected, a command is generated in computer 200-1 that launches an avatar wear command method as a client process. Table 21 is pseudo code for the operations performed in this method.

TABLE 21
Pseudo Code for Avatar Wear Command
  Save facing orientation of avatar
  If facing orientation of avatar is FRONTSIDE then change facing orientation to RIGHTSIDE
  Play animation for avatar moving arms to head
  Send avatar exchange object request message with exchanged object as head and requested actions as wear head
  Play animation for avatar returning arms from head
  Restore original facing orientation of avatar
  Wait for reply message from server
  If reply is success, place head on avatar body and play head wear sound else handle Failure
  End method The operations of the server in response to the avatar exchange object request message are to check the validity of the request and that only a head is placed on the shoulders of the avatar. If all of the conditions are satisfied, a successful reply message is sent, and neighbors of the avatar are notified to update the screen display to show the avatar wearing the head.

One embodiment of methods used to wear a head on the body of avatar 100 is presented in Appendix A, and is incorporated herein by reference. Table 22 identifies the methods in Appendix A that are class specific methods used by class avatar.

TABLE 22

Avatar Class Specific Methods To Wear Head

| Process Location | Name |
| --- | --- |
| client | method avatarBuildMenus__command |
| client | method avatarWear__command |
| client | method avatarExchange__notify |
| server | method avatarExchange__perform |

In one embodiment, when on-line user 225-1 points at a object other than avatar 100 using mouse 202-1, e.g., container 430 in locale 450 (FIG. 4G) and then depresses the left mouse button when the hands of avatar 100 are empty, a signal is generated by mouse 202-1 that is interpreted by a client process executing in computer 200-1 that builds a pop-up menu 406 (FIG. 4H) for the object pointed at. The options are given in Table 23A.

TABLE 23A

Menu When Pointing At a Container Object
other than Avatar with Hands Empty

<Object Name>

Walk to
Get
Open
Lock
Tell Me About . . .

Here, the assumption is that the pointed at object is a loose portable container object, such as object 430. The menu items that are the same as those in menu 401 perform as described above. Menu item Get appears only if avatar 100 can get the object pointed at, e.g, the object is a portable object that is not in the hands of another avatar. When menu item Get is selected, if avatar 100 is not adjacent to the object, avatar 100 walks to the object and places the object in his hands. Thus, the methods used to implement Get result in the avatar picking up the object.

Figure 4G:
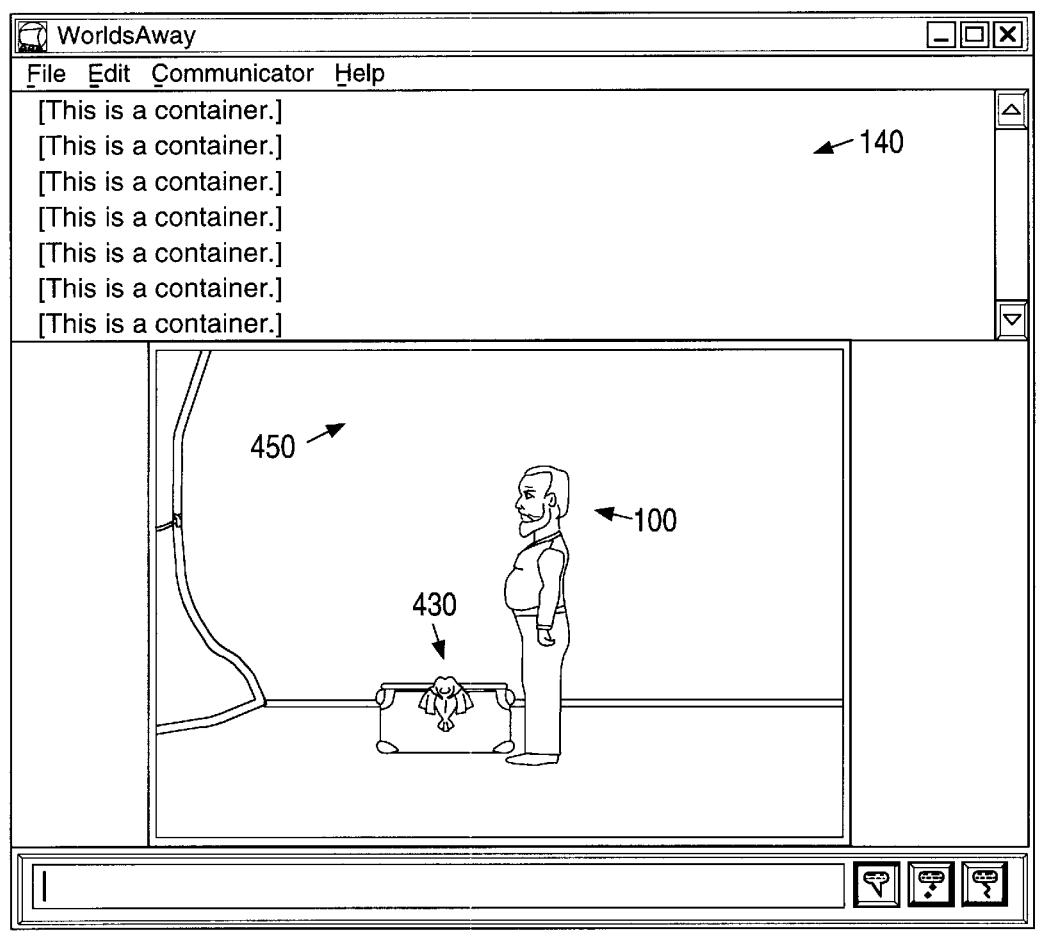
FIG. 4G illustrates an avatar, in yet another locale, that is not adjacent to a container object.
Figure 4H:
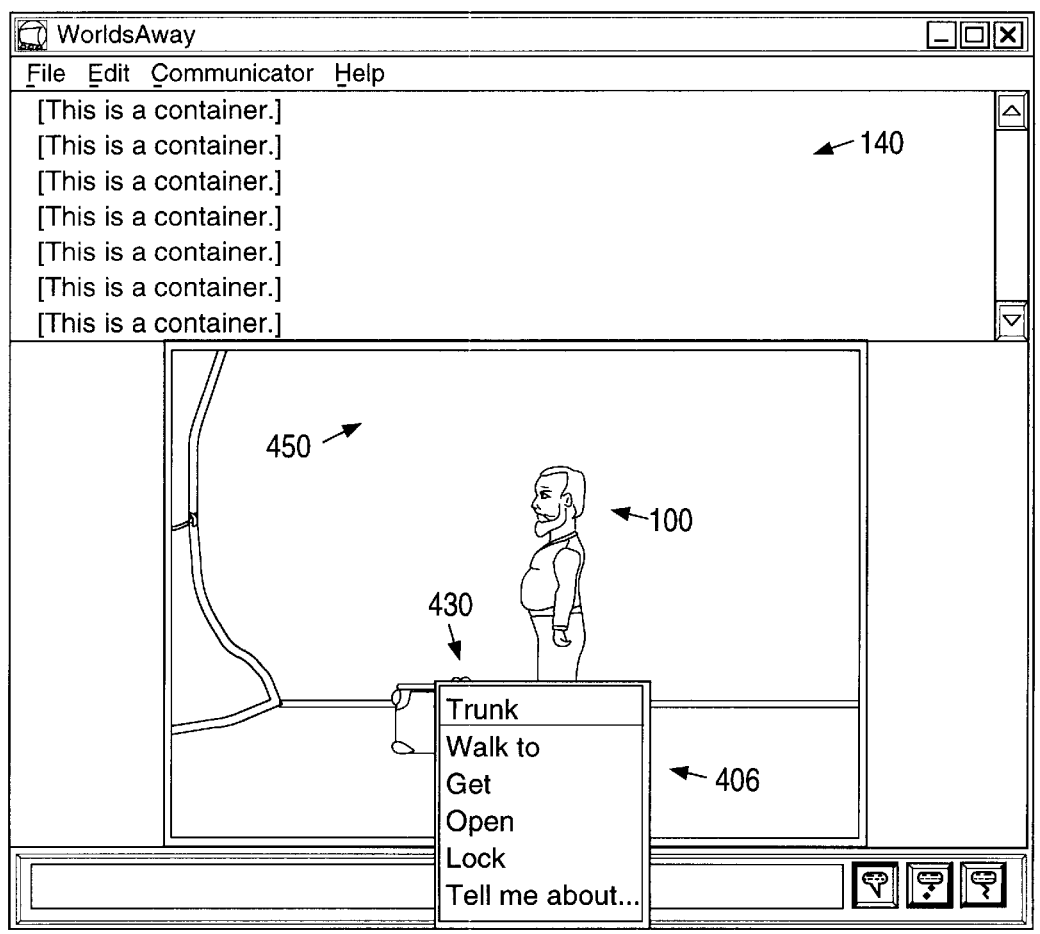
FIG. 4H illustrates a pop-up menu that is generated when the avatar is not adjacent to a container object and the container object is pointed at by the on-line user.
Figure 4I:
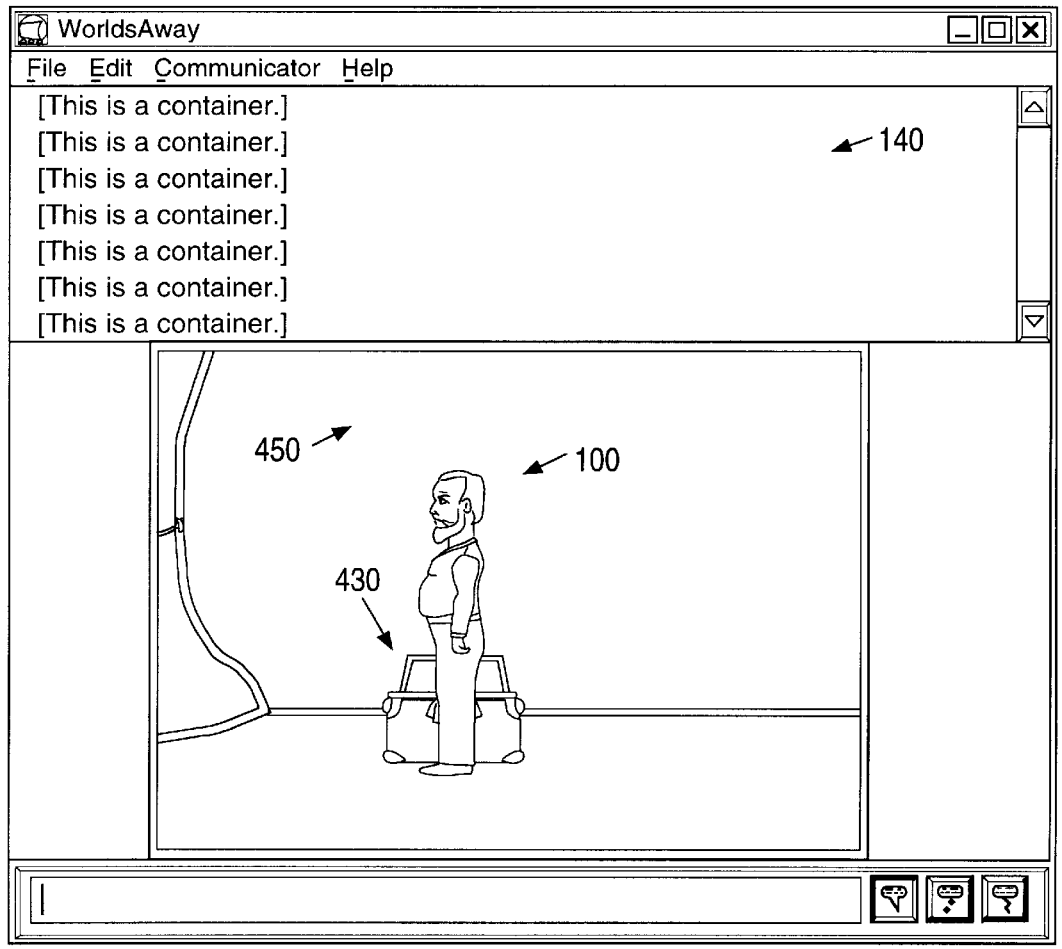
FIG. 4I illustrates the position of the avatar after the on-line user selects menu item Walk to in the pop-up menu of 4H after the animation used to move the avatar is completed.

In this example, on-line user 225-1 first selects menu item Walk to, and a client process on computer 200-1 moves avatar 100 adjacent to container 430 and pop-up menu 406 is killed, as shown in FIG. 4I.

When on-line user 225-1 points at container 430, while adjacent to the container 430, and then depresses the left mouse button when the hands of avatar 100 are empty, a signal is generated by mouse 202-1 that is interpreted by a client process executing in computer 200-1 that builds a pop-up menu with the options given in Table 23B.

TABLE 23B

Menu When Pointing At a Container Object
other than Avatar with Hands Empty

<Object Name>

Get
Open
Lock
Tell Me About . . .

Figure 4J:
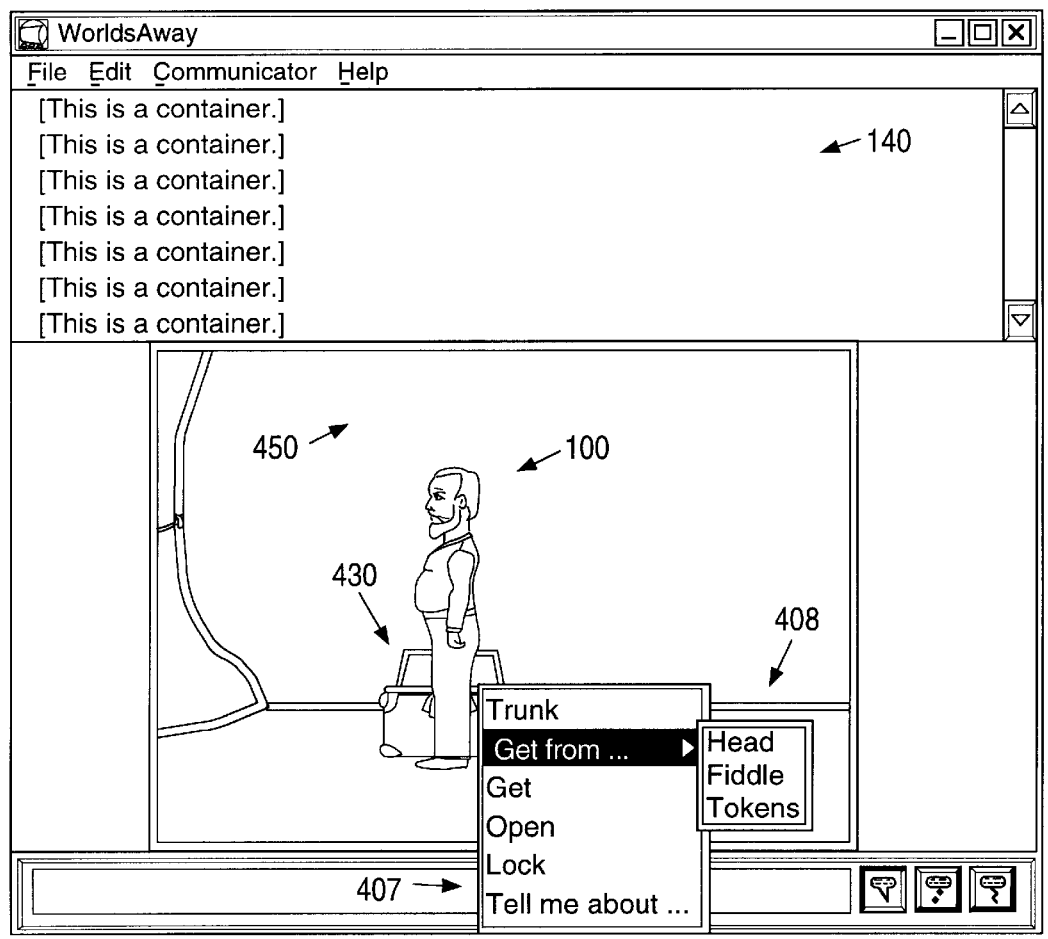
FIG. 4J illustrates a pop-up menu that is generated when the avatar is adjacent to an open container object and the open container object is pointed at by the on-line user.

Notice that in FIG. 4G, container 430 is closed. After avatar 100 walked to container 430, and on-line user 225-1 pointed at container 430, the pop-up menu of Table 23B was displayed on display screen 250-1. On-line user 225-1 selected menu item Open, and the pop-up menu disappeared and container 430 was opened as shown in FIG. 4J.

When on-line user 225-1 points at open container 430, while adjacent to the container 430, and then depresses the left mouse button when the hands of avatar 100 are empty, a signal is generated by mouse 202-1 that is interpreted by a client process executing in computer 200-1 that builds a pop-up menu 407 (FIG. 4J) for the object pointed at. The options are given in Table 23C.

TABLE 23C

Menu When Pointing At an Open Container Object
other than Avatar with Hands Empty <Object Name>

Get From                                              >
Get
Close
Lock
Tell Me About . . .

Notice that pop-up menu 407 is similar to pop-up menu 406, except menu item Walk to has been replaced by Get from. Also menu item Open has been replaced by menu item Close.

When on-line user 225-1 uses mouse 202-1 to select menu item Get from, a right pull menu 408 is displayed that lists the objects contained in the container. Each container has a predefined number of slots and each slot can be used to store one portable virtual object.

Figure 4K:
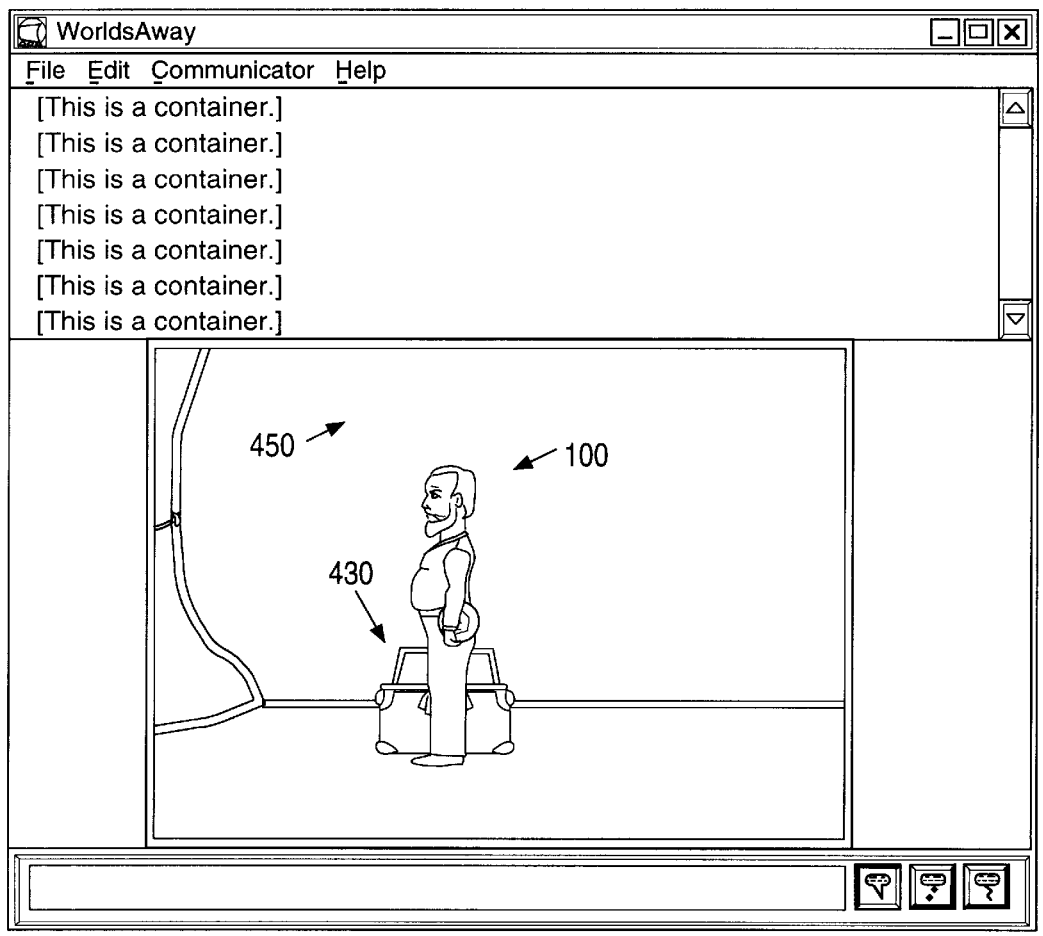
FIG. 4K illustrates the graphic user interface after the user selects tokens in the menu of FIG. 4J and the operations to get the tokens from the container have been completed.

In this example, on-line user 225-1 selects menu item Tokens, in response to this selection a client process is launched to get the tokens from container 430. One embodiment of methods used to get tokens from a container are described more completely below. FIG. 4K illustrates the user interface after the get token from container operations are complete. Notice that avatar 100 is holding a token.

One embodiment of methods used for a get of an object, e.g., container 430 itself, by avatar 100 is presented in Appendix A, and is incorporated herein by reference. Table 24 identifies the methods in Appendix A that are class specific methods used by class avatar.

TABLE 24

Avatar Class Methods For Get

| Process Location | Name |
|---|---|
| client | method goToAndGet_command |
| client | method avatarGetObject_notify |
| server | method avatarGetObject_perform |

When on-line user 225-1 points at an object other than avatar 100 using mouse 202-1 and then depresses the left mouse button when the hands of avatar 100 are full, a signal is generated by mouse 202-1 that is interpreted by a client process executing in computer 200-1 that builds a pop-up menu for the object pointed at. The options are given in Table 25.

TABLE 25

Menu When Pointing At an Object
other than Avatar with Hands Full

<avatar name> walk to here
put
touch                                                  >

Menu item Put appears only if avatar 100 can place the object in his hands on, or in the object pointed at. The action taken in response to selection of menu item Put depends upon the action selected. In general, this action is available, when there is an object in the avatar's hands, and the pointed at object is a container that is not another avatar, and that has an open slot that can hold the object in the avatar's hands. To perform the put operation for a container, in one embodiment, the methods listed in Table 26 and presented in Appendix A, which are incorporated herein by reference, are used.

TABLE 26

Avatar Class Methods For Put When Selected Object is a Container

| Process Location | Name |
| --- | --- |
| client | method putInContainer__command |
| client | method putInContainer__notify |
| server | method putInContainer__perform |

These methods are similar to those described above for put in pocket and so are not considered in further detail.

An avatar can also put a portable object in a locale, e.g, on the floor. In this case, the object belongs to the locale, rather than an avatar or a container and so is considered a loose object. See for example FIG. 11A that includes several loose objects including a book 1161 and a head 1162.

If the object is a floor, for example, the methods used are listed in Table 27 and presented in Appendix A, and incorporated herein by reference.

TABLE 27

Avatar Class Methods For Put When Selected Object is not a Container

| Process Location | Name |
| --- | --- |
| client | method dropAtPosition__command |
| client | method avatarDropAt__notify |
| server | method avatarDropAt__perform |

In each case, if avatar 100 is not adjacent the pointed at object, the methods implementing this action walk the avatar to the object and then place the object in the avatar's hands on, or in the pointed at object. Thus, the methods used to implement Put result in the avatar putting down the object.

If the object pointed at is another avatar, the menu item Put is replaced by menu item Give to. In this case, the object in the first avatar's hand is placed in the second avatar's hand, if the second avatar is not holding an object, and a notice is sent to the second avatar of the transaction.

When menu item Give to is selected, a message is generated that launches an avatar give to command method as a client process. The giving avatar and the object being given are arguments in the call to the method. Table 28 is pseudo code for one embodiment of the avatar give to command.

TABLE 28
Pseudo Code for Avatar Give To Command Method
   Set giver to avatar in call to method.
   Set item to item in call to method.
   (Walk giver adjacent to recipient.—optional)
   If recipient is holding an object,
Handle failure "You cannot give an item to someone who is
   holding something."
   If item has a valid id,
Play animation for giver to give object.
   Send avatar give to request message to server.
   Wait for reply message from server.
   If success field of reply message is success,
      If item is a token, play coin give sound,
      Redraw item in buffer
      Move item from hand of giver to hand of recipient.
      Redraw item in buffer,
   Else,
   Handle failure.
      End Method, In response to the avatar give to request message, an avatar give to perform method is launched on server computer 260 as a server process. Table 29 is pseudo code for one embodiment of the avatar give to perform method.

TABLE 29
Pseudo Code for Avatar Give to Perform Method
   Initialize reply message by setting success field to failure,
   If giver is a ghost, go to send reply message
   If hands of giver are empty, or hands of recipient are full, go to send reply message
   Set item to instance of class of object in hands of giver
   If item is not a valid object, go to send reply message
   If item successfully transfers from giver to recipient, set success field of reply message to success
   Send reply message
   If success field of reply message is success.
Declare an avatar give to notice message
Initiate avatar give to notice message
Set giver field of notice message to giver
Set item field of notice message to number ID of item
Set givee field of notice message to number Id of recipient.
Send notice message to neighbors with number ID of giver In response to the notice message from server computer 260, an avatar give to notify method is launched as a client process on computers 200-i to which the notice message is sent. Table 30 is pseudo code for one embodiment of the avatar give to notify method.

TABLE 30
Pseudo Code for Avatar Give to Notify Method
   Set item to item field of notice message.
   Redraw item.
   Move item from giver to recipient
   Redraw.
   Set giver to giver field in notice message.
   Set givee to givee field in notice message.
   Read identification for on-line user.
   If notice item is a token, play coin give sound.
   If identification for on-line user is Identification of givee, write a message to givee "You've received [item name] from [giver name]."
   End Method.

One embodiment of methods used to implement give to is presented in Appendix A, and is incorporated herein by reference. Table 31 identifies the methods in Appendix A that are class specific methods used by class avatar.

TABLE 31

Avatar Class Specific Methods For Give To

| Process Location | Name |
| --- | --- |
| client | method avatarGiveTo__command |
| client | method avatarGiveTo__notify |
| server | method avatarGiveTo__perform |

Menu item Touch appears only if the object pointed at is another avatar. When menu item Touch is pointed at, the pull right menu in Table 32 is generated on display screen 250-1.

TABLE 32

Touch Pull Right Menu

Poke
Shake Hands
Hug

In one embodiment, each of actions Poke, Shake Hands, and Hug of avatar 100 are choreographed so that the on-line users view realistic motions for the action.

For the embodiment described above, an avatar class is defined and an instance of the avatar class generated for each on-line user. A definition of the avatar class is given in Table 33. The various fields and methods defined in the avatar class have names that correspond to the name of the data represented by the field and the operations performed by the method, respectively.

TABLE 33

A Definition for Class Avatar

```
define LONG 0;      /* step sizes */
define MEDIUM 1;
define SHORT 2;
define DRIFT_RATIO 15;
  /* how big an X/Y difference before you don't drift */
/* turn directions */
define RIGHT_DIR         1;
define LEFT_DIR          2;
define AROUND_DIR        3;
define AVATAR_CAPACITY      10;
define AVATAR_HANDS                    0;
required define AVATAR_HEAD         1;
define AVATAR_RESERVED_START    2;
define AVATAR_TOKENS                   2;
define AVATAR_PAD                      3;
define AVATAR_POCKET_START      4;
required define AVATAR HAPPY     0;
define AVATAR_GLAD               1;
define AVATAR_SAD                2;
define AVATAR_MAD                3;
define WEAR_HEAD 0;
define REMOVE_HEAD 1;
define FROM_POCKET 2;
/* Multi-Part Animations */
define GET_FROM_POCKET      0xF001;
define GET_FROM_SHOULDERS   0xF002;
define GET_FROM_GROUND      0xF003;
define GET_FROM_TABLE       0xF004;
define GET_FROM_SHELF       0xF005;
define OPERATE_MACHINE      0xF006;
define TURN_NOB             0xF007;
define SQUAT_FIDDLE         0xF009;
define FIDDLE_STAND         0xF00A;
define WAVE_COMPLETE        0xF00B;
define BOW_COMPLETE         0xF00C;
define SHRUG_COMPLETE       0xF00D;
define PAY                  0xF00E;
define SHOW                 0xF00F;
define FIDDLE_WHOLE         0xF010;
define WEAR_COMPLETE        0xF011;
/* Added for security checks */
define JUMP_UP              0x0022;
define STOMP                0x00C4;
/* Define some permission flags */
define AVATAR_PERM_FIDDLE   0x0001;
          use fiddle wand */
define AVATAR_PERM_PROMOTE  0x0002;
          /* promote/demote other avatars */
define AVATAR_PERM_MUTE     0x0004;
          /* Forbidden to speak, think, or ESP */
define AVATAR_PERM_FREEZE   0x0008;
          /* Forbidden to move, gesture, exit, etc */
required class avatar {
          info {
```

TABLE 33-continued

A Definition for Class Avatar

```
          classNumber     thisClass( );
          version         thisVersion( );
          name            "Avatar";
          capacity        AVATAR_CAPACITY;
          reserved        AVATAR_RESERVED_START;
          pickFrom        AVATAR_POCKET_START;
          helpResourceID  DEFAULT_HELP;
      }
      instance {
          include "instance.cld";
          include "instcont.cld";
          /* class specific data */
 common:
          uint8      activity;
          uint8      action;
          uint8      nameChanges;
          uint8      aFiller;
          uint16     health;
          uint16     following;
          uint32     perm_flags;
          uint16     home_areaCode;
 server:
          char       system_name[MAX_NAME_SIZE];
          char       prev_name1[MAX_NAME_*SIZE];
          uint32     last_use_date1;
          char       prev_name2[MAX_NAME_SIZE];
          uint32     last_use_date2;
          char       acct_name[MAX_ACCT_SIZE];
          char       password[MAX_PASSWD_SIZE];
          uint32     banished_until_date;
          uint32     last_login_date;
          uint32     login_region_num;
          uint32     create_date;
          uint32     leader_woid;
          uint32     bankAccountBalance;
          uint32     curse_type;
          uint32     avatar_time;
          uint32     ghost_time;
          uint16     avatar_state;
          uint16     save_style;
          uint8      save_colorMap[COLOR_TABLE_SIZE]
          uint32     mail_textid;
          uint32     doc_id;
          uint32     index_id;
          uint32     doc_bits;
          uint32     home_region_num;
          uint16     home_region_zone;
          uint32     mute_until_date;
          uint32     freeze_until_date;
 client:
          uint16     walkDestination[3];
          uint32     walkingFrameNumber;
      }
/*
**      Resources used by class avatar.
*/
      verb allowfollow;
      verb disallowfollow;
      verb follow;
      verb gesture;
      verb ghost;
      verb giveTo;
      verb happy;
      verb help;
      verb mad;
      verb pocketget;
      verb pocketput;
      verb remove;
      verb stopfollow;
      verb touch;
      verb unfollow;
      verb walkTo;
      verb wear;
      verb sad;
      verb glad;
      verb jump;
      verb wave;
```

TABLE 33-continued

A Definition for Class Avatar

```
                sound getFromPocket1;
                sound wearHead;
                sound removeHead;
                sound dematerialize;
                sound putInPocket1;
                sound bagClosing;
                sound safeClose;
                sound chestClose;
                sound bagOpening;
                sound safeOpen;
                sound chestOpen;
                image genericAvatar;
                image femaleAvatar;
                image maleAvatar;
                image oracleAvatar;
                /*
                **      Standard methods used by class avatar.
                */
                method   buildStatusMenu_procedure;
                method   goToObject_command;
                method   help_command;
                method   playerStatus_command;
                method   playerStatus_perform;
                method   setName_command;
                method   speak_command;
                method   speak_notify;
                method   speak_perform;
                /*
                **      Class specific methods used by class avatar.
                */
client   method   avatarAnimate_procedure
client   method   avatarBodyChange_command
client   method   avatarBodyChange_notify
server   method   avatarBodyChange_perform
client   method   avatarBuildMenus_command
client   method   avatarChangeMood_command
client   method   avatarChangeMood_notify
server   method   avatarChangeMood_perform
client   method   avatarCloseContainer_notify
server   method   avatarCloseContainer_perform
client   method   avatarDestroy_notify
client   method   avatarDropAt_notify
server   method   avatarDropAt_perform
client   method   avatarExchange_notify
server   method   avatarExchange_perform
client   method   avatarFacing_command
client   method   avatarFacing_notify
server   method   avatarFacing_perform
client   method   avatarFollow_command
client   method   avatarFollow_notify
server   method   avatarFollow_perform
server   method   avatarForceExit_perform
client   method   avatarFreeze_notify
server   method   avatarFreeze_perform
client   method   avatarGesture_command
client   method   avatarGesture_notify
server   method   avatarGesture_perform
client   method   avatarGetObject_notify
server   method   avatarGetObject_perform
client   method   avatarGiveTo_command
client   method   avatarGiveTo_notify
server   method   avatarGiveTo_perform
client   method   avatarGoToConnection_command
client   method   avatarGoToConnection_notify
server   method   avatarGoToConnection_perform
client   method   avatarGoToPosition_notify
server   method   avatarGoToPosition_perform
server   method   avatarHelp_perform
server   method   avatarJoin_perform
client   method   avatarMute_notify
server   method   avatarMute_perform
client   method   avatarOpenContainer_notify
server   method   avatarOpenContainer_perform
server   method   avatarOwner_perform
client   method   avatarPocketGet_command
client   method   avatarRemove_command
server   method   avatarSend_perform
```

TABLE 33-continued

A Definition for Class Avatar

```
client   method   avatarSetPermissions_notify
server   method   avatarSetPermissions_perform
client   method   avatarToGhost_command
client   method   avatarToGhost_notify
server   method   avatarToGhost_perform
client   method   avatarTouch_command
client   method   avatarTouch_notify
server   method   avatarTouch_perform
client   method   avatarUnfollow_command
client   method   avatarUnfollow_notify
server   method   avatarUnfollow_perform
client   method   avatarWear_command
}
```

Table 33 demonstrates the general class organization of all the classes of this invention. According to the principles of this invention, a class includes a class descriptor, a class instance structure, and a collection of resources. The class descriptor contains various pieces of information about the class as a whole. The class instance structure describes the instance variables of objects of the class. The collection of resources contains the class's methods, images, sounds, and so forth. In this embodiment, class avatar is a subclass of a base class and a subclass of a container class that are described more completely below. Appendix A includes a specific embodiment for each of the methods in Table 33.

In Table 33, the following definitions are used:

| | |
|---|---|
| include | used to incorporate the contents of other files |
| define | used to declare symbolic names for expression values |
| message | used to declare messages |
| method | used to declare methods |
| definfo | used to declare the class descriptor struct |
| resourcetype | used to declare resource types |
| resource | used to declare resources |
| class | used to declare classes |

The primitive data types are:

| | | | |
|---|---|---|---|
| sint8 | sint16 | sint32 | |
| uint8 | uint16 | uint32 | |
| char | string | bool | objref | where sintxx and uintxx represent signed and unsigned integers (respectively) of the indicated precision, char represents a single character, string represents a NUL-terminated character string, bool represents a boolean flag type (represented by a byte that may take only the values 0 or 1), and objref represents a run-time pointer to another object.

For methods, server and client identify the site where the method is executed. The methods are stored in an executable format in the memory of the site indicated. The marker common indicates fields visible to everyone. The marker server indicates fields visible only on the server. The marker client indicates fields visible only on the client. By default, if no marker keyword is given initially, fields are common.

Tokens

As described above, a token object 110, sometimes simply referred to as token 110 is a medium of exchange in the virtual world. Thus, a token object is an example of a medium of exchange object that is an instance of a medium of exchange class. In this embodiment, there is only one style of token that is a golden colored round coin with a profile of a face. Token object 110 can have a value one or greater. There is no token value of zero.

Figure 7A:
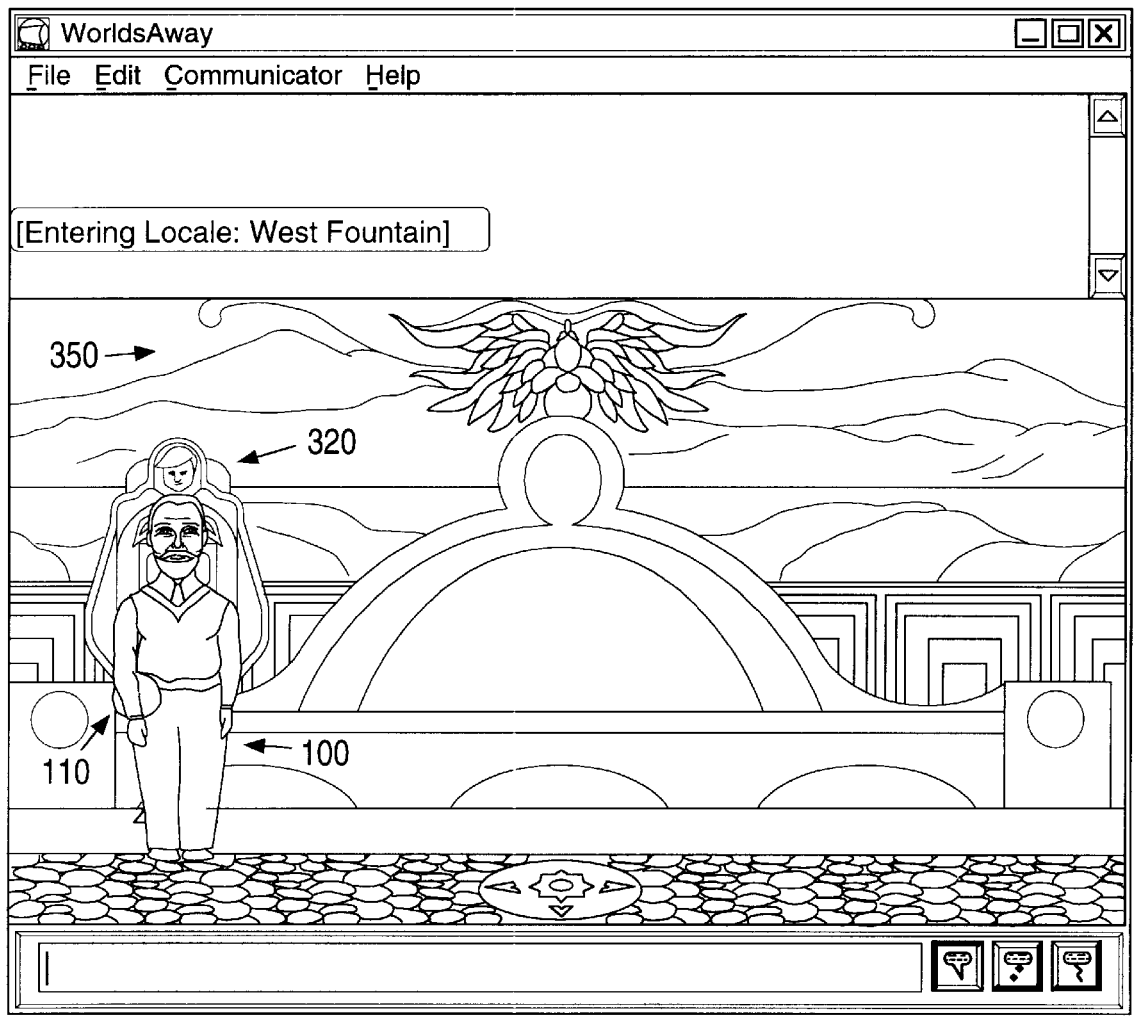
FIG. 7A is the graphic user interface of FIG. 3A with the avatar holding a token object of this invention.

When on-line user 225-1 points at token object 110 (FIG. 7A) in the hand of avatar 100 using mouse 202-1 and then depresses the left mouse button, a signal is generated by mouse 202-1 that is interpreted by a client process executing in computer 200-1 that builds pop-up menu 701 (FIG. 7B). The options are given in Table 34.

TABLE 34

| Menu When Pointing At Token Object in Hand of Avatar | |
| --- | --- |
| <Token Value> | Tokens |
| Split . . . | |
| Gesture | > |
| Thru | > |
| Put into | > |
| Status | > |
| Become a ghost | |
| Tell Me About . . . | |

The menu items that are the same as those in menu 401 perform as described above. The two new menu items Split and Put into are described below. Notice that menu item Split is followed by an ellipsis. The ellipsis signals to on-line user 225-1 that a dialogue is associated with the menu item.

Thus, when on-line user 225-1 selects menu item Split, a signal is generated that launches a token split prompt command method as a client process on computer 200-1. The token split prompt command method generates dialogue box 721 (FIG. 7C). The number one is put in dialogue box 721 by the method. The user can enter the number of the 35 tokens to retain in the hand of avatar 100 in dialogue box 721.

When on-line user points at OK button 722 and operates the button of mouse 202-1, a signal is generated that launches a token split OK command method 800. Clear dialogue operation 801 removes dialogue box 721 from display screen 250 and transfers processing to amount valid check 802.

Amount valid check 802 determines whether: (i) the amount entered is a number; (ii) the amount entered is less than one; (iii) the amount is greater than the denomination of held token 110; and the denomination of held token 110 is less than or equal to zero. If any one of these conditions is true, check transfer processing to failure message operations 804 and otherwise to token split command operation 805.

Failure message operation 804 prints a message on display screen of "Sorry, you can't split your tokens like that. Please try again.", and transfers to end method 805. Token split command operation 803 issues a token split command message with the entered amount as an argument and also transfers to end method 805. End method 805 terminates method 800.

In response to the token split command message, a token split command method 830 is launched as a client process on computer 200-1. In initialize operation 810, an amount is set to the amount specified in the token split command message, and hand tokens is set to the number identification for the object, e.g., token 110 in the hand of avatar 100. Initialize operation 810 transfers processing to holding tokens check 811.

If avatar 100 is holding a token, processing transfers to request put tokens in pocket process 812, and otherwise to amount check 813. Process 812 issues a standard put in pocket command message request to place token 110 in the hand of avatar 100 into pocket 105. This request launches a tokens put in pocket command method that is a client process on computer 200-1. Table 35 is pseudo code for the tokens put in pocket command method.

TABLE 35

Pseudo Code for Tokens Put in Pocket Command Method

Play animation of avatar putting hand in pocket.
Issue put in pocket request message to server computer and wait for tokens put in pocket reply message.
Wait for reply message from server.
If reply message indicates success
  if pocket tokens exist
    destroy instance of pocket tokens; and
    update tokens to new denomination returned in reply message;
    put tokens in pocket;
    play metal jingle sound;
    play animation of avatar removing hand from pocket and end method;
  else
    play animation of avatar removing hand from pocket; handle failure and end method.

In response to the put in pocket request message from tokens put in pocket command method, server computer 260 launches a tokens put in pocket perform method. Table 36 is pseudo code for the put in pocket perform method.

TABLE 36

Pseudo Code for Tokens Put in Pocket Perform Method

If avatar is a ghost, or avatar is not holding the object, send failure reply message and terminate;
If tokens in pocket,
  Update in pocket by adding tokens in hand to tokens in pocket;
  Set pocket tokens field in reply message to number identification of server pocket tokens;
Else
  Set pocket tokens field in reply message to invalid number identification
  Set denomination field to denomination of tokens in pocket on server.
  Move tokens into pocket and if is unsuccessful return an internal failure reply message and terminate server method.
  Set success field of reply message to success and sent reply message.
  If success field of reply message is success, send a notice message to each of the avatar's neighbors to have the avatar place the object in his pocket.

Thus, when processing transfers to amount check 813, all of the tokens are in pocket 105 and represented by a token equal to the denomination of all the tokens stored there. Amount check 813 determines whether amount, i.e, the denomination of the token requested by avatar 100, is equal to the denomination of the tokens in pocket 105. If the two denominations are equal, amount check 813 transfers to get from pocket command message process 814 and otherwise to animation process 815.

Get from pocket command message process 814 issues a standard get from pocket command message for the pocket tokens. In response to the standard get from pocket command message, a tokens get from pocket command method is launched as a client process on computer 200-1. Table 37 is pseudo code for one embodiment of the tokens get from pocket command method.

TABLE 37

Pseudo Code for Tokens Get From Pocket Command Method

```
Play animation of avatar placing hand in pocket
Send standard get from pocket request message for
      tokens in pocket to server computer
Play animation of avatar removing hand from pocket
Wait for reply message from server
If reply message is success,
      Move token from pocket to avatar hands
      Play metal jingle sound
      End Method
else
      handle failure
      end method
```

In response to the standard get from pocket reqest message, a standard get from pocket perform method is launched by server computer 260 as a server process. This server process was described above with respect to FIG. 6B and that description is incorporated herein by reference. However, in this embodiment, update neighbors process 664 calls a tokens get from pocket notify method as a client process on the neighboring computers that display avatar 100. This method changes the container for the tokens from pocket 105 to the hand of avatar 100 and plays the animation and metal jingle sound.

When get from pocket command message process 814 completes, the token split is complete because all of the tokens are in the hand of avatar 100. However, if the tokens in pocket 105 of avatar 100 are greater than the split amount, processing transferred to play animation 815 that in turn puts the hand of avatar 100 in pocket 100 on display screen 250 and transfers to transmit message operation 816.

In transmit message operation 816, a token split request message for the pocket tokens is sent to server computer 260 with amount as an argument. In response to the token split request message, a token split perform method 850 is launched on server computer 260 as a server process.

In initialize process 851 of method 850, the success field of the reply message is set to SUCCESS; a contents vector size is set to zero; and a contents vector is initialized to a nullity. Upon completion, process 851 transfers to valid request check 852.

Valid request check 852 checks whether: avatar 100 is a ghost; the hands of avatar 100 are full; the requested amount is greater than the denomination of the pocket tokens.; and the requested amount is zero. If any one of these checks is true, check 852 transfers processing to set failure message operation 853, and otherwise to create token check 854.

Failure message operation 853 sets the success field of the reply message to failure and transfers to send reply operation 858.

In create token check 854, a new instance of class token, i.e., a new hand token object, is created for the hand of avatar 100. If this operation is successful, check 854 transfers to set amount process 856, and otherwise to set failure message operation 855. Failure message operation 855 sets the success field of the reply message to FAILURE_INTERNAL, and transfer processing to send reply operation 858.

In set amount process 856, the denomination of the new hand token is set to the requested amount and processing transfers to make vector operation 857. Operation 857 makes a contents vector of the new hand token and assigns the contents vector to the contents vector field of the reply message. Operations 857 transfers to send reply operation 858.

Send reply operation 858 sends the reply message to token split command method 830, and transfers processing to success check 859. If the success field of the reply message is set to SUCCESS, check 859 transfers to update neighbors operations 860, and otherwise to done 862, Update neighbors process 860 first declares a token split notice as a notice message and then initiates generation of the notice message. The denomination of the pocket tokens, the number identification of avatar 100, the contents vector size and the contents vector are placed in the notice message and the message is sent to each on-line user that has an avatar in the same locale as avatar 100.

Each on-line user computer 200-i, that receives the notice, uses the information in the notice to update the screen display for avatar 100 and updates the instance of avatar 100. Operation 860 transfers to void vector 861 that in turns voids the contents vector and transfers to done operation 862.

When method 830 receives the reply message from method 850, reply check 817 transfers to holding token check 819 if the success field of the play message is SUCCESS, and otherwise to handle failure operations 818.

If the hand token has a valid number identification, check 819 transfers to redraw operation 820, that in turn redraws the token in the hand of avatar 100, and conversely to update pocket amount operation 821. Redraw operation 821, upon completion, also transfers to update pocket amount operation 821.

Update pocket amount operation 821 sets the present amount of the pocket token object to the original amount of the pocket token minus the amount of the new hand token. Pocket amount operation 821 transfers to hand token in reply check 822.

Hand token in reply check 822 first unpacks the contents vector in the reply message to obtain the new hand token object. If the new hand token object has a valid identification number, check 822 transfers to redraw operations 823 and otherwise to animation process 825.

Figure 7D:
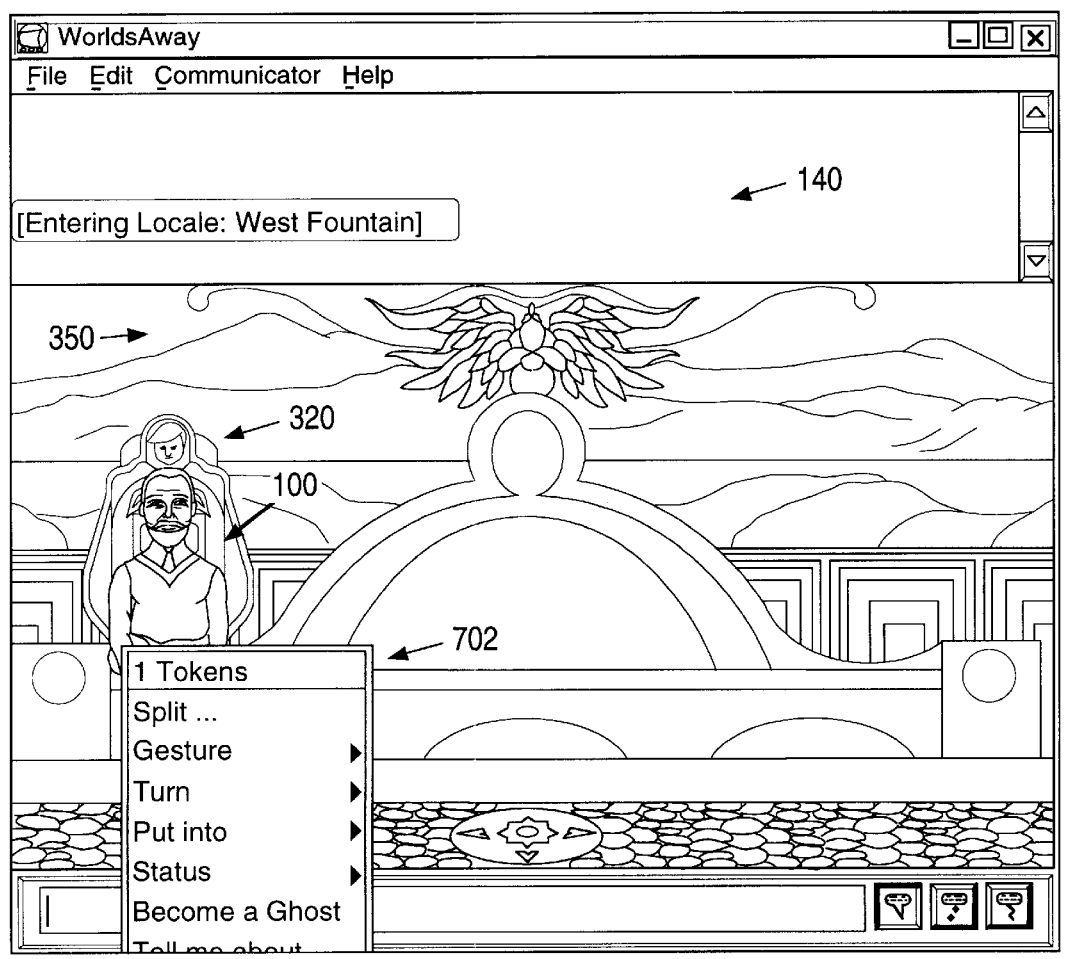
Figure 8:
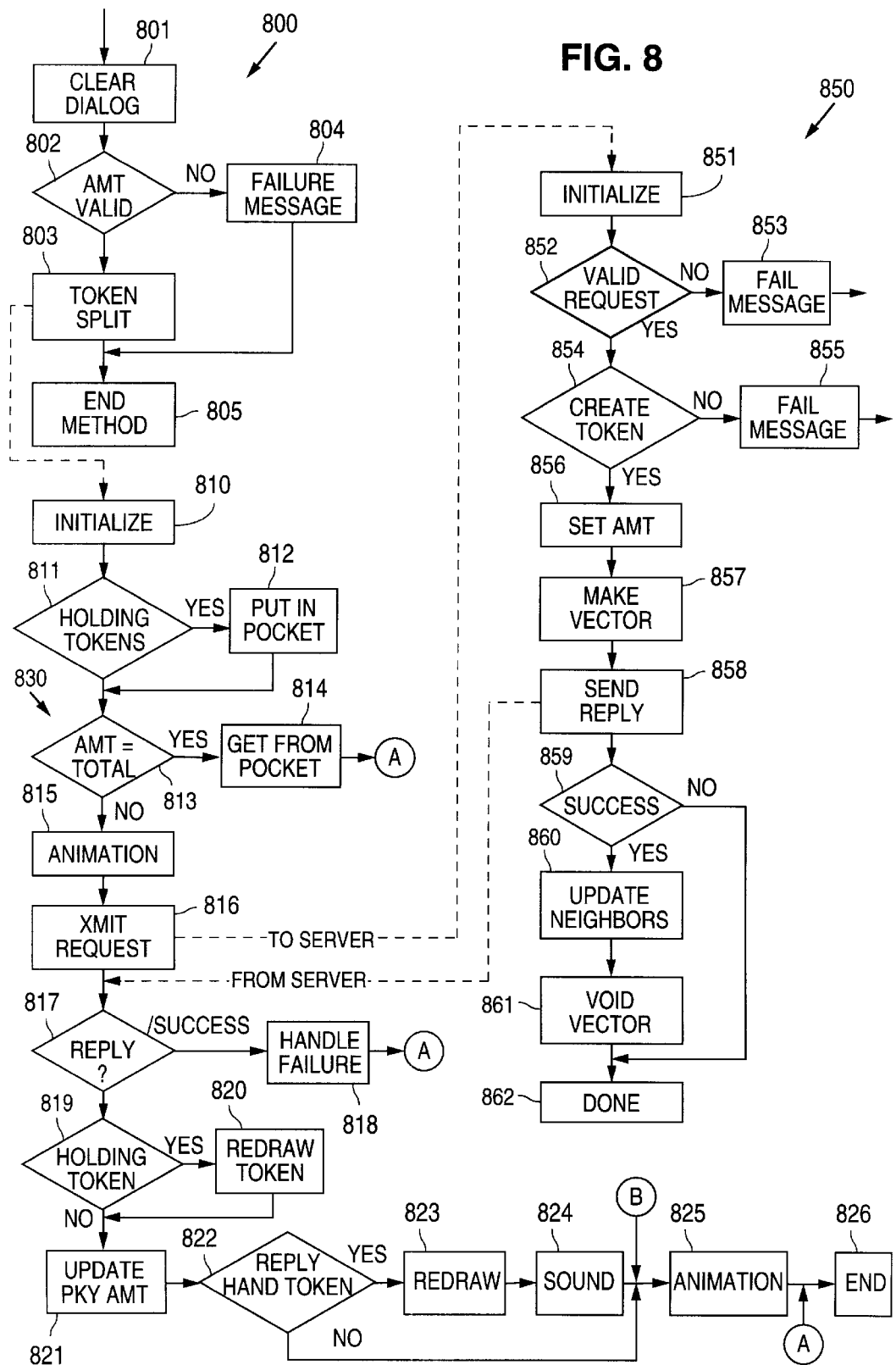
FIG. 8 are client and server process flow diagrams for one embodiment of the token split operation of this invention.

Redraw operation 823 redraws the new hand token object and transfers to sound process 824 that in turn plays a metal jingle sound. Sound process 824 transfers to play animation process 825 that removes the hand of avatar 100 from pocket 105 with the new hand token. Animation process 825 transfers to end method process 826. FIG. 7D illustrates the graphic user interface after the split operations are complete and on-line user again points at token object 110 to obtain pop-up menu 702.

When processing transfers to handle failure process 818, an error message is written on display screen and an animation removing the avatar hand from the pocket without a token is played.

Thus, selection of menu item Split resulted in the use of several client and server processes. One embodiment of methods used for a token split is presented in Appendix A, and is incorporated herein by reference. Table 38 identifies the methods in Appendix A that are used in class token for the split.

TABLE 38

Methods Used For a Token Split

| Process Location | Name |
|---|---|
| client | method tokensBuildMenus__command |
| client | method tokensGetFromPocket__command |
| client | method tokensGetFromPocket__notify |
| server | method getFromPocket__perform |
| client | method tokensPutInPocket__command |
| client | method tokensPutInPocket__notify |
| server | method tokensPutInPocket__perform |
| client | method tokensSplitOK__command |
| client | method tokensSplitPrompt__command |
| client | method tokensSplit__command |
| client | method tokensSplit__notify |
| server | method tokensSplit__perform |

Token—Put in Pocket

Returning to menu 701, if menu item Put in is selected, a right pull menu is presented that lists pocket 105, and any containers in pocket 15 in which token 110 in the hand avatar 100 can be placed. In one embodiment, the client and server processes utilized, when pocket 105 is selected as the storage location for token 110, are the same as those described above for put in pocket process 812. Thus, the description of that process is incorporated herein by reference.

Token—Put in Container within Pocket

If a container is selected, a signal is issued that launches a tokens put in container command method as a client process. Pseudo code for one embodiment of tokens put in container command method is presented in Table 39.

TABLE 39

Pseudo Code for Tokens Put In Container Command Method

If avatar is not adjacent to container, walk adjacent to container, and play animation showing walk.
If container is full, terminate method as failure and give user message "There is no room for tokens in this container."
Play animation of avatar putting hand in container
Send standard put in container request message to server for tokens in hand.
Wait for reply message from server.
If success field of reply message is SUCCESS
　Set container tokens to container token field in reply message.
　Destroy container tokens₁
　Set denomination of tokens to denomination field in reply message.
　Put tokens in container at slot in slot field in reply message.
　Play metal jingle sound.
　Play animation of avatar removing avatar hand from container.
Else,
　Play animation of avatar removing avatar hand from container.
　Handle error.
End method.

In response to the standard put in container request message for tokens in hand in Table 39, a tokens put in container perform method is launched as a server process on server computer 260. One embodiment of pseudo code for the tokens put in container perform method is presented in Table 40.

TABLE 40

Pseudo Code for Token Put in Container Perform Method

If avatar is a ghost, or object is an invalid container, or the object is not an instance of class container, or avatar is not holding the tokens, send failure reply message and terminate;
If the container is in the pocket of avatar,
　If container is closed,
　　If container is locked, send failure reply message, container not open and terminate process.
　　If open of container is successful, Set must close container.
Else,
　Send failure reply message, container not open and terminate process.
Else,
　If container is closed, send failure reply message, container not open, and terminate process.
If container is full, send failure reply message, container full, and terminate process
If container holds tokens,
　Set slot equal to slot in container holding token.
　Add denomination of tokens in container to denomination of token in hand and store in denomination of token.
　Set container token field in reply message to id of container tokens.
　Destroy container tokens.
Else,
　Set container token field in reply message to invalid id.
　Set slot to empty.
Set denomination field in reply message to token denomination.
Set slot field in reply message to value of slot.
If must close container, close container.
Set success field in reply message to SUCCESS.
Send reply message.
If success field in reply message equals SUCCESS,
　Declare tokens put in container notice as a notice message.
　Initiate notice message.
　Set actor field in notice message to number id of avatar.
　Set container tokens field in notice message to container tokens field in reply message.
　Set denomination field in notice message to denomination field in reply message.
　Set container field in notice message to number id of container.
　Set slot field in notice message to value of slot.
　Send notice message to neighbors with token number id.

When the neighbors receive the notice message with the token number id, each neighbor launches a tokens put in container notify method as a client process. One embodiment of pseudo code for the tokens put in container notify method is presented in Table 41.

TABLE 41

Pseudo Code for Token Put in Container Notify Method

Set actor to actor field in notice message.

Set container tokens to container tokens field in notice message.
Set container to container field in notice message.
Play animation of avatar placing hand in container.
Destroy instance of container tokens.
Set denomination of token in avatar hand to value in denomination field of notice message.
Put tokens in container.
Play metal jingle sound.
Play animation of avatar removing hand from container.
End method.

One embodiment of methods used for a putting a token in a container is presented in Appendix A, and is incorporated herein by reference. Table 42 identifies the methods in Appendix A that are used in putting a token in a container.

TABLE 42

Avatar Class Specific Methods For Putting a Token Object in A Container

| Process Location | Name |
|---|---|
| client | method tokensPutInContainer_command |
| client | method tokensPutInContainer_notify |
| server | method tokensPutInContainer_perform |

The previous embodiment was specifically for a token object that had a denomination. General methods for putting a general portable virtual object in a virtual container are similar to those described for a token object. However, other virtual objects do not have a denomination and so these operations are unnecessary. Also, if a container contains an instance of one type of virtual object, the virtual object in the container is not destroyed when another virtual object of the same type is placed in the container. Rather, a specific slot is required in the container for each virtual object, other than a token object, independent of the particular type of the virtual object.

For example, if a container contains a first set of flowers, a second set of flowers cannot be put in that container unless the container has an empty slot. If an empty slot is available, the container holds two sets of flowers.

When a container is pointed to that includes a token, a pop-up menu such as that presented in Table 43 is displayed on display screen 250-1.

TABLE 43

Pop-up Menu When Container is Pointed at and Avatar's Hands are Empty

Token [token value]
Get

When on-line user 225-1 selects menu item Get using mouse 202-1, a signal is supplied to the process that built the menu, in a manner similar to that previously described, and that process generates a standard get from container command message. In response to the standard get from container command message, a tokens get from container command method is launched on computer 200-1 as a client process.

Table 44 is pseudo code for one embodiment of tokens get from container command method.

TABLE 44

Pseudo Code for Tokens Get From Container Command Method

Initialize actor, tokens and container.
If not adjacent to container, walk adjacent to container.
Play animation of avatar putting hand in container.
Send standard get from container request message to server for tokens.
Wait for reply message from server.
If success field of reply message is SUCCESS,
　Transfer tokens from container to hand of avatar;
　Play metal jingle sound; and
　Play animation of removing avatar hand from container.
Else,
　Play animation of removing avatar hand from container; and
　Handle error.
End method.

In response to the standard get from container request message for tokens in Table 43, a standard get from container perform method is launched as a server process on server computer 260. One embodiment of pseudo code for standard get from container perform method is presented in Table 45.

TABLE 45

Pseudo Code for Get From Container Perform Method

Initialize success field of reply message to success.
Set item to token
If item is not in container,
　Set success field of reply message to failure; and
　Go to send reply.
Define container as object holding item.
Check for illegal conditions, e.g., If avatar is a ghost, or item is immobile, or if hands of avatar are full, or container is not a container, set success field of reply message to failure and go to send reply message.
If container is an avatar,
　Set success field of reply message to failure object not accessible; and
　Go to send reply message.
If avatar is not adjacent to container,
　Set success field of reply message to failure not adjacent; and
　Go to send reply message.
If container is closed,
　Set success field of reply message to failure container not open; and
　Go to send reply message.
Move item from container to avatar's hands.
If move is not successful,
　Set success field of reply message to internal failure; and
　Go to send reply message.
Send reply message
If success field in reply message equals SUCCESS;
　Declare standard get from container notice as a notice message;
　Initiate notice message;
　Set actor field in notice message to number id of avatar; and
　Send notice message to neighbors with item number id.

When the neighbors receive the notice message with the item number id, each neighbor launches a tokens get from container notify method as a client process. One embodiment of pseudo code for the tokens get from container notify method is presented in Table 46.

TABLE 46

Pseudo Code for Token Get From Container Notify Method

Play animation of avatar placing hand in container.
Move token from container to avatar's hand.
Play metal jingle sound.
Play animation of avatar removing hand from container.
End method.

One embodiment of methods used for a getting a token from a container is presented in Appendix A, and is incorporated herein by reference. Table 47 identifies the methods in Appendix A that are used in getting a token in a container.

TABLE 47

Avatar Class Specific Methods For Getting
a Token Object from A Container

| Process Location | Name |
|---|---|
| client | method tokensGetFromContainer_command |
| client | method tokensGetFromContainer_notify |
| server | method GetFromContainer_perform |

The previous embodiment was specifically for a token object that had a denomination. General methods for getting a general portable virtual object from a virtual container are similar to those described for a token object.

For the embodiment described above, a token class is defined and an instance of the token class is generated for each token object in the virtual world. In one embodiment, an instance of a token is maintained in memory of the on-line user's computer 200-i and in the memory of server computer 260. A definition of the token class is given in Table 48. The various fields and methods defined in the token class have names that correspond to the name of the data represented by the field or the operation performed by the method.

An instance of the token class is an example of a medium of exchange object that is an instance of a medium of exchange class. In view of this disclosure, those of skill in the art can define medium of exchange classes that are other than the token class given in Table 48.

TABLE 48

A Definition for Class Tokens

```
class tokens {
    info {
        classNumber      thisClass( );
        version          thisVersion( );
        name             "Tokens";
        capacity         0;
        avatarSlot       AVATAR_TOKENS;
        helpResourceID   TOKENS_HELP;
    }
    instance {
        include "instance.cld",
        /* class specific instance data*/
            common:
                uint32   denom;
    }
    /*
```

TABLE 48-continued

A Definition for Class Tokens

```
**      Resources used by class tokens.
*/
verb walkTo;
verb get;
verb split;
sound metalJingle;
/*
**      Standard methods used by class tokens.
*/
method goToObject_command;
method goToAndGet_command;
method destroy_notify;
method getFromPocket_perform;
method getFromContainer_perform;
method help_command;
method help_perform;
method cancelButton_command;
/*
**      Methods for class tokens only.
*/
client  method  tokensBuildMenus_command
client  method  tokensGetFromContainer_command
client  method  tokensGetFromContainer_notify
client  method  tokensGetFromPocket_command
client  method  tokensGetFromPocket_notify
client  method  tokensPutInContainer_command
client  method  tokensPutInContainer_notify
server  method  tokensPutInContainer_perform
client  method  tokensPutInPocket_command
client  method  tokensPutInPocket_notify
server  method  tokensPutInPocket_perform
client  method  tokensSetDenom_notify
client  method  tokensSetName_command
client  method  tokensSplitOK_command
client  method  tokensSplitPrompt_command
client  method  tokensSplit_command
client  method  tokensSplit_notify
server  method  tokensSplit_perform
}
```

ATM

Figure 9A:
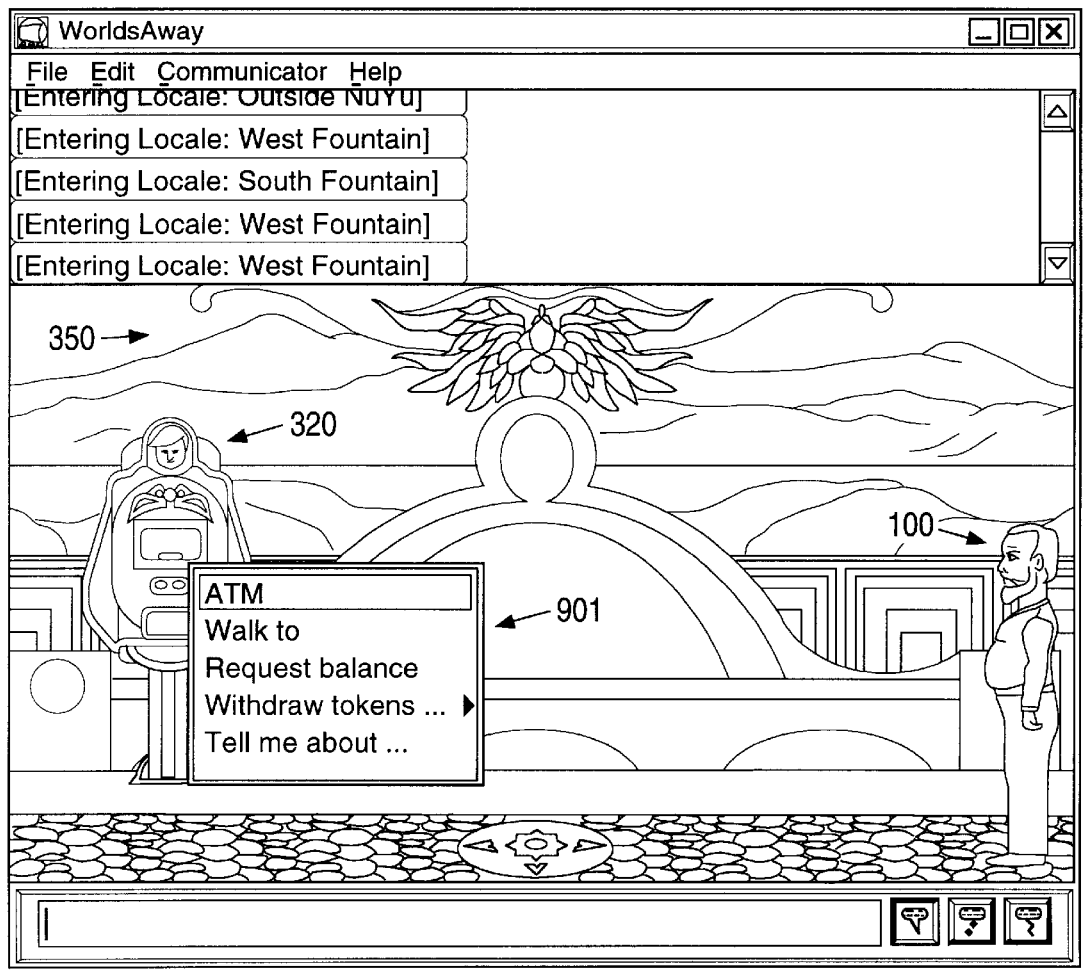
FIG. 9A is an illustration of a pop-up menu in the graphic user interface of FIG. 3A that is generated when the avatar is not adjacent to the ATM and the on-line user points at the ATM object.

As explained above, ATM 320 (FIGS. 3A and 9A), an instance of class ATM, dispenses tokens to avatars in a plurality of denominations. In one embodiment, the denominations available to avatar 100 are 10, 50, 100, 500, and the entire bank balance of avatar 100. In this embodiment, ATM 320 checks in both the hand and pocket 105 of avatar 100 for tokens when avatar 100 approaches and uses ATM 320. In another embodiment, ATM 320 checks only for money in the hand of avatar 100. In this embodiment, the help object for ATM 320 instructs avatar 100 "You must have money in your hand to make a deposit in ATM."

In this embodiment, when on-line user 225-1 points at ATM 320, and then depresses the left mouse button, a signal is generated by mouse 202-1 that is interpreted by a client process executing in computer 200-1 that builds menu 901 (FIG. 9A) when avatar 100 is not holding a token. The options in menu 901 are given in Table 49.

TABLE 49

Menu When Pointing at ATM object 320
Without Holding an Object

<ATM name>

WalkTo
Withdraw
Request Balance
Tell me about . . .

ATM—Request Balance

To determine his bank balance, on-line user 225-1 selects menu item Request balance by pointing at the menu item with mouse 202-1 and releasing the mouse button. (See FIG. 9B.) This generates a signal that is interpreted by a process executing on computer 200-1 and the client process that generated menu 901 is notified of the selection. Consequently, the client process that generated menu 901 generates an ATM balance command message.

In response to the ATM balance command message, an ATM balance command method is launched as a client process on computer 200-1. Table 50 is pseudo code for one embodiment of the ATM balance command method.

TABLE 50

Pseudo code for ATM Balance Command Method

Figure 9B:
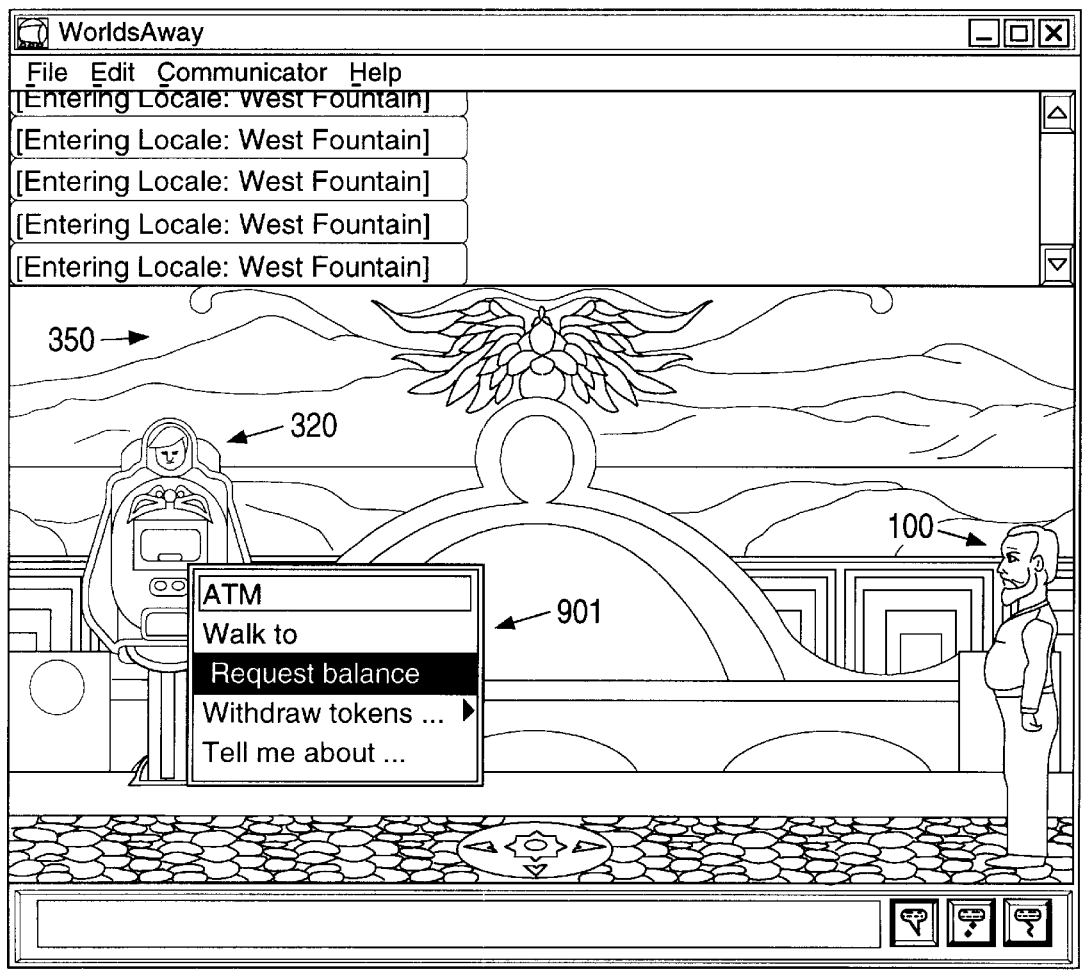
FIG. 9B illustrates the on-line user pointing at menu item Request Balance in the pop-up menu of FIG. 9A.
Figure 9C:
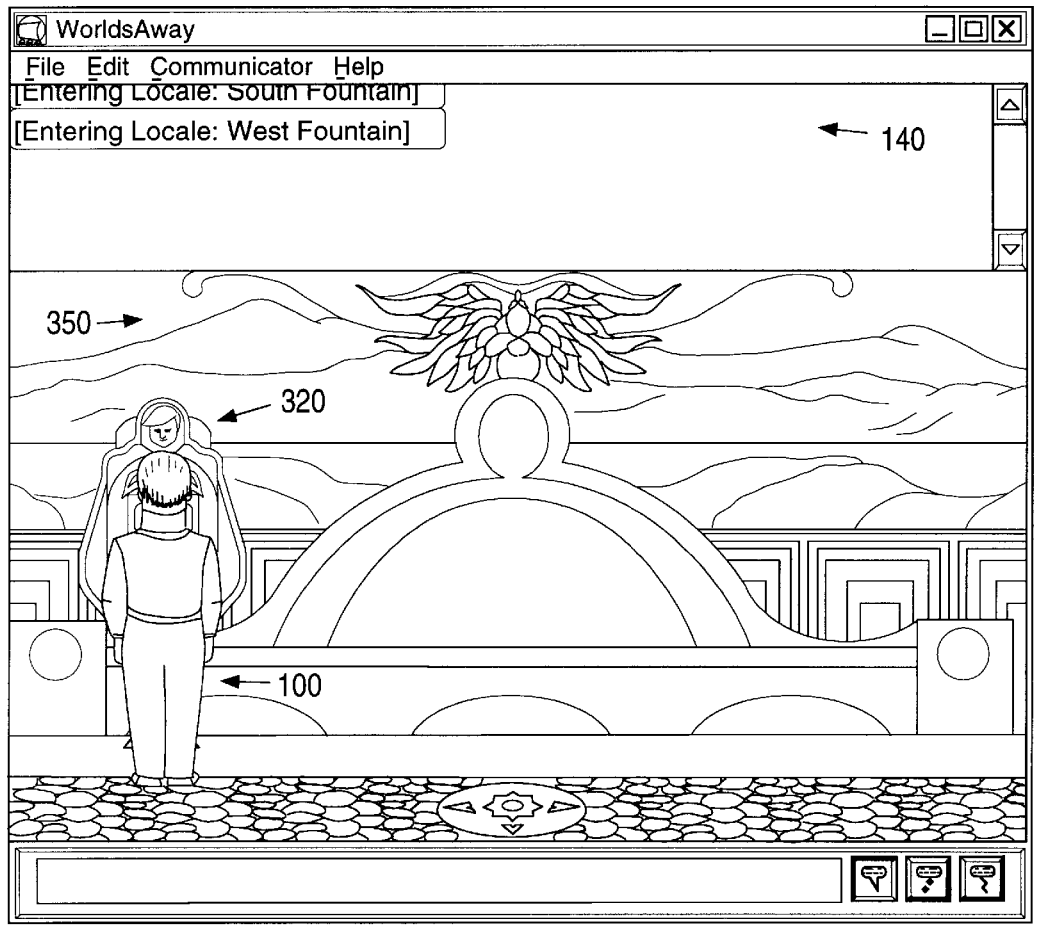
FIG. 9C illustrates the position of the avatar after the selection of the menu item in FIG. 9B and the avatar has walked to and faced the ATM object.
Figure 9D:
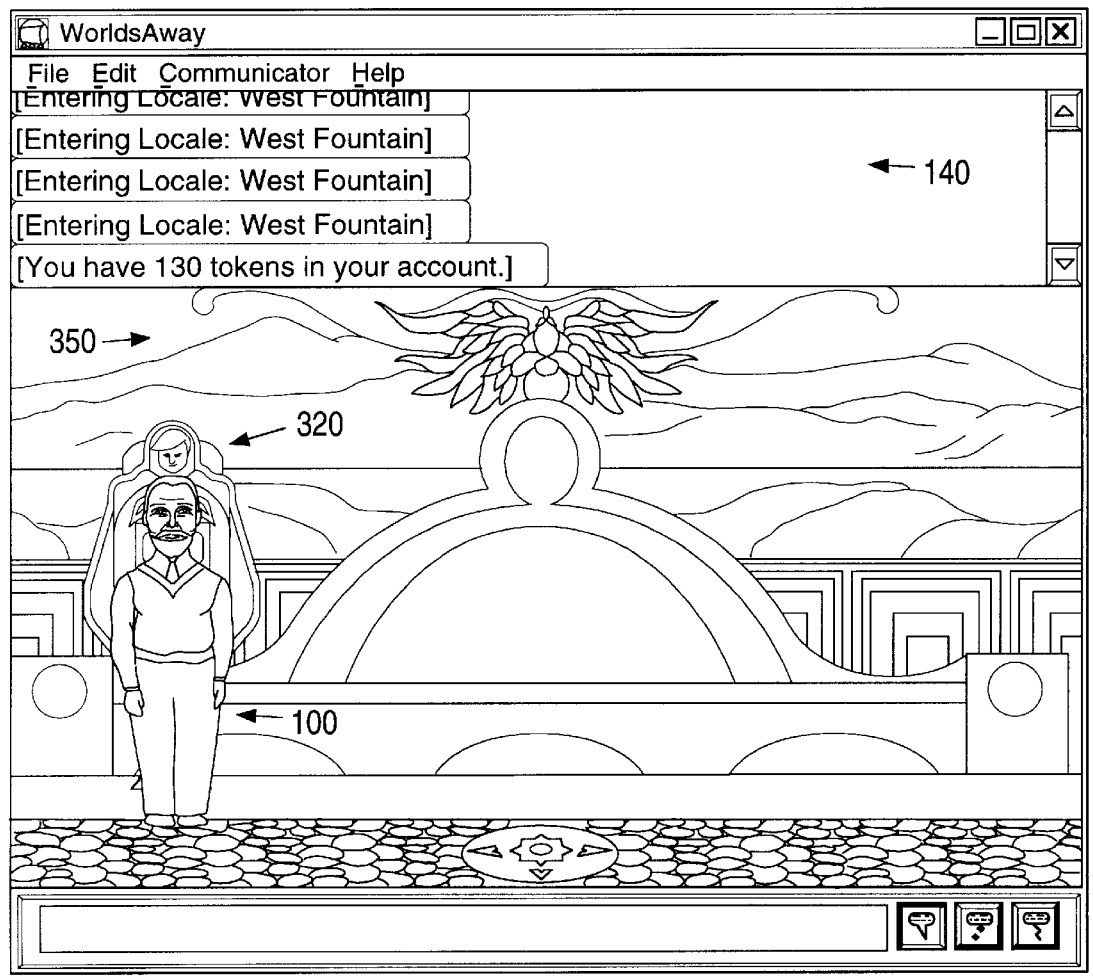
FIG. 9D illustrates the position of the avatar and the message provided when the request balance operations are completed.
Figure 9E:
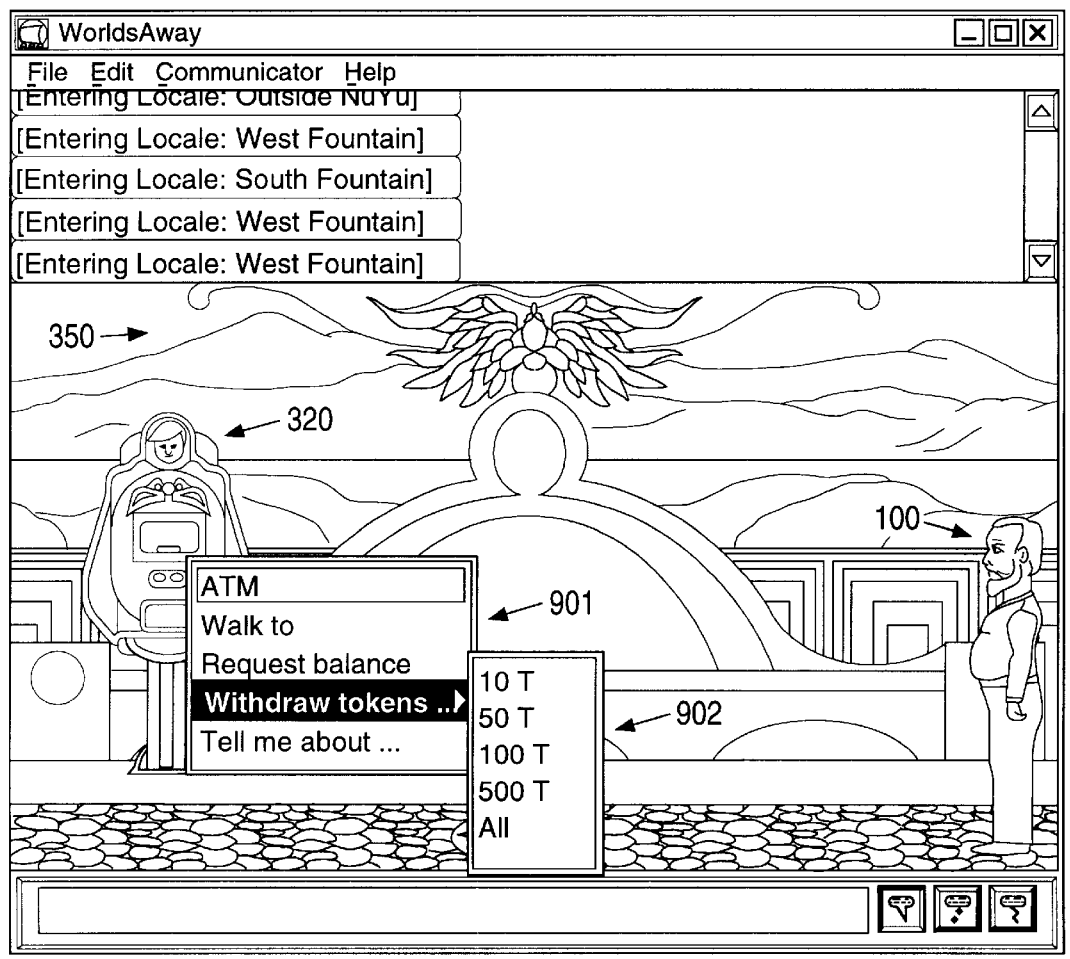
FIG. 9E illustrates the on-line user pointing at menu item Withdraw Tokens in the pop-up menu of FIG. 9A and the resulting right-pull pop-up menu that is generated.

Block actions.
Walk avatar adjacent to ATM (FIG. 9B to FIG. 9C).
Change avatar to facing ATM (See FIG. 9C) avatar.
Play animation of avatar operating ATM.
Play push button sound.
Play avatar fiddle animation.
Play button sound sequence.
Play ATM thunk sound.
Play computer on sound.
Send ATM balance request message to server.
Wait for reply message from server.
End animation.
If success field of reply message indicates success,
   Set balance to value in balance field of reply message;
   If balance is 1,
     Display "You have one token in your account".
   Else,
     Display "You have (balance) tokens in your account". (See FIG. 9D)
   Change avatar to facing frontside. (See FIG. 9D)
Else
   Change avatar to facing frontside. (See FIG. 9D)
   Handle failure.
Unblock actions.

In response to the ATM balance request message, an ATM balance request perform method is launched on server computer 260. One embodiment of ATM balance request perform method is presented in Table 51.

TABLE 51

Pseudo Code for ATM Balance Request Perform Method

Initialize success field of reply message to failure and balance field of reply message to zero.
If avatar is a ghost, send reply message and terminate.
If avatar is not adjacent to ATM, set success field of reply message to not adjacent failure, send reply message and terminate.
Update balance for avatar—calculate time since last balanced for avatar and add appropriate amount to bank balance.
Set success field of reply message to success.
Set balance field of reply message to updated balance.
Send reply message with success status and balance.

If success send neighbors message notice of avatar operating ATM.

In response to the ATM balance notice message, an ATM balance notify method is launched, as a client process, on each on-line computer that displays avatar 100. Table 52 is pseudo code of one embodiment of the ATM balance notify method.

At the time this client process is executed, the walk to process, which is the first operation in Table 50, has sent a message to the server which in turn notified the neighbors. The neighbors, in response to the notice from the server concerning the walk to operation, have moved the avatar to in front of the ATM. Consequently, the ATM balance notify method starts with the avatar adjacent to the ATM.

TABLE 52

Pseudo Code for ATM Balance Request Notify Method

Change avatar to facing ATM avatar
Play animation of avatar operating ATM
Play push button sound
Play avatar fiddle animation
Play button sound sequence
Play ATM thunk sound
Play computer on sound
End animation
End method.

One embodiment of methods used for the ATM balance request is presented in Appendix A, and is incorporated herein by reference. Table 53 identifies the methods in Appendix A that are used in ATM balance request.

TABLE 53

Avatar Class Specific Methods For ATM Balance

| Process Location | Name |
| --- | --- |
| client | method atmBalance__command |
| client | method atmBalance__notify |
| server | method atmBalance__perform |

ATM—Withdraw

To withdraw tokens from ATM 320, on-line user 225-1 selects menu item Withdraw in menu 901 by pointing at the menu item with mouse 202-1 which generates a signal that is interpreted by a process executing on computer 200-1 and a right pull menu 902 is displayed. On-line user 225-1 then selects the desired denomination of the token object from menu 902.

When on-line user 225-1 selects a denomination, a signal is generated that is interpreted by a process executing on computer 200-1 and the client process that generated menu 902 is notified of the selection. In response to the notification, an ATM withdraw command message is generated with the selected amount as an argument.

In response to the ATM withdraw command message, an ATM withdraw command method is launched as a client process on computer 200-1. Table 54 is pseudo code for one embodiment of the ATM withdraw command method.

TABLE 54

Pseudo Code for ATM Withdraw Command Method

Block actions.
Walk avatar adjacent to ATM.

Figure 9F:
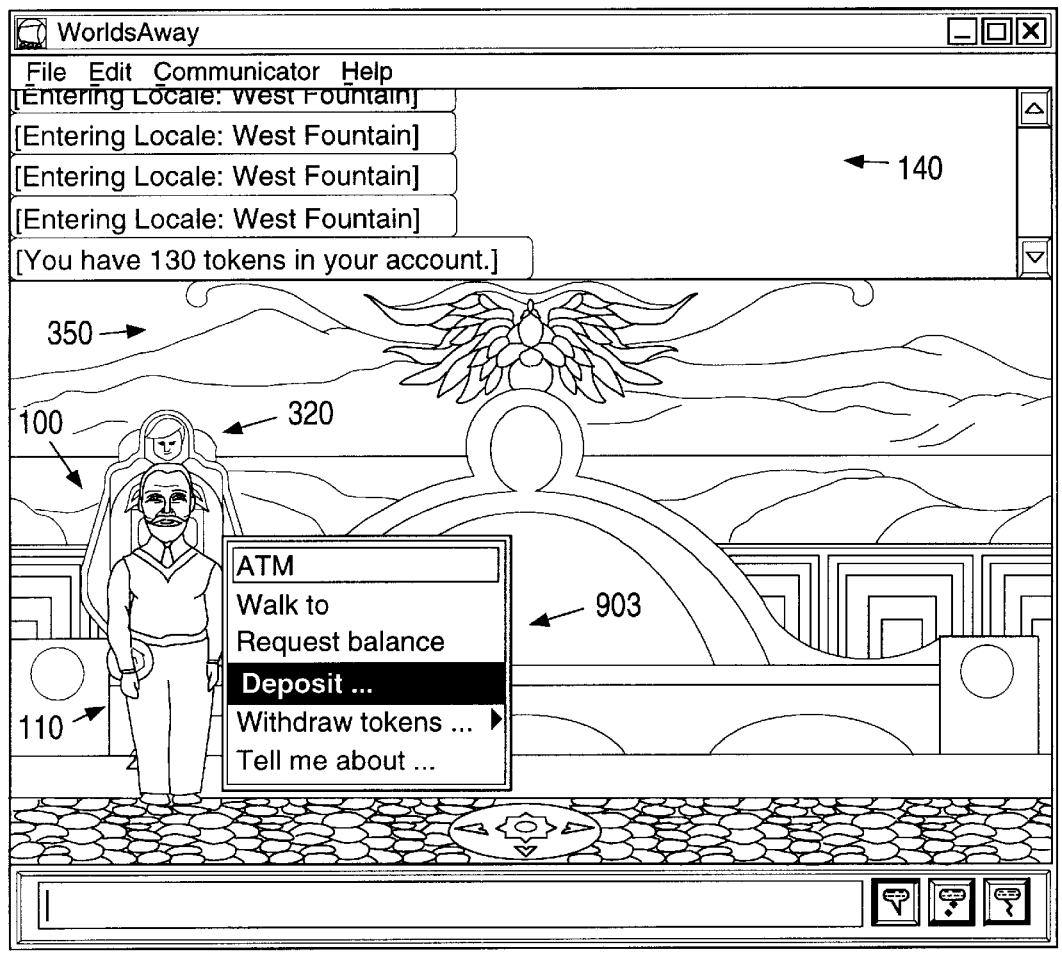
FIG. 9F illustrates the graphic user interface after avatar has withdrawn tokens and so is holding a token, and the on-line user points at menu item Deposit in the pop-up menu of FIG. 9A.

Change avatar to facing ATM (See FIG. 9B).
Play animation of avatar operating ATM.
Play button sound sequence.
Send ATM withdraw request message to server with requested amount as an argument.
Wait for reply message from server.
End animation.
If success field of reply message indicates success.
    Play ATM thunk sound.
    Play ATM pay sound.
    Set amount to amount field in reply message.
    If avatar holding a token.
        Set denomination of held token to amount of token plus requested amount.
    Else,
        Unpack new instance of token class returned by server in contents vector of reply message.
    If amount withdrawn is 1,
        Display dialogue "You withdrew one token".
    Else
        Display dialogue "You withdrew (balance) tokens".
    Set balance to balance field in reply message.
    If balance is zero,
        Display "You have no tokens in your account."
    Else if balance is one
        Display "You have one token in your account".
    Else
        Display dialogue "Your have (balance) tokens in your account."
    Change avatar to facing frontside (This redraws the avatar holding a token in hand as illustrated in FIG. 9F.)
Else if success field of reply message is bad denomination
    Play ATM error sound
    Set balance to balance field in reply message
    If balance is one
        Display "Insufficient funds. Current balance is one token."
    Else
        Display "Insufficient funds. Current balance is (balance) tokens."
    Change avatar to facing frontside
Else
    Change avatar to facing frontside
    Handle failure
Unblock actions In response to the ATM withdraw request message, an ATM withdraw perform method is launched on server computer 260 as a server process. One embodiment of ATM withdraw perform method is presented in Table 55.

TABLE 55

Pseudo Code for ATM Withdraw Perform Method

Initialize success field, amount field, balance, cvsize, and contents vector of reply message to failure, zero, zero, zero, and null, respectively.
    If avatar is a ghost, send reply message and terminate.
    If avatar is not adjacent to ATM, sent success field of reply message to not adjacent failure, send reply message and terminate.
    Update balance for avatar—calculate time since last balanced for avatar and add appropriate amount to bank balance.
Set balance field of reply message to updated balance.
If amount is entire balance, set amount to bank balance,
If entire balance is zero, or amount is greater than bank balance(check for overdraft).
    Set success field of reply message to bad denomination.
    Go to send reply message.
If avatar is holding an object,
    Set tokens to instance of object in avatar hands.
    If tokens is not instance of class tokens, Send reply message and terminate.
    Set bank account balance to bank account balance minus amount.
    Increase value of token in hand by amount.
    Set success field of reply message to success.
    Set amount field of reply message to amount.
    Set balance field in reply message to bank account balance.
    Go to send reply message.
Else,
    Create new token instance of class token.
    Set denomination of new token to amount.
    Activate new token object.
    Set bank account balance to bank account balance minus amount.
    Set success field of reply message to success.
    Set amount field of reply message to amount.
    Set balance field in reply message to bank account balance.
    Pack new token in contents vector,
Send reply message.
If success field of reply message is success declare and initiate notice message
    Set actor field of notice message to number id of avatar requesting withdrawal.
    Set amount of notice message to value in amount field of reply message.
    Set contents vector of notice message to contents vector of reply message.
    Set contents vector size field of notice message to value in contents vector size field of reply message.
    Send notice message to neighbors.
    Void and free contents vector.
    Update withdrawals from ATM.
End method.

In response to the ATM withdraw notice message, an ATM withdraw notify method is launched on each on-line computer that displays avatar 100 as a client process. Table 56 is pseudo code of one embodiment of the ATM withdraw notify method.

At the time this client process is executed, the walk to process, which is the first operation in Table 54, has sent a message to the server which in turn notified the neighbors of the movement of avatar 100 to ATM 320. The neighbors, in response to the notice from the server concerning the walk to operation, have moved avatar 100 to in front of ATM 320. Consequently,.the ATM balance notify method starts with avatar 100 adjacent to ATM 320.

TABLE 56

Pseudo Code for ATM Withdraw Notify Method

Set avatar to avatar identified in notice message.
Change avatar to facing ATM (See FIG. 9B) avatar.
Play animation of avatar operating ATM.
Play avatar fiddle animation.
Play button sound sequence.

End animation.
Play ATM thunk sound.
Play ATM pay sound.
If avatar is holding an object,
  Increase value of token in hand by value of amount field in notice message.
Else,
  Unpack contents vector in notice message.
Change avatar to facing frontside.
End method.

One embodiment of methods used for the ATM withdrawal is presented in Appendix A, and is incorporated herein by reference. Table 57 identifies the methods in Appendix A that are used in the ATM withdrawal.

TABLE 57

Avatar Class Specific Methods For ATM Withdrawal

| Process Location | Name |
|---|---|
| client | method atmWithdraw_command |
| client | method atmWithdraw_notify |
| server | method atmWithdraw_perform |

ATM-Deposit

In this embodiment, when on-line user 225-1 points at ATM 320, and then depresses the left mouse button, a signal is generated by mouse 202-1 that is interpreted by a client process executing in computer 200-1 that builds menu 903 when avatar 100 is holding a token.

The options in menu 903 (FIG. 9F) are given in Table 58.

TABLE 58

Menu When Pointing at ATM object 320 With an Object in Hand

<ATM name>

WalkTo
Deposit
Request Balance
Tell me about . . .

To deposit tokens in ATM 320, on-line user 225-1 selects menu item Deposit by pointing at the menu item with mouse 202-1 and releasing the mouse button. This generates a signal that is interpreted by a process executing on computer 200-1 and a signal is generated that notifies the client process that built menu 903 of the selection. In response to the notification, an ATM deposit command message is generated with the number identification of avatar 100 as an argument.

In response to the ATM deposit command message, an ATM deposit command method is launched on computer 200-1 as a client process. Table 59 is pseudo code for one embodiment of the ATM deposit command method.

TABLE 59

Pseudo Code for ATM Deposit Command Method

Block actions.
Set actor to avatar 100.
Set tokens to contents of object in avatar's hand.
Move avatar adjacent to ATM, if necessary.
Change avatar to face machine.
Unblock actions.
Generate display dialogue box with dialogue "How many tokens do you wish to deposit?" (See FIG. 9G).
End method.

After on-line user 225-1 enters a value in dialogue box 921, and selects deposit button 922, the selection of the deposit button generates a signal that in turn results in the launching of an ATM deposit OK command method on computer 200-1 as a client process. Table 60 is pseudo code for one embodiment of ATM deposit OK command method.

TABLE 60

Pseudo Code for ATM Deposit OK Command Method

Figure 9H:
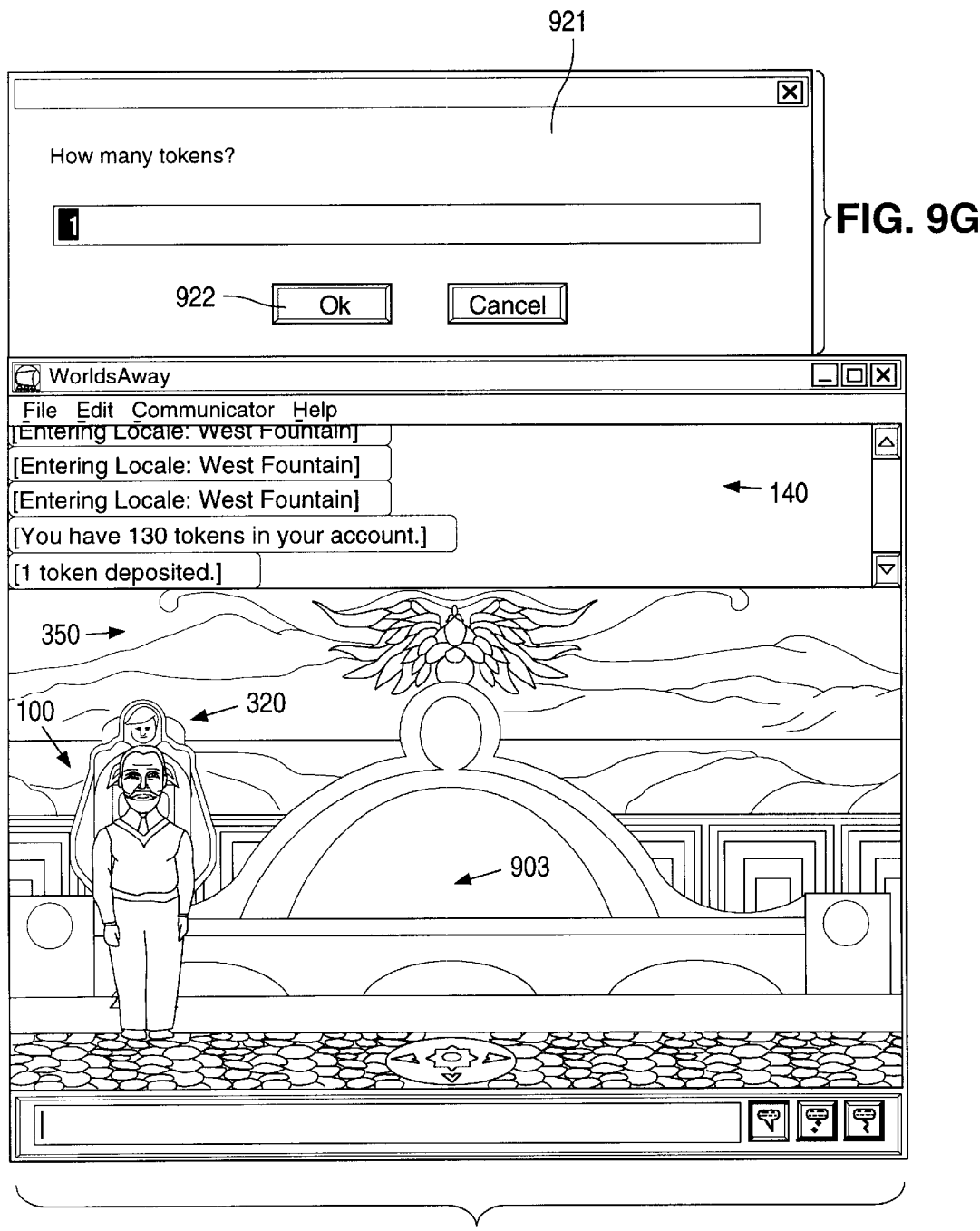
FIG. 9H illustrates the graphic user interface after avatar has turned deposited the token and then returned to the original position, and the message showing the number of tokens deposited.
Figure 10:
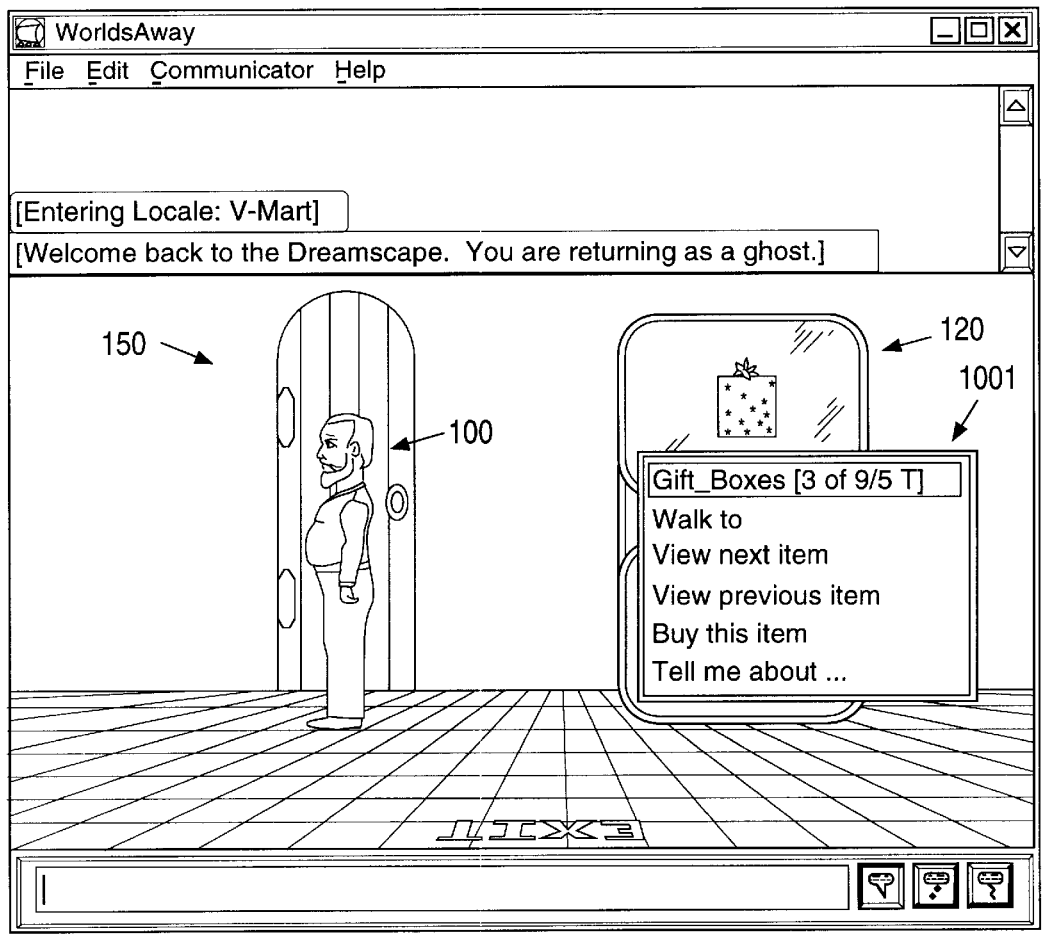
FIG. 10 illustrates a pop-up menu that is generated in the graphic user interface of FIG. 1, when the on-line user points at the vendroid object.

Get deposit amount and kill dialogue box.
Block actions.
If deposit amount is not a number, or deposit amount is less than one,
  Change avatar orientation to frontside.
  Unblock actions.
  Handle failure—failure message "Sorry, that is not a good number. Please try again."
Set tokens to contents of avatar's hands.
If denomination of tokens is less than deposit amount,
  Change avatar orientation to frontside.
  Handle failure—failure message "Your are not holding enough tokens!"
Play animation of avatar operating machine.
Play push button sound.
Play avatar fiddle animation.
Play button sequence sound.
Play ATM thunk sound.
Play ATM deposit sound.
Send ATM deposit request message to server with deposit amount as argument.
End animation.
Wait for reply message from server.
If success field of reply message is success,
  Adjust tokens denomination by subtracting deposit amount.
  If tokens denomination is zero, send standard destroy message for tokens.
  Set amount deposited to value of amount field in reply message.
  If amount deposited is 1, display dialogue "One token deposited", (See FIG. 9H)
  Else
    Display dialogue "(Amount deposited) tokens deposited.)
  Change avatar orientation to frontside.
Else,
  Change avatar orientation to frontside.
  Unblock actions.
  Handle error.
Unblock actions.

In response to the ATM deposit request message, an ATM deposit perform method is launched on server computer 260 as a server process. One embodiment of ATM deposit perform method is presented in Table 61.

TABLE 61

Pseudo Code for ATM Deposit Perform Command Method

Initialize success field, and amount field of reply message to failure, and zero, respectively.

If avatar is a ghost, go to send reply message.
If avatar is not adjacent to ATM, set success field of reply message to not adjacent failure, and go to send reply message.
If avatar is holding an object,
  Set tokens to instance of object in avatar hands.
  If tokens is not instance of class tokens, go to send reply message.
    If deposit amount is greater than denomination of tokens, go to send reply message.
    Adjust tokens denomination by subtracting deposit amount.
    If tokens denomination is zero, destroy tokens object.
    Update bank balance by deposit amount.
    Update bank balance for avatar—calculate time since last balanced for avatar and add appropriate amount to bank balance.
    Set balance field of reply message to updated balance.
    Set success field of reply message to success.
    Set amount field of reply message to deposit amount.
Send reply message.
If success field of reply message is success declare and initiate notice message,
  Set actor field of notice message to number id of avatar requesting withdrawal.
  Set amount of notice message to value in amount field of reply message.
  send notice message to neighbors.
  update deposits to ATM.
End method.

In response to the ATM deposit notice message, an ATM deposit notify method is launched on each on-line computer that displays avatar 100 as a client process. Table 62 is pseudo code of one embodiment of the ATM deposit notify method.

At the time this client process is executed, the walk to process, which is the first operation in Table 59, has sent a message to the server which in turn notified the neighbors of the movement of avatar 100 to ATM 320. The neighbors, in response to the notice from the server concerning the walk to operation, have moved avatar 100 to in front of ATM 320. Consequently, the ATM deposit notify method starts with avatar 100 adjacent to ATM 320.

TABLE 62

Pseudo Code for ATM Deposit Notify Method

Set avatar to avatar identified in notice message.
Set tokens to contents of avatar's hands.
Change avatar orientation to backside.
Decrease value of token in hand by value of amount field in notice message.
If denomination of tokens is zero, send standard destroy notice for tokens.
Play animation of avatar operating ATM.
Play avatar fiddle animation.
Play button sound sequence.
Play ATM thunk sound.
Play ATM deposit sound.
End animation.
Change avatar orientation to frontside.
End method.

One embodiment of methods used for an ATM deposit is presented in Appendix A, and is incorporated herein by reference. Table 63 identifies the methods in Appendix A that are used for an ATM deposit.

TABLE 63

Avatar Class Specific Methods For an ATM Deposit

| Process Location | Name |
| --- | --- |
| client | method atmDepositOK_command |
| client | method atmDeposit_command |
| client | method atmDeposit_notify |
| server | method atmDeposit_perform |

For the embodiment described above, an ATM class is defined and an instance of the ATM class is generated for each locale in the virtual world for which an ATM is desired. A definition of the ATM class is given in Table 64. The various fields and methods defined in the ATM class have names that correspond to the name of the data represented by the field and the operation performed by the method, respectively.

TABLE 64

A Definition for Class ATM

```
class atm  {
    info  {
        classNumber    thisClass ( );
        version        thisVersion ( );
        name           "ATM";
        capacity
        helpResourceID ATM_HELP;
    }
    instance {
        include "instance.cld";
        /* class specific instance data */
            server:
                uint32    deposits;
                uint32    withdrawals;
    }
/* sounds */
    sound withdraw1;
    sound withdraw2;
    sound atmPay;
    sound deposit1;
    sound deposit2;
    sound depositCoin;
    sound balance1;
    sound balance2;
    sound balanceCoin;
/* images */
    image atm_machine;
/* class methods: First those that respond to standard commands */
/* shared methods */
    method goToObject_command;
    method goToAndGet_command;
    method putInPocket_command;
    method putInPocket_perform;
    method putInPocket_notify;
    method putInContainer_command;
    method putInContainer_perform;
    method putInContainer_notify;
    method getFromPocket_command;
    method getFromPocket_perform;
    method getFromPocket_notify;
    method getFromContainer_command;
    method getFromContainer_perform;
    method getFromContainer_notify;
    method destroy_notify;
    method setName_command;
    method help_command;
    method help_perform;
    method cancelButton_command;
* custom methods for standard commands */
```

TABLE 64-continued

A Definition for Class ATM

```
    verb walkTo;
    verb help;
    verb balance;
    verb withdraw;
    verb deposit;
/* class specific methods */
    client   method   atmBalance_command
    client   method   atmBalance_notify
    server   method   atmBalance_perform
    client   method   atmBuildMenus_command
    client   method   atmDepositOK_command
    client   method   atmDeposit_command
    client   method   atmDeposit_notify
    server   method   atmDeposit_perform
    client   method   atmWithdraw_command
    client   method   atmWithdraw_notify
    server   method   atmWithdraw_perform
```

Vendriods

As explained above, vendriods are instance of a class vendroid and are virtual vending machine objects, such as virtual vending machine object 120 (FIG. 1). A vendroid object is an object that sells portable virtual items in exchange for tokens deposited by avatars. Different virtual items have different values, and vendroids do not all have the same virtual items for sale. Portable virtual items can be resold to pawn machines at a price set below the original price by the oracles, typically eighty percent of the original price. Vendroid items are stocked by the oracles and in this embodiment, the vendroids are maintained at full capacity. The vendroid item last displayed in the window of the vendroid remains after avatar 100 has stopped interacting with vendroid. In one embodiment, there is a limit of 32 bytes for menu titles and menu items for a vendroid 120.

Currently, there are two styles of vendroids in the virtual world. A generic flat vendroid with a big flat window/screen that has a 3D frame such as vending machine 120, and a free standing machine with a bubble on top.

In this embodiment, when on-line user 225-1 points at vending machine 120, and then depresses the left mouse button, a signal is generated by mouse 202-1 that is interpreted by a client process executing in computer 200-1 that builds menu 1001. The options in menu 1001 are given in Table 65.

TABLE 65

Menu When Pointing at Vending Machine Object 120

[optionalname]Vending Machine
((item # of total)/(cost)T)
Walk to
View next item
View previous item
Buy this item
Tell me about . . .

The first line of menu 1001 is an identification of the particular vending machine, the number of the item displayed in the total number of items in vending machine 121 and the cost of the displayed item in tokens. In Table 65, this information is presented as two lines for convenience only.

Menu items Walk To and Tell me about function in the same manner as the described above for other menus and so are not considered further.

Menu items View Next Item and View Previous Item are used by avatar 100 to view the items available from vending machine 120. When menu item View Next Item is sequentially selected by on-line user 225-1, vending machine 120 cycles through the items in machine 120 and eventually cycles back around and the items begin appearing a second time. Menu item View Previous Item works in a similar way.

Vendroid—View Next Item

To view the next item in vending machine 120, on-line user 225-1 selects menu item View Next Item by pointing at the menu item with mouse 202-1 and releasing the mouse button. This generates a signal that is interpreted by a process executing on computer 200-1 and the client process that generated menu 1001 is notified of the selection. Consequently, the client process that generated menu 1001 generates a vendroid view next command message with forward set to true as an argument.

In response to the vendroid view next command message, a vendroid view next command method is launched on computer 200-1 as a client process. Table 66 is pseudo code for one embodiment of the vendroid view next command method.

TABLE 66

Pseudo code for Vendroid View Next Command Method

Block Actions.
Initialize actor to avatar accessing machine, and vendroid to object pointed at.
Walk actor adjacent to vendroid.
Change orientation of actor right side facing.
If actor is holding an object,
    Change orientation of actor to front side facing;
    Unblock actions.
    Handle Failure with message "Sorry, but you can not hold anything while using this machine."
Play push button sound.
Play animation of actor operating machine.
Send vendroid view next request message to server with forward set to true as an argument.
Stop animation.
Wait for reply message from server.
If success field of reply message is success,
    Redraw vendroid.
    Set current item to contents of vendroid display slot.
    Set next slot to next slot field of reply message.
    Set next item field to contents of next slot in vendroid.
    Play rotate vendroid sound.
    Put display item back in its slot.
    Match mood of next item with mood of actor (Each portable object has a mood state in this embodiment.)
    Put the next item in the display slot.
    Save the display item's slot.
    Set the new price.
    Show the new price on screen display with an information balloon.
    Redraw vendroid.
Else
    Play error buzz sound.
    Unblock Actions.
    Handle Failure.
Unblock Actions.
End Method.

In response to the vendroid view next request message, a vendroid view next perform method is launched on server computer 260. One embodiment of vendroid view next perform method is presented in Table 67.

TABLE 67

Pseudo Code for Vendroid View Next Perform Method

Check for illegal requests, e.g., if actor is a ghost, or hands of avatar are full, set success field of reply message to failure and go to send reply message.
If actor is not adjacent to vendroid, set success field of reply message to not adjacent failure, and go to send reply message.
Set current slot to current slot of vendroid.
If current slot is display slot, or current slot is greater than machine capacity,
   Set success field of reply message to failure out of order; and
   Go to send reply message.
If forward is true,
   Find next slot of vendroid in forward direction.
   If next slot greater than vendroid capacity, sent next slot to start slot.
   If contents of next slot is not defined, break.
Else,
   Find next slot of vendroid in reverse direction.
   If next slot less that start slot, next slot is vendroid capacity minus one.
   If contents of next slot is not defined, break.
If next slot is current slot and contents of current slot is not defined,
   Set success field of reply message to failure out of order; and
   Go to send reply message.
Next item is contents of next slot
Put next item in display slot
If put of next item is not successful,
   Set success field of reply message to internal failure; and
   Go to send reply message.
Set orientation of next item to orientation of actor.
Set current slot of vendroid to next slot.
Set success field of reply message to success.
Set next slot field of reply message to next slot.
Send reply message.
If success field of reply message is success,
   Declare vendroid view next notice message as notice message.
   Initiate notice message.
   Change facing of actor to right side.
   Set actor field of notice message to actor number id.
   Set next slot field of notice message to next slot.
   Send neighbors notice message with vendroid number id.

In response to the vendroid view next notice message, a vendroid view next notify method is launched on each on-line computer that displays avatar 100 as a client process. Table 68 is pseudo code of one embodiment of the vendroid view next notify method.

TABLE 68

Pseudo Code for Vendroid View Next Notify Method

Initialize actor, vendroid, next slot, and next item using notice message, and instance data of vendroid
Change actor orientation to rightside
Play vendroid push button sound
Play animation of avatar operating Vendroid
Stop animation
Play rotate vendroid sound.
Redraw vendroid.
Put current display item back into is slot.
Set the mood of next item to mood of actor
Put the next item in the display slot.
Save display item's slot
Set the new price.
Show the new price on screen display with an information balloon.
Redraw vendroid
End method.

One embodiment of methods used for viewing the next item in a vendroid is presented in Appendix A, and is incorporated herein by reference. Table 69 identifies the methods in Appendix A that are used in viewing the next item.

TABLE 69

Vendroid Class Specific Methods For View Next Item

| Process Location | Name |
| --- | --- |
| client | method vendroidBuildMenus__command |
| client | method vendroidViewNext__command |
| client | method vendroidViewNext__notify |
| server | method vendroidViewNext__perform |

Vendroid—View Previous Item

When menu item View Previous Item is selected, a vendroid view next command message is sent with forward set to False. Thus, the methods described above of menu item View Next Item are used with the different state of argument forward. Therefore, the above description is not repeated.

Vendroid—Buy This Item

To buy the displayed item in vending machine 120, on-line user 225-1 selects menu item Buy This Item by pointing at the menu item with mouse 202-1 and releasing the mouse button. This generates a signal that is interpreted by a process executing on computer 200-1 and the client process that generated menu 1001 is notified of the selection. Consequently, the client process that generated menu 1001 generates a vendroid purchase command message with argument cost set to the price of the item.

In response to the vendroid purchase command message, a vendroid purchase command method is launched on computer 200-1 as a client process. Table 70 is pseudo code for one embodiment of the vendroid purchase command method.

TABLE 70

Pseudo Code for Vendroid Purchase Command Method

Block Actions.
Initialize actor to avatar accessing machine, vendroid to object pointed at, and cost to command cost.
Walk actor adjacent to vendroid.

Change orientation of actor right side facing.
If actor is holding an object,
   Change orientation of actor to front side facing;
   Unblock actions.
   Handle Failure with message "Sorry, but you can not hold anything while using this machine."
If cost is greater than zero,
   Call getTokensFromPocket with cost and actor as argument. (See Table 37.)
   If getTokensFromPocket is a failure,
     Change orientation of actor to frontside.
     Handle failure and give message indicating tokens needed to buy item.
Play animation of actor operating machine.
If cost is greater than zero,
   Play vendroid coin deposit sound.
Else,
   Play vendroid push button sound
Send vendroid purchase request message to server.
Wait for reply message from server.
If success field of reply message is success,
   If cost is greater than zero,
     Destroy tokens in actor's hands.
   Stop animation.
   Animation of actor reaching for object.
   Play vendroid ATM pay sound.
   Unpack contents vector to get item.
   Animation of return arms.
   Change actor orientation to front side,
Else,
   Play error buzz sound.
   Unblock Actions.
   Handle Failure.
Unblock Actions.
End Method.

In response to the vendroid purchase request message, a vendroid purchase perform method is launched on server computer 260. One embodiment of vendroid purchase perform method is presented in Table 71.

TABLE 71

Pseudo Code for Vendroid Purchase Perform Method

Initialize success field, cvsize, and contents vector of reply message to failure, zero, and null, respectively.
   Change orientation of actor to front side.
   Check for illegal requests, e.g., if actor is a ghost, or contents of vendroid display slot is not defined, set success field of reply message to failure and go to send reply message.
   If actor is not adjacent to vendroid, set success field of reply message to not adjacent failure, and go to send reply message.
   Set current item to contents of vendroid display slot.
   Set current slot to current slot of vendroid.
   Set cost to current item sales price.
   If cost is greater than zero,
     If hands of actor are empty
       Set success field of reply message to failure.
       Go to send reply message.
     Set tokens to contents of actor's hands.
     If tokens is not class tokens, or denomination of tokens is not equal to cost,
       Set success field of reply message to failure.
       Go to send reply message.
   Clone the item.
   If cloned item is a null,
     Set success field of reply message to internal failure.
     Go to send reply message.
   If tokens in hand,
     Set hand token number id to token number id destroy tokens.
   Else,
     Set hand token number id to invalid number.
   Initialize common flags for cloned item.
   Check if cloned item is a container, and if it is an open container, close it.
   Reset mood of the cloned item.
   Activate cloned item
   Put cloned item in hands of actor.
   Put cloned vector in contents vector of reply message.
   Update states of vendroid, e.g., update number of purchases for current slot, update total number of purchases, update sales of current slot, update total sales.
Send reply message.
If success field of reply message is success,
   Declare vendroid purchase notice message as notice message.
   Initiate notice message.
   Set hand tokens field of notice message to hand tokens number id.
   Set content vector size of notice message to content vector size.
   Set contents vector of notice message to contents vector of reply message.
   Send neighbors notice message with vendroid number id.
   Free contents vector of reply message.

In response to the vendroid purchase notice message, a vendroid purchase notify method is launched on each on-line computer that displays avatar 100 as a client process. Table 72 is pseudo code of one embodiment of the vendroid purchase notify method.

TABLE 72

Pseudo Code for Vendroid Purchase Notify Method

Initialize actor, vendroid, and hand tokens using notice message.
Change actor orientation to rightside.
Play animation of avatar operating Vendroid.
If hand tokens number id is valid,
   Play vendroid deposit coin sound.
   Destroy hand tokens.
Else
   Play vendroid push button sound.
   Stop animation.
   Play animation of actor reaching for object.
   Play vendroid ATM pay sound.
   Unpack contents vector to get item.
   Animation of return arms.
   Change actor orientation to front side
   End method.

One embodiment of methods used for purchasing an item in a vendroid is presented in Appendix A, and is incorporated herein by reference. Table 73 identifies the methods in Appendix A that are used in purchasing an item in a vendroid.

TABLE 73

Vendroid Class Specific Methods For Buy Item

| Process Location | Name |
|---|---|
| client | method vendroidBuildMenus_command |
| client | method vendroidPurchase_command |
| client | method vendroidPurchase_notify |
| server | method vendroidPurchase_perform |

For the embodiment described above, a vendroid class is defined and an instance of the vendroid class is generated for each locale in the virtual world for which a vendroid is desired. A definition of the vendroid class is given in Table 74. The various fields and methods defined in the vendroid class have names that correspond to the name of the data represented by the field and the operation performed by the method, respectively.

TABLE 74

A Definition for Class Vendroid

```
define UNLIMITED_AVAILABILITY   0;
    /* used to limit the number sold. */
define VENDROID_CAPACITY        10;
    /* size of the vendroid. */
define VENDROID_DISPLAY_SLOT    0;
    /* slot for viewing item. */
define VENDROID_CONTENTS_START  1;
    /* start of slots to fill. */
class vendroid {
    info {
        classNumber      thisClass( );
        version          thisVersion( );
        name             "Vendroid";
        capacity         VENDROID_CAPACITY;
        reserved         VENDROID_DISPLAY_SLOT;
        pickFrom         VENDROID_CONTENTS_START;
        helpResourceID   VENDING_HELP;
    }
    instance {
        include "instance.cld";
        include "instcont.cld";
        /* class specific instance data /*
            common:
                uint16   currentSlot;
    /* display item's real slot */
            server:
                uint32   purchases[VENDROID_CAPACITY];
                uint32   sales[VENDROID_CAPACITY];
                uint32   totalPurchases;
                uint32   totalSales;
                uint32   unused1;
                uint16   available[VENDROID CAPACITY];
                uint8    unused2;
            client:
                /* scratch space */
                uint16   fullSlots;
                uint16   price;
    }
    /*
    **   Resources used by class vendroid.
    */
    verb walkTo;
    verb get;
    verb viewNext;
    verb viewPrevious;
    verb purchase;
    sound push_button;
    sound rotateVendroid;
```

TABLE 74-continued

A Definition for Class Vendroid

```
    sound errorBuzz;
    sound depositCoin;
    sound ATMPay;
    /*
    **      Standard methods used by class vendroid.
    */
    method goToObject_command;
    method goToAndGet_command;
    method putInPocket_command;
    method putInPocket_perform;
    method putInPocket_notify;
    method putInContainer_command;
    method putInContainer_perform;
    method putInContainer_notify;
    method getFromPocket_command;
    method getFromPocket_perform;
    method getFromPocket_notify;
    method getFromContainer_command;
    method getFromContainer_perform;
    method getFromContainer_notify;
    method destroy_notify;
    method help_command;
    method help_perform;
/*
**      Methods for class vendroid only.
*/
    client   method   vendroidBuildMenus_command
    client   method   vendroidPurchase_command
    client   method   vendroidPurchase_notify
    server   method   vendroidPurchase_perform
    client   method   vendroidSetName_command
    client   method   vendroidViewNext_command
    client   method   vendroidViewNext_notify
    server   method   vendroidViewNext_perform
}
```

GHOST

Figure 11A:
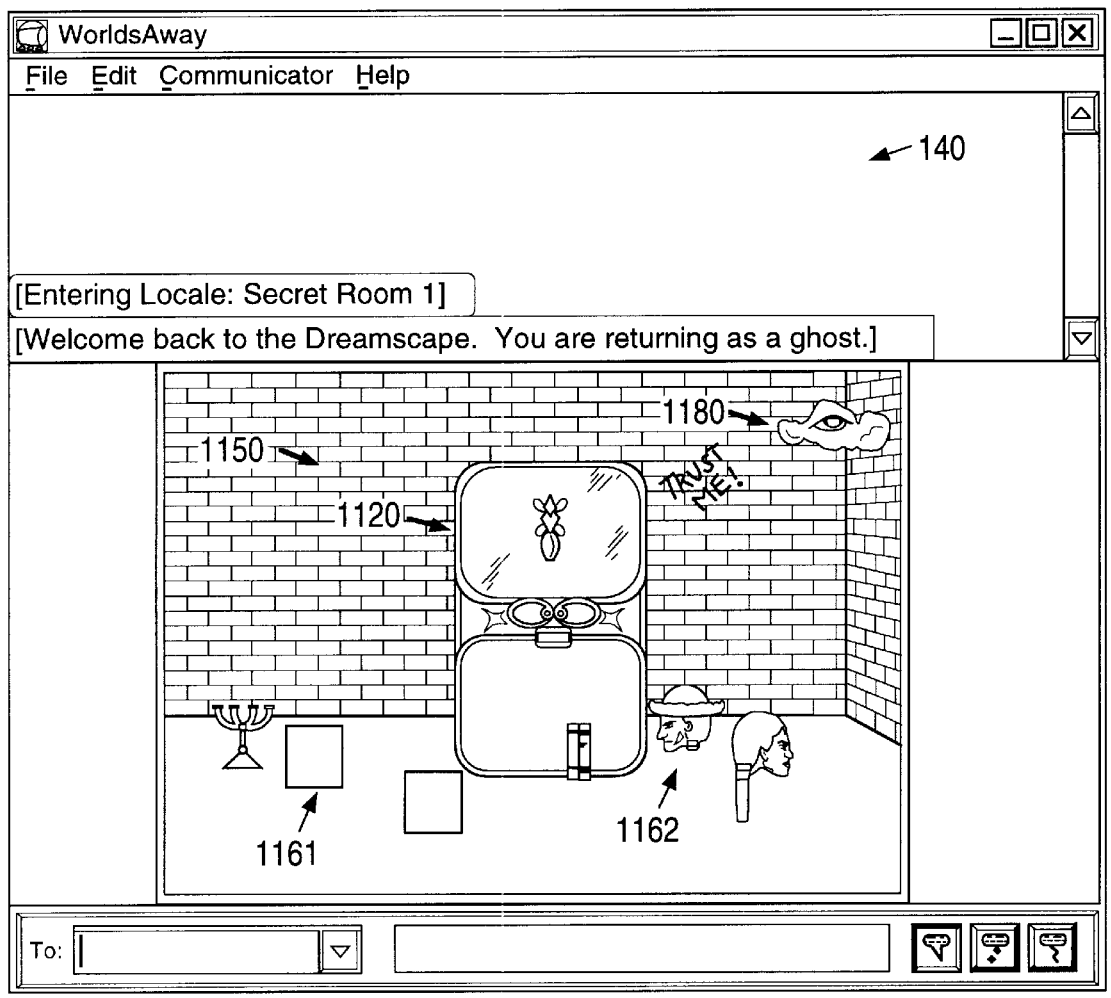
FIG. 11A is an illustration of one locale in the graphic user interface when the avatar enters as a ghost.

As explained above, the graphic user interface of this invention for the virtual world includes a ghost that is an optional non-material state for an avatar. Each avatar initially enters the virtual world as a ghost object 1180, in one embodiment, as illustrated in FIG. 11A. Notice that a message is presented in dialogue area 140 of "Welcome back to the Dreamscape. You are returning as a ghost". The abilities of a ghost are limited. Ghosts cannot talk or emit thoughts. Ghosts can send ESP. Ghosts can move from room to room using a door, and can follow an avatar.

If a locale is full, i.e, contains the predefined maximum number of avatars for the locale, any avatar who enters the locale while the locale is full automatically turns into a ghost. On-line user 225-1 is presented a dialogue explaining the action when this happens, e.g., "This area is full of avatars. You are now becoming a ghost."

Avatar 100 can choose to turn into a ghost at any time, such as when avatar 100 wants to watch but not participate, or when avatar 100 is being harassed.

Since a ghost is a dematerialized avatar, when avatar 100 dematerializes, the avatar body disappears in one screen write and a piece of static graphic art, e.g., an eye in the sky icon appears in the upper right hand corner of the screen display as described above for FIGS. 4F and 3B. In one embodiment, the avatar body fades away and the ghost icon fades into view. There is a sound effect for the disappearance of the avatar and a separate one for the reappearance. The sound effects begin in sync with the start of the visual effects, and ends close to the end of the visual effects. Ghosts do not have moods or gestures because of their limited ability to communicate. Ghosts have no material presence in the virtual world.

Figure 11B:
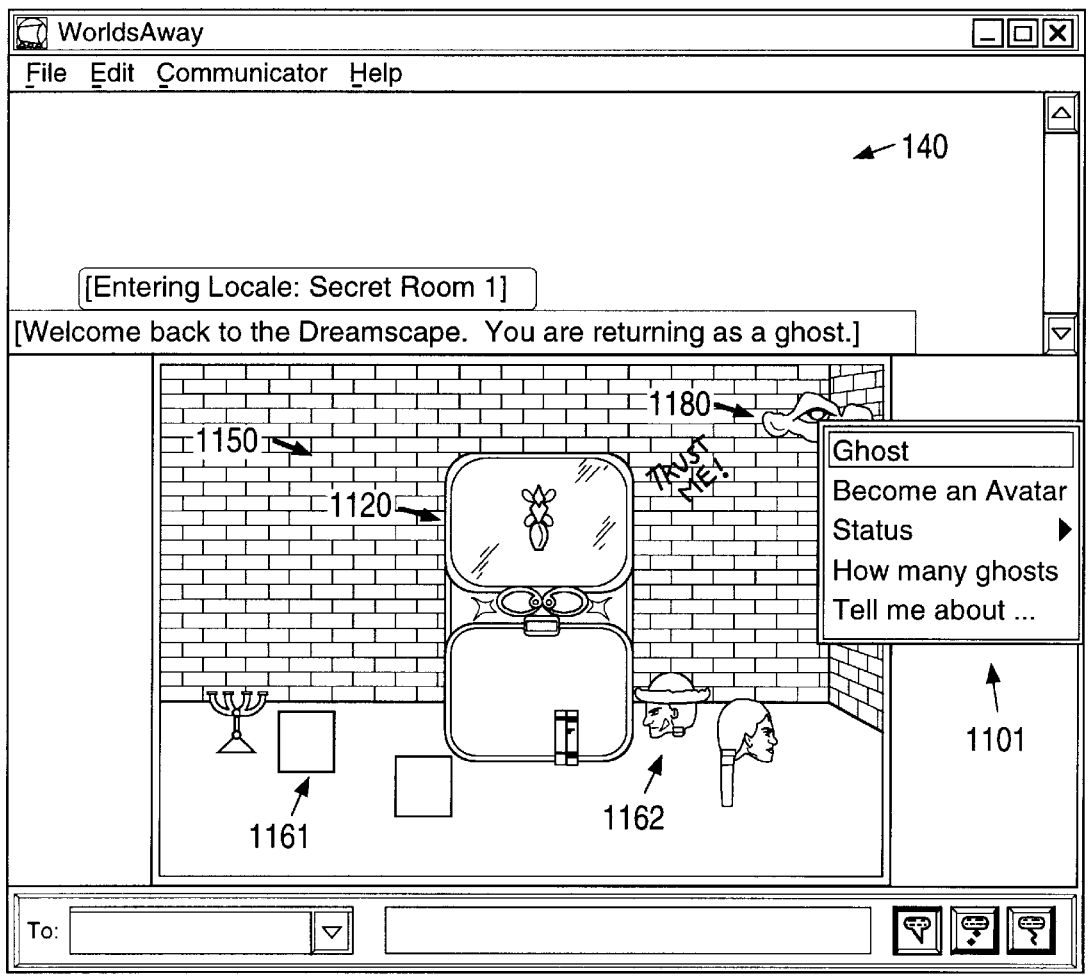
FIG. 11B is an illustration of a pop-up menu that is generated in the graphic user interface of FIG. 11A when the avatar of the on-line user is a ghost.

When on-line user 225-1 points at ghost icon 1180 (FIG. 11A) and depresses the mouse button, the pop-up menu generated by computer 200-1 depends on whether avatar 100 is a ghost. If avatar 100 is a ghost, as in FIG. 11A, pop-up menu 1101 (FIG. 11B) is generated by a client process executing on computer 200-1. Table 75 lists the options presented in pop-up menu 1101.

TABLE 75

Menu When at Ghost Icon and On-line User is a Ghost

| <Avatar Name> | Ghost |
|---|---|
| Become an Avatar | |
| How Many Ghosts? | |
| Status | > |
| Tell Me About | |

If avatar 100 is not a ghost, the pop-up menu presented in Table 76 is generated by a client process executing on computer 200-1.

TABLE 76

Menu When a Ghost Icon and On-line User is not a Ghost

Ghosts
How Many Ghosts?
Tell Me About

Figure 11C:
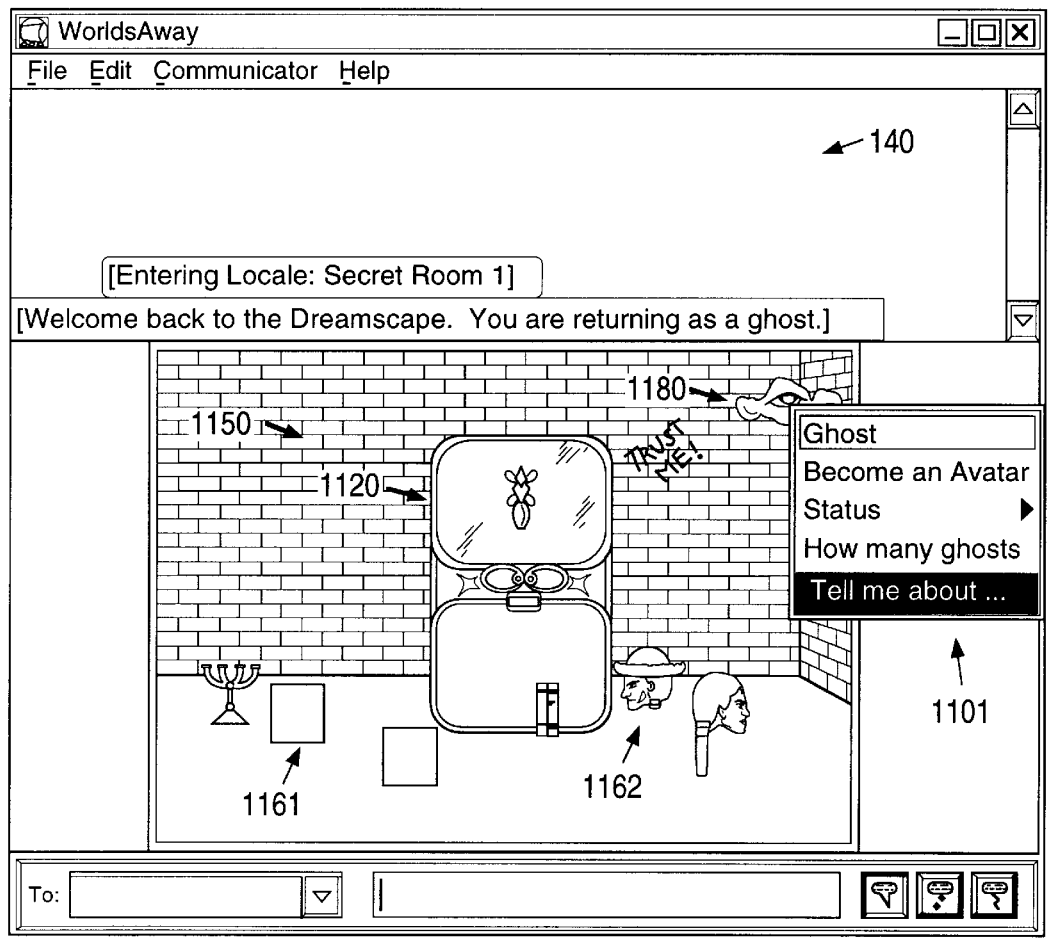
FIG. 11C illustrates pointing at menu item Tell me about in the pop-up menu of FIG. 11B.
Figure 11D:
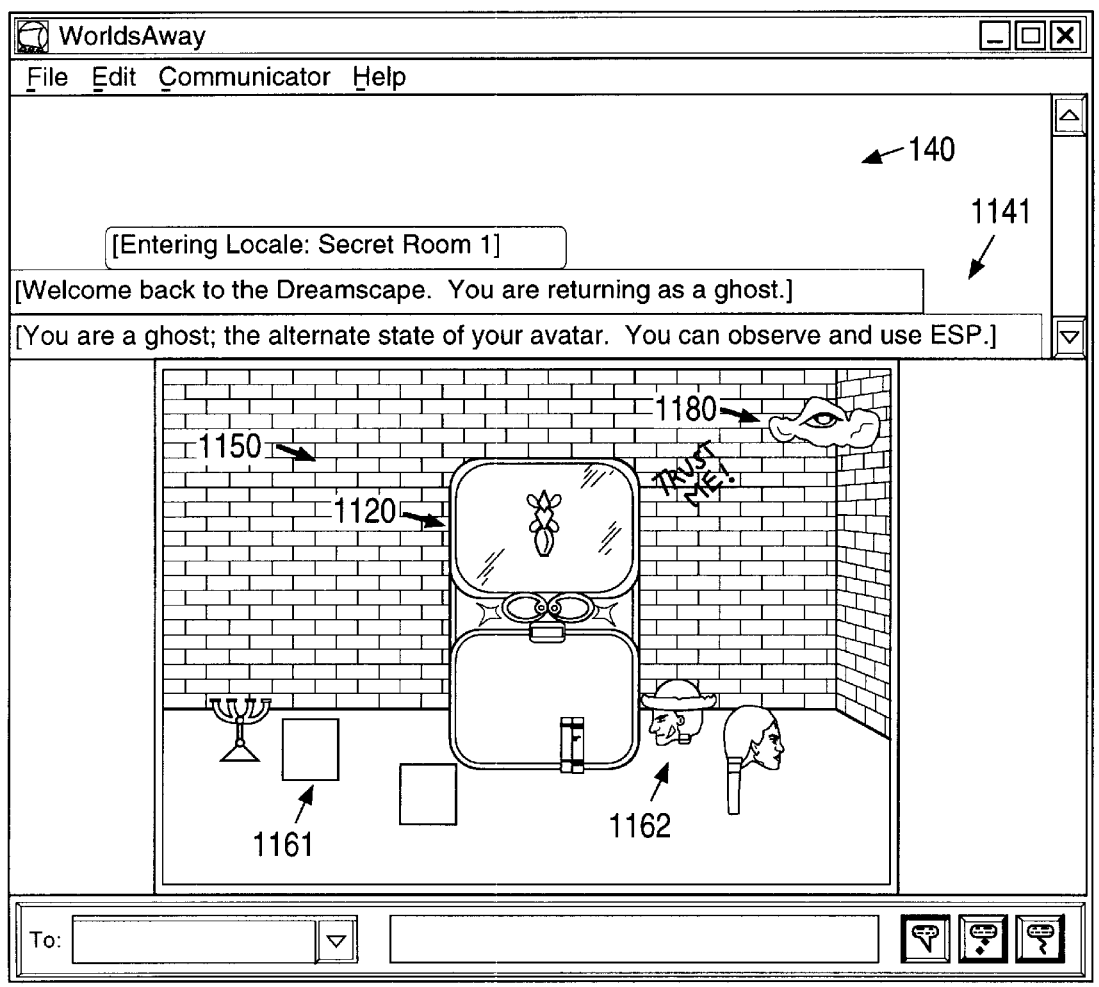
FIG. 11D illustrates the graphic user interface and the message generated by selection of menu item Tell me about in the pop-up menu of FIG. 11B.

When user 255-1 moves mouse 202-1 so that menu item Tell Me About is highlighted (FIG. 11C) and releases the mouse button, i.e., selects the menu item, the signal generated by mouse 202-1 is interpreted by a process executing on computer 200-1 and a signal is sent to the process that generated menu 1101, that in turn sends a message that results in help information 1141 being displayed in,dialogue area 140, as illustrated in FIG. 111D.

Figure 11E:
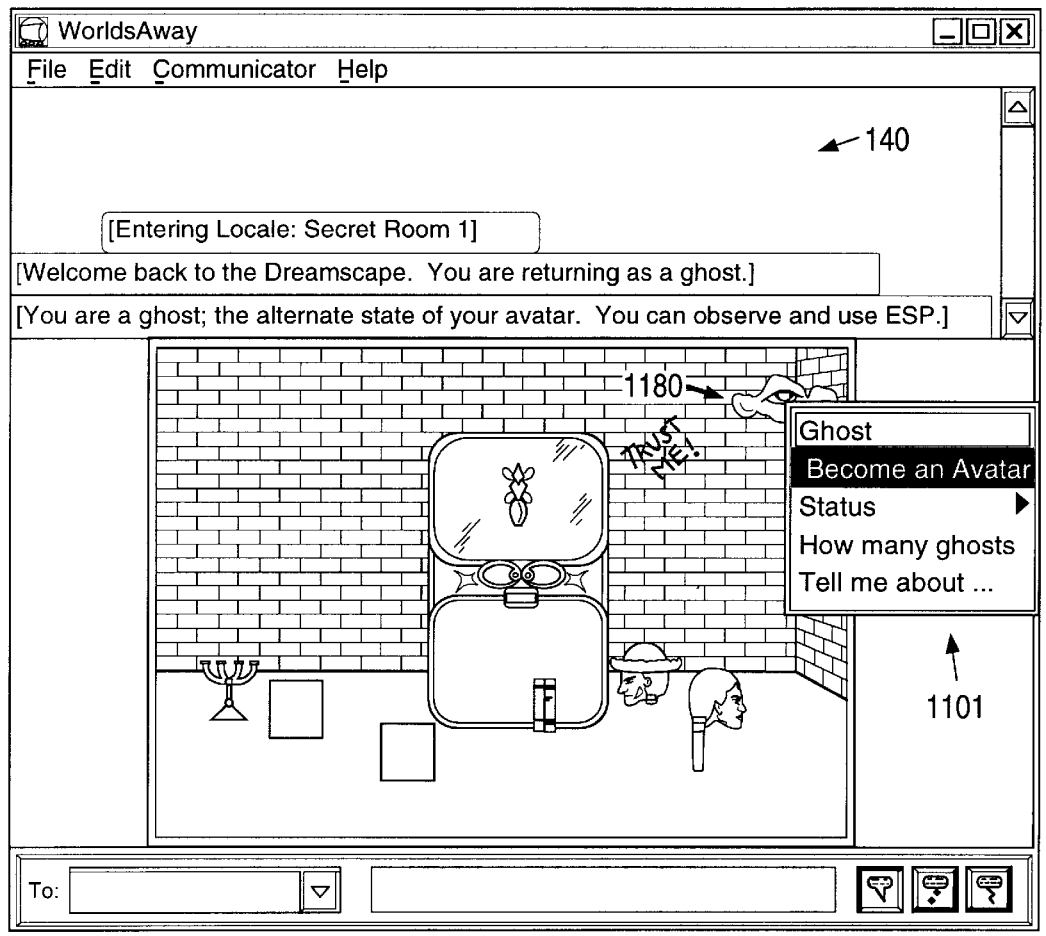
FIG. 11E illustrates pointing at menu item Become an Avatar in the pop-up menu of FIG. 11B.

When user moves mouse 202-1 so that menu item Become an Avatar is highlighted (FIG. 11E) and releases the mouse button, i.e., selects the menu item, the signal generated by mouse 202-1 is interpreted by a process executing on computer 200-1 and a signal is sent to the process that generated menu 1101, that in turn sends a ghost to avatar command message with a set of coordinates.

In response to the ghost to avatar command message, a ghost to avatar command method is launched as a client process on computer 200-1. Table 77 is one embodiment of pseudo code for the ghost to avatar command method.

TABLE 77

Pseudo Code for Ghost to Avatar Command Method

Send ghost to avatar request message to server with set of coordinates and avatar id.
Wait for reply message from server.
If success field of reply message is success,
   Play materialize sound.
   If hide ghost field of reply message is true, Destroy ghost icon.
   Set avatar to number id field in reply message.
   Unpack contents vector for avatar.
   Display avatar.
Else,
   Handle Failure.
End Method.

In response to the ghost to avatar request message, a ghost to avatar perform method is launched on server computer 260. One embodiment of ghost to avatar perform method is presented in Table 78.

TABLE 78

Pseudo Code for Ghost to Avatar Perform Method

Initialize success field, cvsize, and contents vector of reply message to failure, zero, and null, respectively.
Check for illegal requests, e.g., if actor is a not a ghost, set success field of reply message to failure and go to send reply message.
If actor is frozen (See avatar frozen check 554 (FIG. 5B))
   If freeze period is over, (See Check 555 (FIG. 5B))
     Unfreeze avatar (See operation 557 (FIG. 5B));
   Else
     Frozen reply message;
     Go to send reply message.
Check if transition to avatar is permitted, e.g, is locale filled, is locale private, is locale an auditorium.
If transition is permitted,
   Change ghost to avatar.
   Set error code to no error.
Else,
   Set error message.
   Set error code to indicate reason for error.
If error code is no error,
   If number of ghosts in locale is zero,
     Set hide ghost field of reply message to true.
   Else,
     Set hide ghost field of reply message to false.
   Set success field of reply message to success.
   Set number id field of reply message to avatar number id field.
   Pack avatar in contents vector.
Else
   Set success field of reply message to failure message.
   Set failure message buffer in reply message to error message.
Send reply message.
If success field of reply message is success,
   Declare ghost to avatar notice message as notice message.
   Initiate notice message.
   Set hide ghost field of notice message to hide ghost field of reply message.
   Set content vector size of notice message to content vector size.
   Set number id field of notice message to number id field of reply message.
   Set contents vector size field of notice message to size of contents vector.
   Set contents vector of notice message to contents vector of reply message.
   Send neighbors notice message with avatar number id.
   Free contents vector of reply message.

In response to the ghost to avatar notice message, a ghost to avatar notify method is launched as a client process on each on-line computer that is displaying the locale in which avatar 100 will materialize. Table 79 is pseudo code of one embodiment of the ghost to avatar notify method.

TABLE 79

Pseudo Code for Ghost to Avatar Notify Method

Play materialize sound
If hide ghost field of notice message is true
   Destroy ghost icon Unpack contents vector in notice message and display avatar
End method.

One embodiment of methods used for changing a ghost to avatar is presented in Appendix A, and is incorporated herein by reference. Table 80 identifies the methods in Appendix A that are used in changing a ghost to an avatoa

TABLE 80

Ghost Class Specific Methods For Ghost to Avatar

| Process Location | Name |
|---|---|
| client | method ghostBuildMenus_command |
| client | method ghostToAvatar_command |
| client | method ghostToAvatar_notify |
| server | method ghostToAvatar_perform |

Figure 11F:
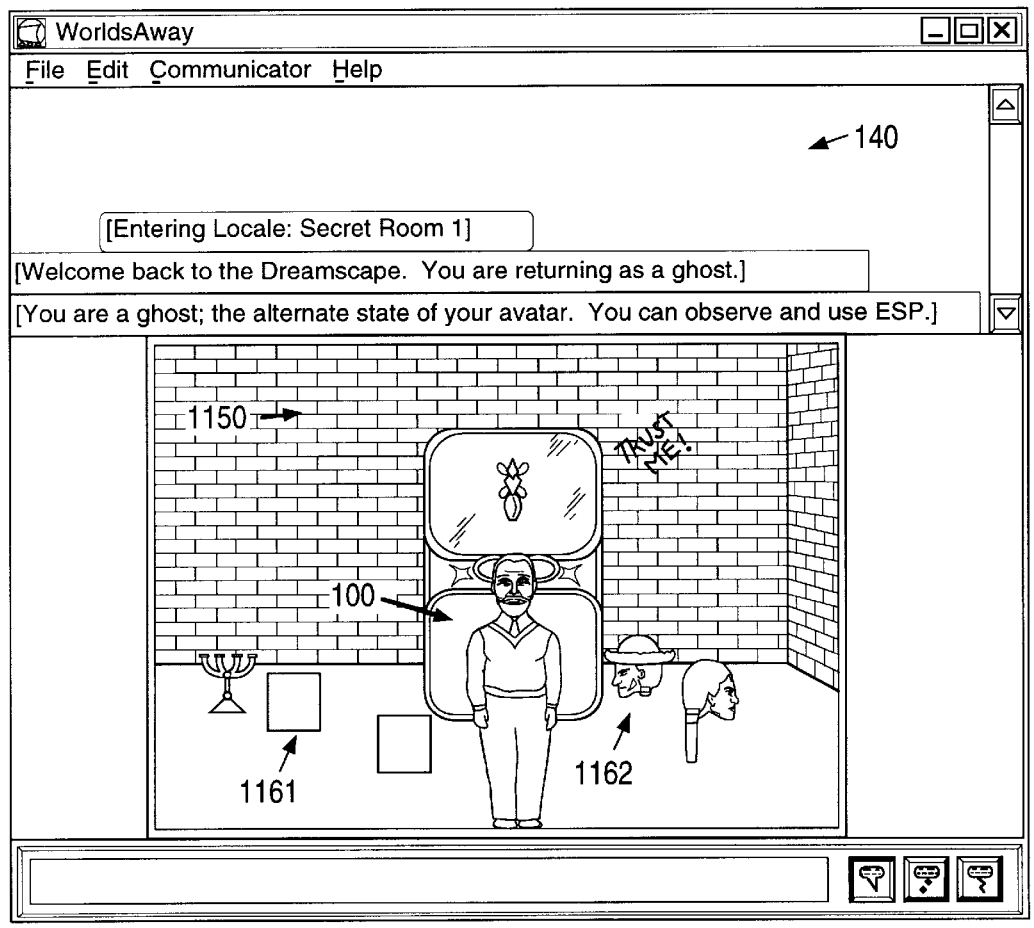
FIG. 11F illustrates the graphic user interface following selection of menu item Become an Avatar in the pop-up menu of FIG. 11B after the operations are completed.
Figure 11G:
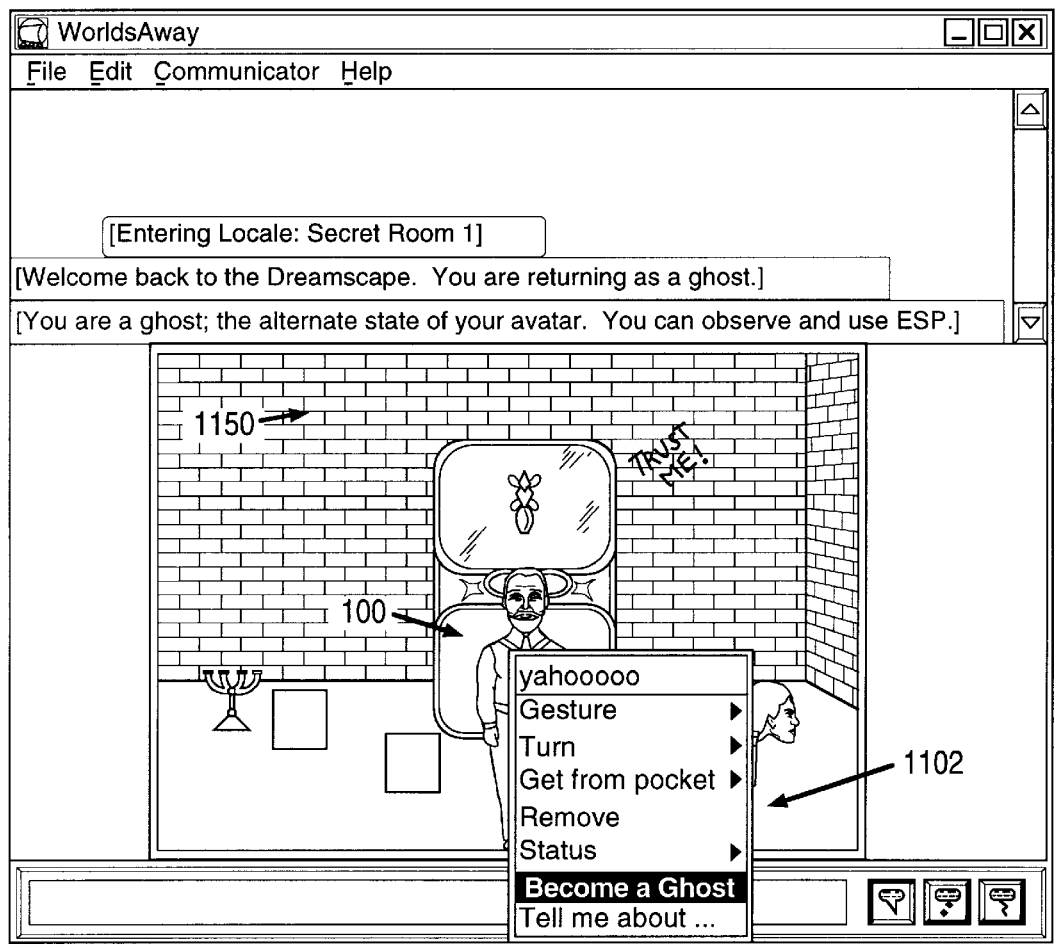

FIG. 11F illustrates locale 1150 after ghost icon 1180 has been removed because there was only one ghost in the locale, and avatar 100 has materialized as a result of the operations performed as just described. FIG. 11G shows, as discussed above with respect to FIG. 3B, that when avatar 100 is pointed at, a pop-up menu 1102 is displayed that includes a menu item Become a Ghost. When this menu item is selected, avatar 100 dematerializes, and ghost icon 1180 appears again and the locale appears as shown in FIG. 11A.

When user moves mouse 202-1 so that menu item How Many Ghosts in menu 1101 (FIG. 11B) is highlighted (not shown) and releases the mouse button, i.e., selects the menu item, the signal generated by mouse 202-1 is interpreted by a process executing on computer 200-1 and a signal is sent to the process that generated menu 1101, that in turn sends a ghost count command message.

In response to the ghost count command message, a ghost count command method is launched as a client process on computer 200-1. This method sends a ghost count request message to the server and waits for a reply message.

In response to the ghost count request message, server computer 260 launches a ghost count perform method. This method sends a reply message that includes a message that gives the number of ghosts in the locale.

When the client process on computer 200-1 receives the replay message, the process processes the message and generates a system message balloon with the number of ghosts that is displayed in dialogue area 140 of display screen 250-1 (FIG. 2).

One embodiment of methods used for obtaining a ghost count is presented in Appendix A, and is incorporated herein by reference. Table 81 identifies the methods in Appendix A that are used in obtaining a ghost count.

TABLE 81

Ghost Class Specific Methods For Ghost Count

| Process Location | Name |
|---|---|
| client | method ghostBuildMenus_command |
| client | method ghostCount_command |
| server | method ghostCount_perform |

Figure 11H:
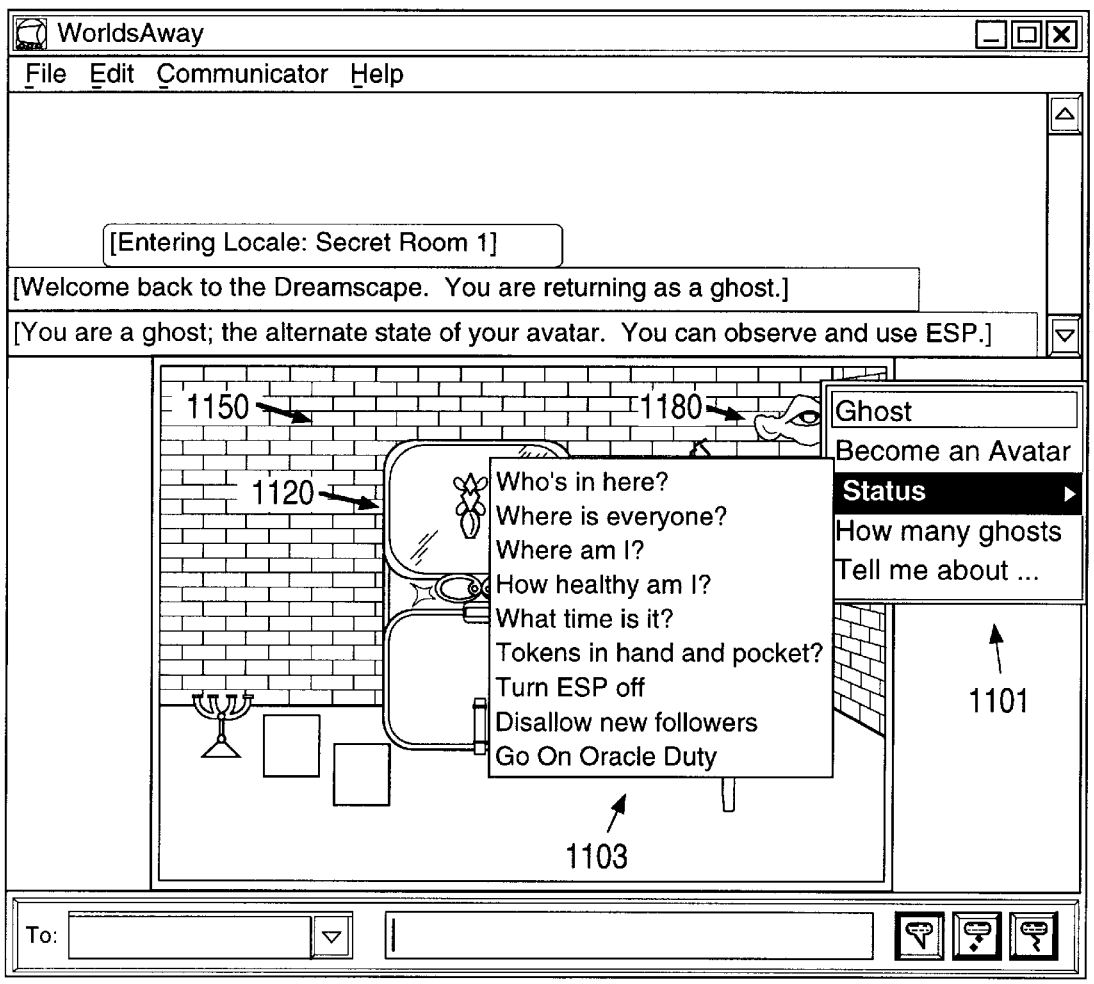
FIG. 11H illustrates the right pull menu that is generated in the graphic user interface when the on-line user is pointing at menu item Status in the pop-up menu of FIG. 11B and is a ghost.

When user moves mouse 202-1 so that menu item Status is highlighted (FIG. 11H), a right pull menu 1103 is generated. The items in this menu are equivalent to those for the status menu of avatar 100 described above, and so the above description for menu item 405 is incorporated herein by reference.

Figure 11I:
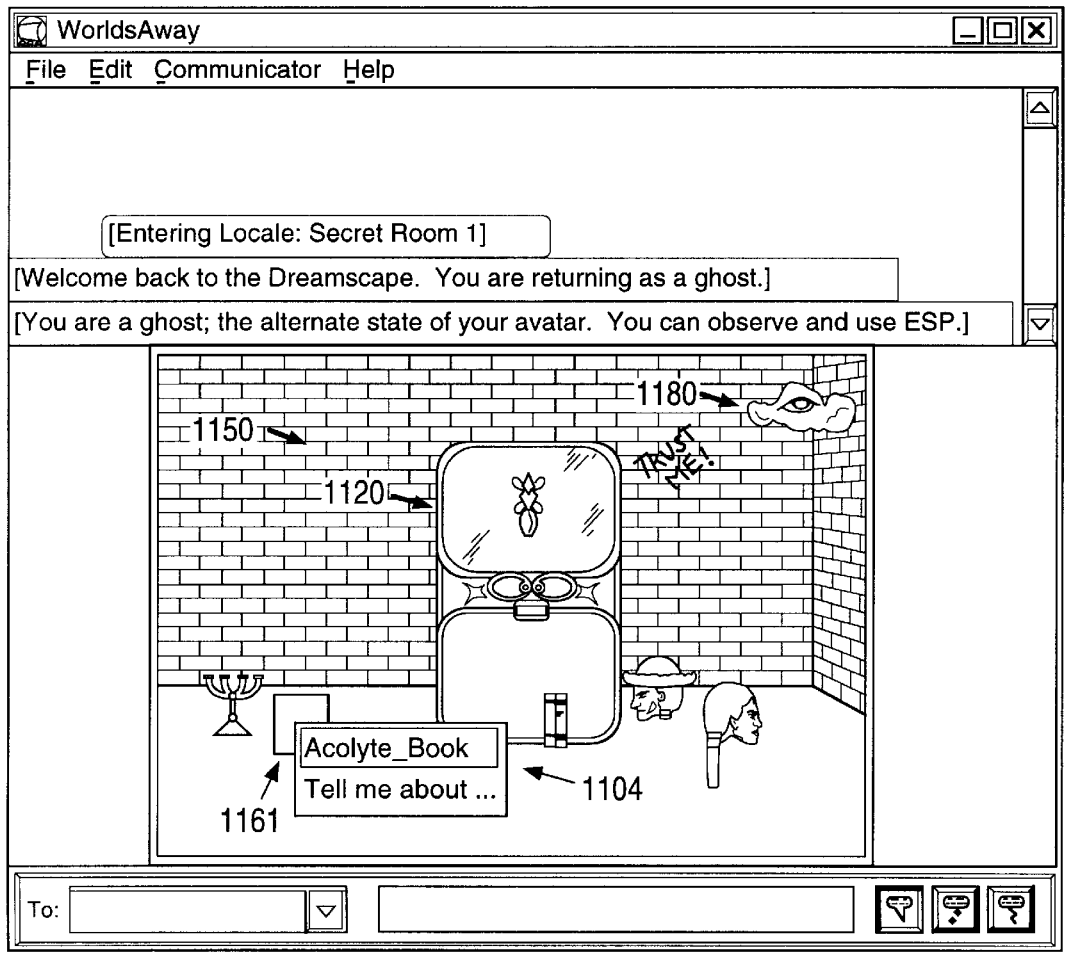
FIG. 11I illustrates a pop-up menu that is generated in the graphic user interface when the on-line user is pointing at loose object in the locale and the avatar of the on-line user is a ghost.

As indicated above, the abilities of a ghost are limited. For example, when book 1161 is pointed at by ghost 1180, i.e, when avatar 100 is a ghost, the only menu item in menu 1104 (FIG. 11I) is Tell me about. This is because ghost 1180 can not walk to book 1161, and can not get book 1161. A similar result is obtained when any other of the loose portable objects are pointed at, or when vendroid 1120 is pointed at.

Figure 11J:
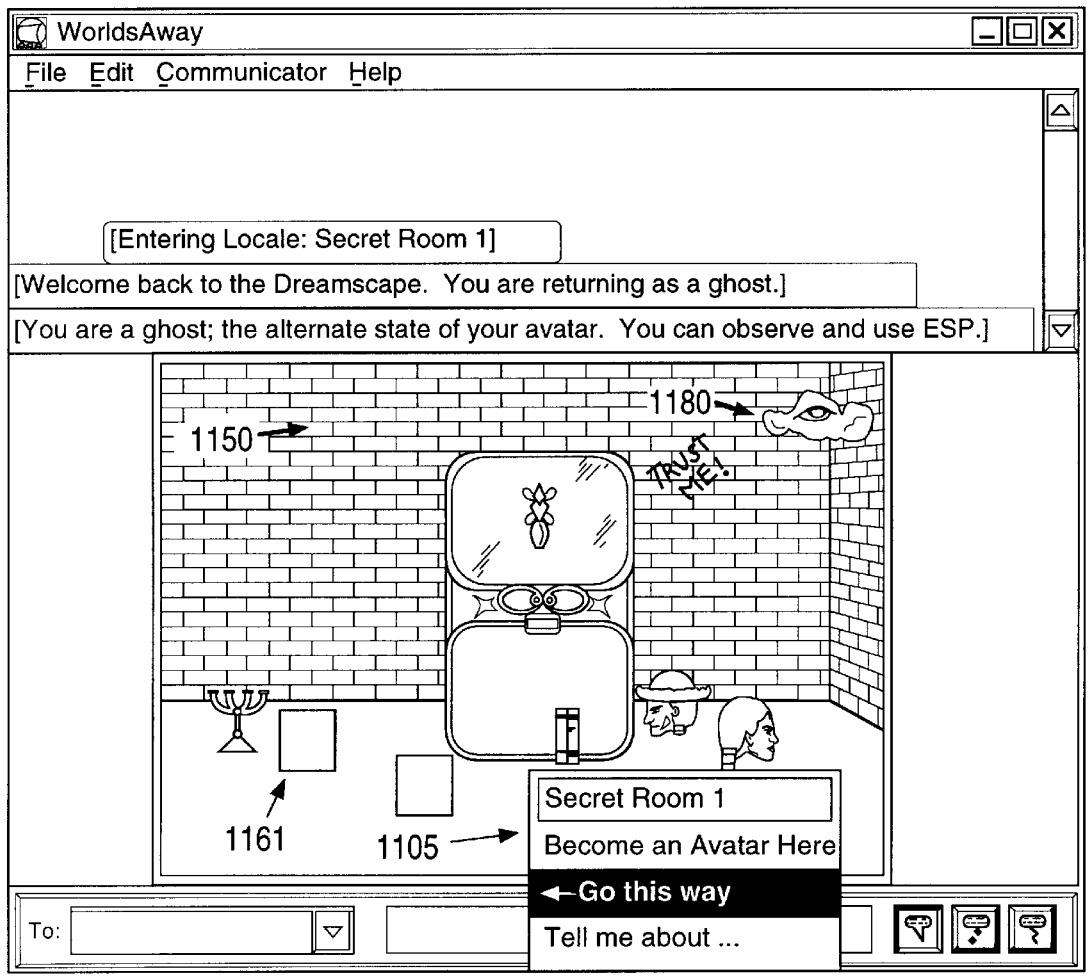
FIG. 11J illustrates a pop-up menu that is generated in the graphic user interface when the on-line user is pointing at a feature in the locale and the avatar of the on-line user is a ghost.
Figure 11K:
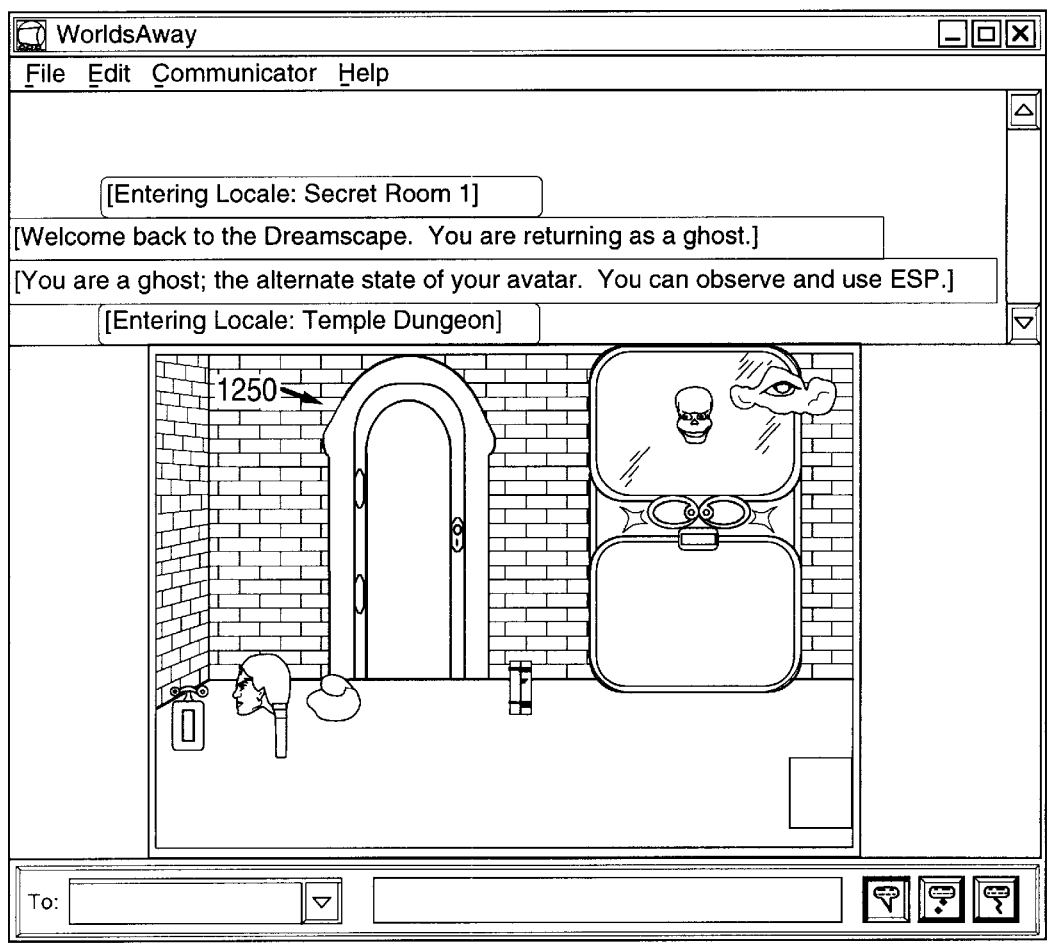
FIG. 11K illustrates that a ghost can go to another locale by using the menu item Go this way in the pop-up menu of FIG. 11I.

When avatar 100 is a ghost, and on-line user simply selects a point in locale 1150, a pop-up menu 1105 (FIG. 11J) is presented in the graphic user interface. In this example, the user selects menu item Go this way and a result, ghost 1180 moves to a new local 1250. Notice again the limited number of options in menu 1105.

For the embodiment described above, a ghost class is defined and an instance of the ghost class is generated for each avatar in the virtual world that dematerializes and is stored in the server database. A definition of the ghost class is given in Table 82. The various fields and methods defined in the ghost class have names that correspond to the name of the data represented by the field and the operation performed by the method, respectively.

TABLE 82

A Definition for Class Ghost

```
required class ghost {
        info {
                classNumber  thisClass( );
                version      thisVersion ( );
                name         "Ghost";
                capacity     NO_CONTENTS;
                helpResourceID GHOST_HELP;
        }
        instance {
                include "instance.cld";
                /* class specific instance variables: */
                common:
                        /* none */
                server:
                        /* none */
                client:
                        /* none */
        }
        sound materialize;
        sound ghostCountClicker;
        /* class methods: First those that respond to standard
        commands */
        /* shared methods */
        /* can't get, put, or go to ghosts . . . */
                method show_notify;
                method hide_notify;
                method destroy_notify;
                method setName_command;
                method setFlags_notify;
                method help_command;
                method buildStatusMenu_procedure;
                method playerStatus_command;
                method playerStatus_perform;
                method buildStatusMenu_procedure;
        /* custom methods for standard commands */
            verb deghost;
            verb ghostCount;
            verb help;
    client  method  ghostInitialize_command
    client  method  ghostInitialize_command
    client  method  ghostBuildMenus_command
    server  method  ghostHelp_perform
    client  method  ghostToAvatar_command
    server  method  ghostToAvatar_perform
    client  method  ghostToAvatar_notify
```

TABLE 82-continued

A Definition for Class Ghost

| client | method | ghostCount_command |
| server | method | ghostCount_perform |
| client | method | ghostGoToConnection_command |
| server | method | ghostGoToConnection_perform |
| } | | |

As explained above, avatars can communicate with speech, thoughts, and ESP. FIGS. 12A to 12D illustrate the different types of communication in the graphical user interface of this invention.

Figure 12A:
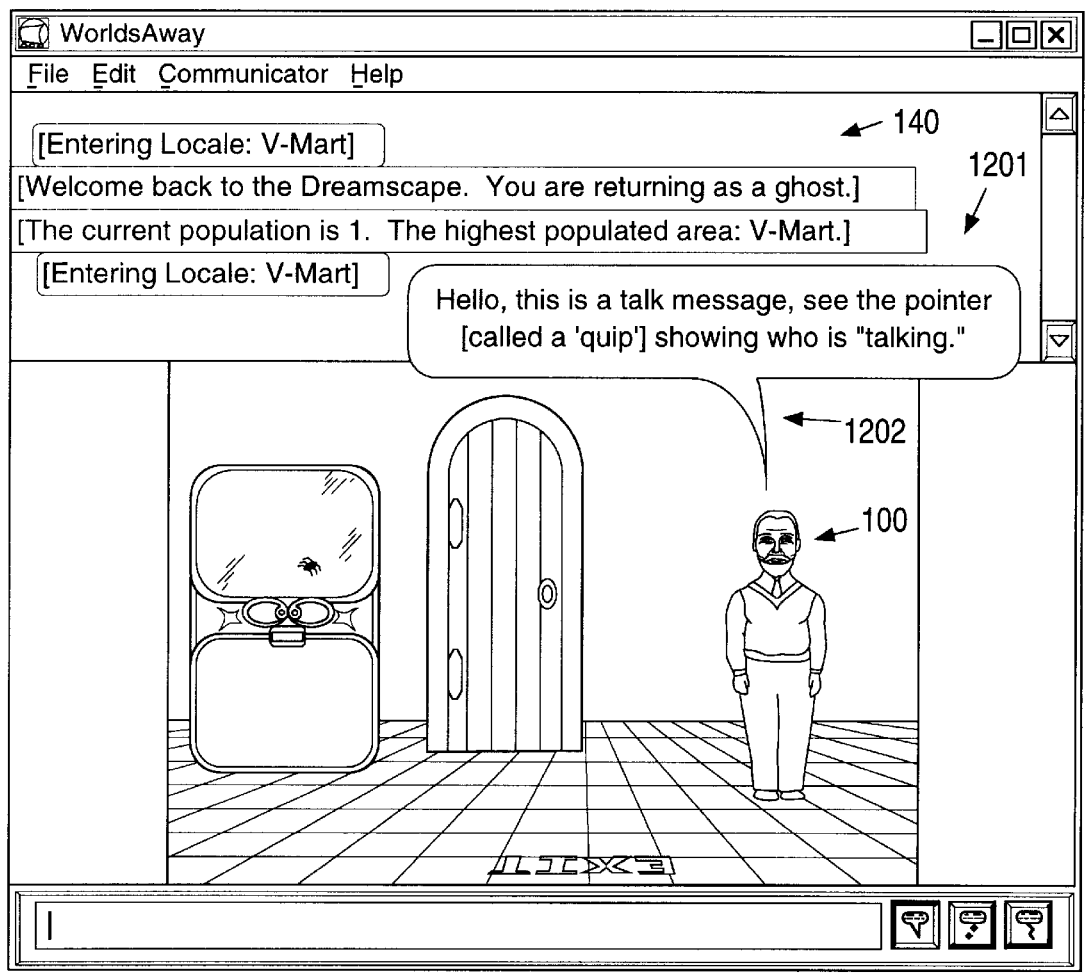
FIGS. 12A to 12D illustrate the different types of communication in the graphical user interface of this invention.

In FIG. 12A, to talk to another avatar, avatar 100 types in "Hello this is a talk message, see the point (called a 'quip') showing who is talking." This message is displayed in a colored balloon 1201 in dialogue area 140 and is enclosed in quotes. In the actual interface, there is not a line around the balloon. The change in color. between the balloon and the background is used to define the balloon. A quip 1202 extends from the balloon towards the avatar, e.g., avatar 100 that is talking. Since FIG. 12A is in black and white, the line around the talk message is used to represent generally the color boundary of the balloon. In one embodiment, each avatar in a locale has a different color balloon.

Figure 12B:
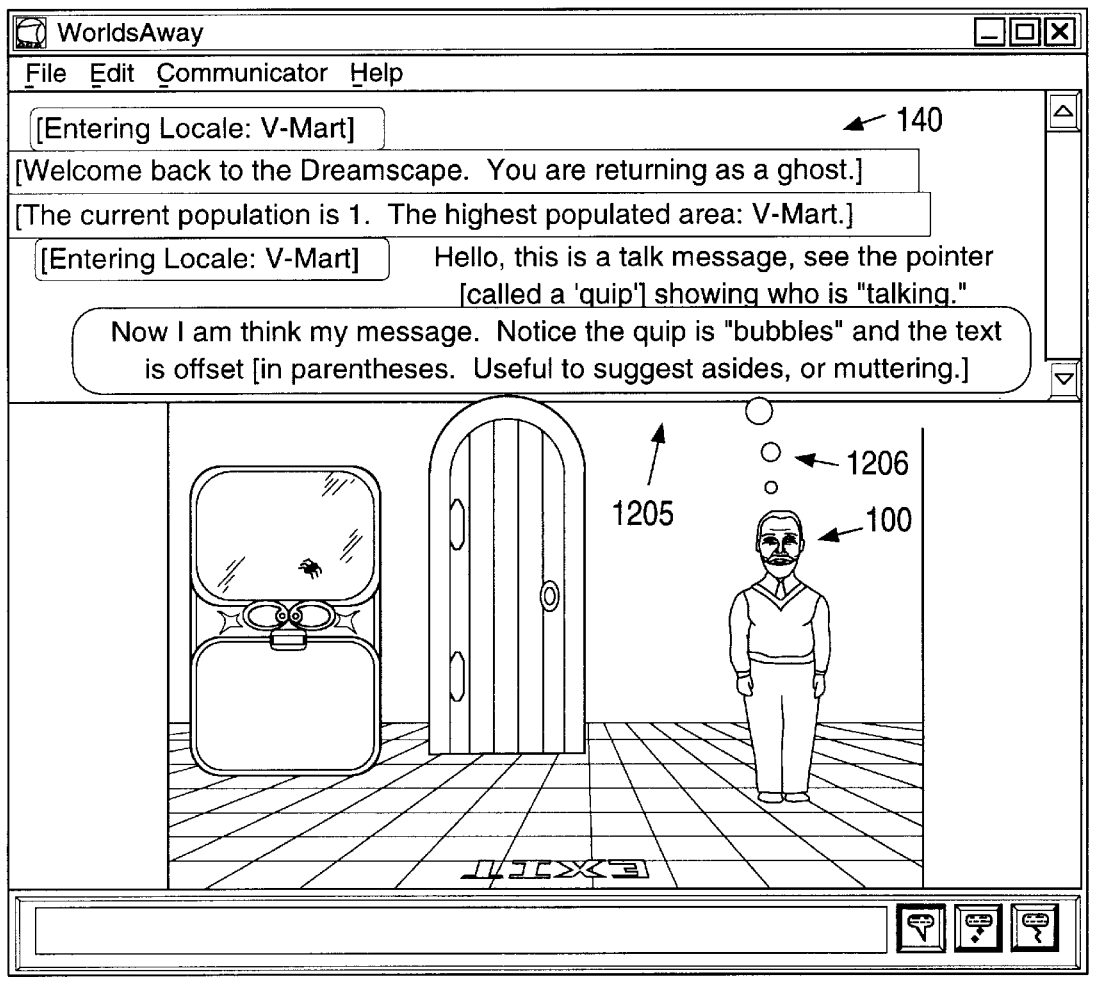

When avatar 100 wants to generate a thought, a colored balloon 1205 (FIG. 12B) is generated in dialogue region 140. Bubbles 1206 from the thought balloon 1205 to avatar 100 are used to indicate that avatar 100 is thinking. Again, since FIG. 12B is in black and white, a rough boundary is used to represent generally the color boundary of the balloon. Notice that the thought is enclosed in parenthesis instead of quotes. Thus, both the nature of the quip, and the delimiters for the message are used to indicate the type of message in the graphic user interface.

Figure 12C:
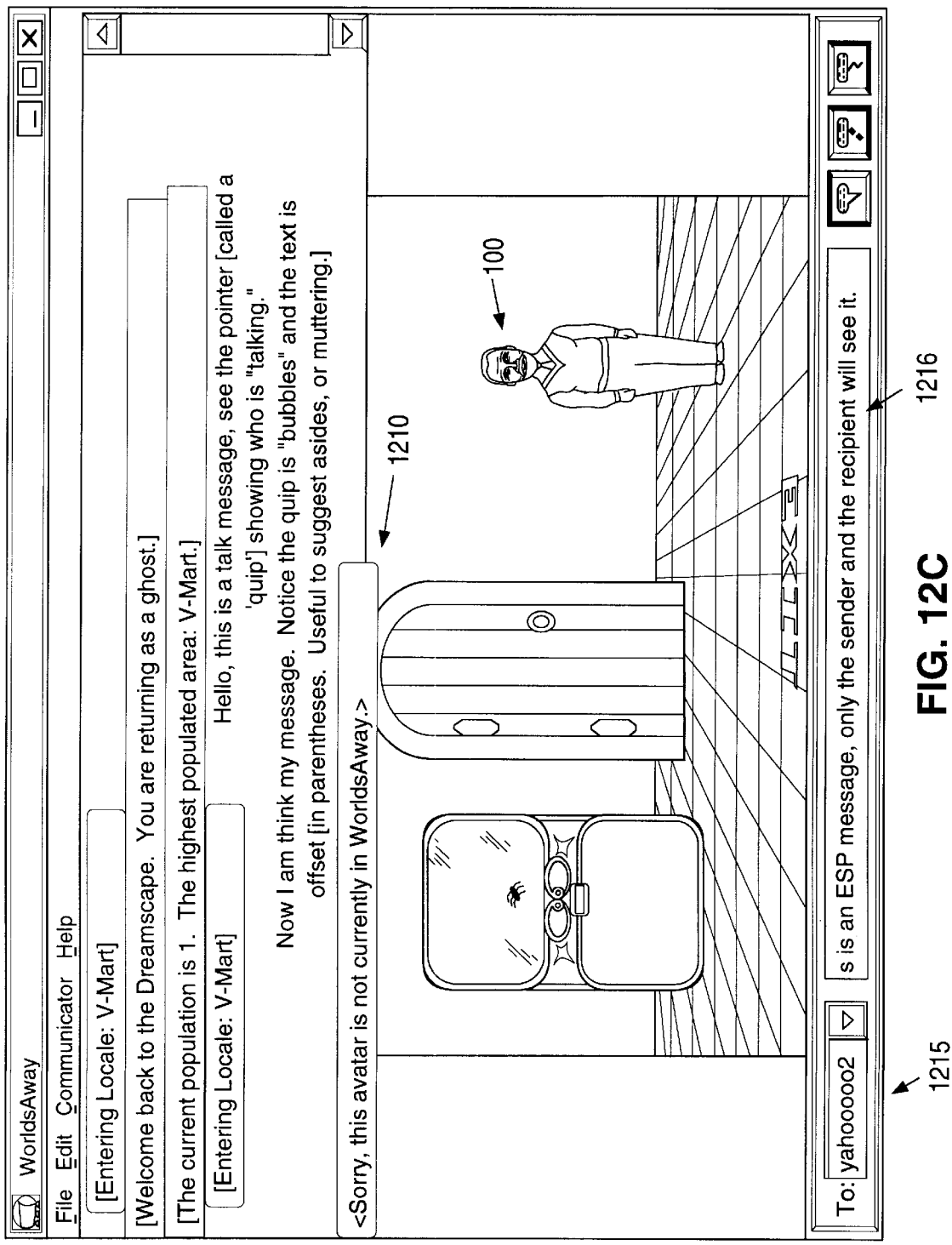

FIG. 12C illustrates a message 1210 that is generated when an ESP message is sent to a avatar that is not in the virtual world. FIG. 12C also shows how an ESP message is input. The name of the avatar to receive the ESP message is entered in address box 1215, in this example, yahooooo2, and the message is also entered in text entry box 1216.

Figure 12D:
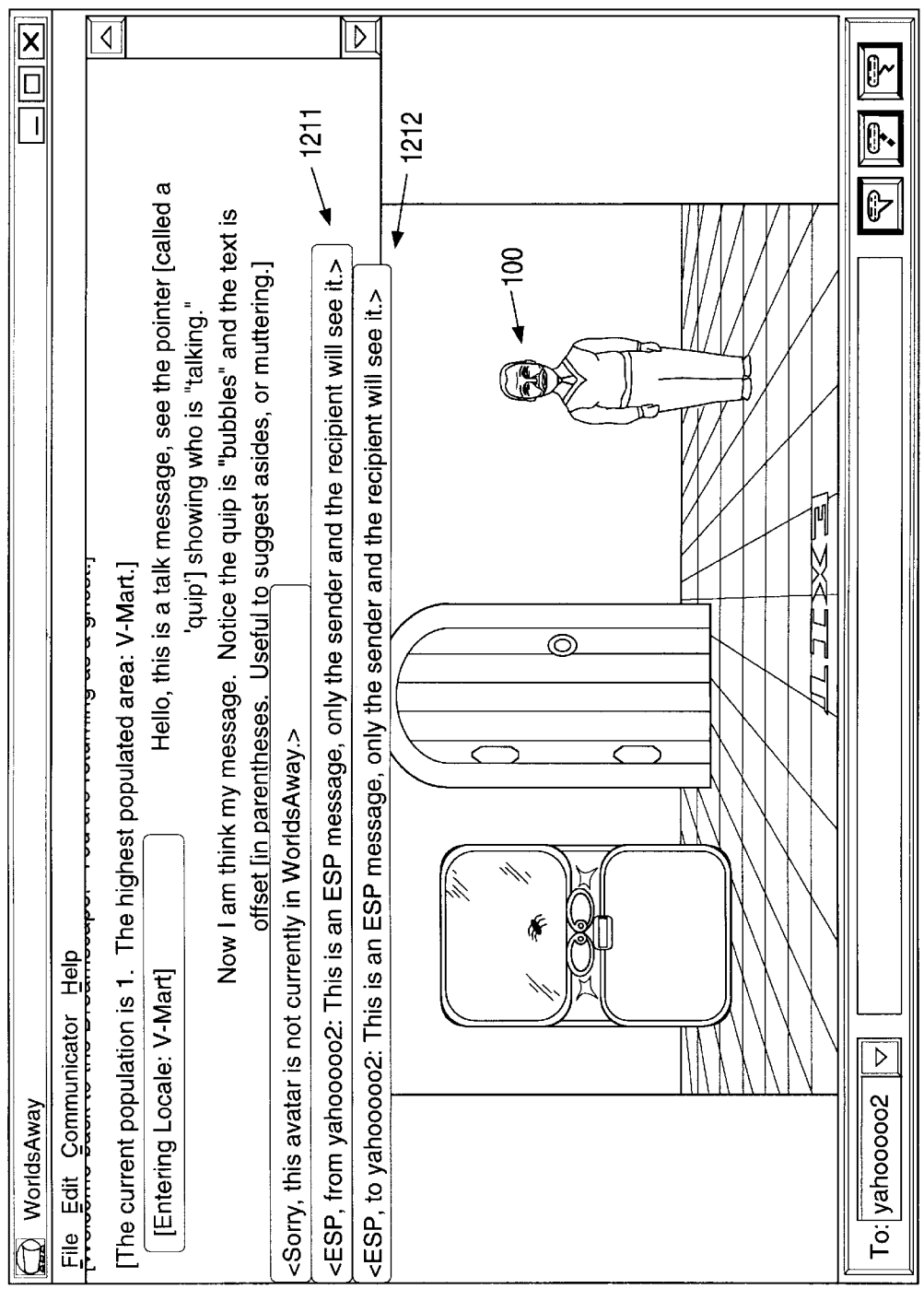

Sending an ESP message results in a message being sent to the avatar named, and to the avatar sending the message. Both messages are illustrated in FIG. 12D. From message 1211 is the message received by the avatar to which the ESP message is addressed. To message 1212 is the message received by the avatar sending the ESP message. Again, a different delimiter and message presentation, i.e., no quips, in the form of either a solid quip or bubbles, are used for ESP messages.

Thus, according to the principles of this invention, a plurality of communications are possible, and the graphic format of the message allows the avatars to determine the specific type of message and who is sending the message. Thus, the graphic user interface permits a range of interactions and communications.

The above class definitions include a base class and a container class. All of the class definitions include the base class, while the vendroid and avatar classes include both classes. Table 83 are definitions for the various instance.cld and instcont.cld files given within the include statement in the classes defined above, as well as the base and container classes. These files define instance data for each object of the class.

TABLE 83

A Definition for a Class or Classes from which Classes
Avatar, Tokens, ATM, Vendroid and Ghost Are SubClasses

```
************************************
* base.cld - the common object template
************************************
*/
required class base {
        info {
                classNumber     thisClass( );
                version         thisVersion( );
                name            " ";
                capacity        NO_CONTENTS;
                helpResourceID  DEFAULT_HELP;
        }
        instance {
                include "instance.cld";
        }
}
************************************
* base.cld - the generic container template
************************************
*/
/*
required class basecont {
        info {
                classNumber     thisClass( );
                version         thisVersion( );
                name            " ";
                capacity        MAX_CAPACITY;
                helpResourceID  DEFAULT_HELP;
        }
        instance {
                include "instance.cld";
                include "instcont.cld";
        }
}
************************************
* instance.cld
        instance variables shared by all classes
************************************
include "iv_instance.cld";
************************************
* iv_instance.cld
        instance variables shared by all classes
*
************************************
*/
server:
        uint16  record_state;       /* ODB field */
        uint16  nrecs;               /* ODB field */
        uint32  woid;                /* World object id. */
        objref  container_offset;
        uint32  flags;               /* Misc. flags */
        uint32  helpResourceID;
client:
        uint32  object_info;
                /* a pointer to a magic state structure */
        uint32  callbacks;
                /* a pointer to the callback queue header */
        uint32  sync_flags;
                /* Flags used for synchronization and wait */
        uint16  balloonColor;
                /* what color to draw balloons */
        uint16  anotherLocal;
                /* This field is available for expansion */
common:
        uint16  classNumber;
                /* Keep this first for easy lookup */
        uint16  noid;                /* Me! */
        uint32  version;
                /* Class version number */
        uint16  container_noid;
        uint16  style;
        uint32  common_flags;
                /* IMMOBILE/PORTABLE etc. */
        sint16  position[NUM_COORDINATES];
        uint16  orientation[NUM_COORDINATES];
                /* a normalized vector that faces 'front' */
```

TABLE 83-continued

A Definition for a Class or Classes from which Classes
Avatar, Tokens, ATM, Vendroid and Ghost Are SubClasses

```
        uint16    graphicState;
        char      name[OBJECT_NAME_MAX];
                  /* should be unicode */
        uint8     colorMap[COLOR_TABLE_SIZE];
                  /* custom colors */
        uint16    salePrice;
                  /* What it last sold for */
        uint16    activeChore;
                  /* are we running a choreography? */
        uint16    choreIndex;
                  /*and where are we in the choreography now? */
        uint16    choreState;
                  /* And what state (mode) is the avatar in? */
        uint16    choreFlags;
                  /* Some flags to keep this word aligned */
***************************************
* instcont.cld
        instance variables shared by all containers
***************************************
include "iv_instcont.cld";
***************************************
* iv_instcont.cld
        instance variables shared by all containers
***************************************
common:
        uint16    reducedCapacity;
server:
        objref    contents[MAX_CAPACITY];
client:
        uint16    contents[MAX_CAPACITY];
```

In the above table, the particular instance data inherited by one of the classes given in the title is determined by examining the include statements with the definition of that class above. As is known to those of skill in the art, when an object of a particular class is generated on either the client or server computers, or both, a structure is created in memory that includes each of the instance variables as defined for that particular class.

Consequently, each instance of the class definitions given herein defines a novel structures in the computer memory that contains data for the virtual object in the virtual world. The token structures, ATM structures, vendroid structures, and the avatar structure with a pocket and a hand container create unique features in the virtual world that make the virtual world a more realistic and enjoyable place for on-line users to communicate. The ability to trade, purchase, get, and put the portable virtual objects stored in these structure allows an economic component, i.e., a new dimension of communication to exist in the virtual world that was not previously available.

One embodiment of a oracle, an acolyte, a fiddle wand, and an amulet are described in commonly assigned, and commonly filed U.S. patent application No. 08/691,695, now U.S. Pat. No. 5,802,296 issued on Sep. 1, 1998 entitled "Supervisory Powers in Computer Interactions" of Jeffery Douglas and Norman Morse and that application is incorporated herein by reference in its entirety.

We claim:

1. A graphic user interface comprising:
a first virtual avatar object further comprising:
an instance of an avatar class stored in a computer memory; and
a virtual ghost object further comprising:
an instance of a ghost class stored in said computer memory;
wherein said instance of said ghost class is generated and stored in said computer memory upon a second virtual avatar object dematerializing from a locale in said graphic user interface
wherein said virtual ghost object selectively communicates with said first virtual avatar object.

2. A graphic user interface as in claim 1 further comprising:
an icon wherein said icon represents said virtual ghost object.

3. A graphic user interface as in claim 2 wherein said icon also represents all virtual ghost objects in said locale.

4. A graphic user interface as in claim 3 wherein said icon is an eye-in-the-sky.

5. A graphic user interface as in claim 2 wherein said icon is an eye-in-the-sky.

6. A graphic user interface as in claim 1 wherein said virtual ghost object does not have moods.

7. A graphic user interface as in claim 1 wherein said virtual ghost object can interact with a portable object is said locale only by obtaining information about said portable object.

8. A graphic user interface as in claim 1 wherein said virtual ghost object has anonymity.

9. A method for limiting visual clutter in a graphic user interface comprising:
limiting the number of virtual avatar objects in a locale of said graphic user interface to a predefined number;
converting each virtual avatar object entering said locale to a virtual ghost object whenever said number of virtual avatar objects in said locale equals said predefined number; and
allowing said virtual ghost object selectively communicates with at least one of said virtual avatar objects.

10. A method as in claim 9 further comprising:
limiting activities of a virtual ghost object.

11. A method as in claim 9 further comprising:
providing anonymity for a virtual ghost object.

12. A graphic user interface comprising:
a locale in a virtual world;
a ghost icon displayed in said locale representing all on-line users in said locale who are only watching action in said locale;
a first virtual avatar including an avatar-to-host method stored in a computer memory, wherein said avatar-to-ghost method, when invoked, replaces said virtual avatar by a virtual ghost capable of selectively communicating with a second virtual avatar.

13. A graphic user interface as in claim 12 wherein said ghost icon is an eye-in-the-sky.

14. A graphic user interfase as in claim 12 further comprising:
a virtual ghost wherein said virtual ghost is associated with one of said on-line users represented by said ghost icon.

15. A graphic user interface as in claim 14 wherein said virtual ghost further comprises:
a ghost to avatar method stored in a computer memory wherein said ghost to avatar method defines a virtual avatar object.

16. A graphic user interface as in claim 14 wherein said virtual ghost object cannot make gestures.

17. A graphic user interface as in claim 14 wherein said virtual ghost object does not have moods.

18. A graphic user interface as in claim 14 wherein said virtual ghost object can interact with a portable object in said locale only by obtaining information about said portable object.

19. A graphic user interface as in claim 14 wherein said virtual ghost object has anonymity.

* * * * *